(12) United States Patent
Toyoda et al.

(10) Patent No.: US 7,492,975 B2
(45) Date of Patent: Feb. 17, 2009

(54) OPTICAL SWITCH, OPTICAL MODULATOR AND WAVELENGTH VARIABLE FILTER

(75) Inventors: Seiji Toyoda, Atsugi (JP); Kazuo Fujiura, Atsugi (JP); Masahiro Sasaura, Atsugi (JP); Koji Enbutsu, Atsugi (JP); Makoto Shimokozono, Hadano (JP); Tadayuki Imai, Zama (JP); Akiyuki Tate, Mito (JP); Touru Matsuura, Yokohama (JP); Takashi Kurihara, Atsugi (JP); Hiroshi Fushimi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 107 days.

(21) Appl. No.: 10/547,493

(22) PCT Filed: Mar. 18, 2004

(86) PCT No.: PCT/JP2004/003665

§ 371 (c)(1),
(2), (4) Date: Aug. 31, 2005

(87) PCT Pub. No.: WO2004/083953

PCT Pub. Date: Sep. 30, 2004

(65) Prior Publication Data

US 2007/0058896 A1    Mar. 15, 2007

(30) Foreign Application Priority Data

| Mar. 19, 2003 | (JP) | ............... | 2003-075105 |
| Mar. 20, 2003 | (JP) | ............... | 2003-077142 |
| Jul. 16, 2003 | (JP) | ............... | 2003-275521 |
| Aug. 28, 2003 | (JP) | ............... | 2003-305023 |
| Dec. 8, 2003 | (JP) | ............... | 2003-409658 |
| Dec. 11, 2003 | (JP) | ............... | 2003-412951 |

(51) Int. Cl.
*G02F 1/035* (2006.01)

(52) U.S. Cl. .............................. 385/3; 385/40

(58) Field of Classification Search .................. 385/1–3, 385/8, 40, 122
See application file for complete search history.

(56) References Cited

U.S. PATENT DOCUMENTS 4,291,939 A     9/1981   Giallorenzi et al.

(Continued)

FOREIGN PATENT DOCUMENTS

EP              1 260 839 A2    11/2002

(Continued)

OTHER PUBLICATIONS

Haruna Nishihara et al., *Optical Integrated Circuits*, OHM Co., Ltd., 1985, pp. 310-326 with partial English translation.

(Continued)

*Primary Examiner*—Sarah Song
(74) *Attorney, Agent, or Firm*—Workman Nydegger

(57) ABSTRACT

The present invention provides an optical switch, an optical modulator, and a wavelength variable filter each of which has a simple configuration, which requires only a low driving voltage, which is independent of polarization, and which can operate at high speed. An optical switch according to the present invention includes a 3-dB coupler (16) placed on an input, a 3-dB coupler (17) placed on an output, and two optical waveguides connecting the input-side 3-dB coupler and the output-side 3-dB coupler together. The optical switch also includes a phase modulating section (18) that applies electric fields to one or both of the two optical waveguides. At least two optical waveguides are a crystal material including $KTa_xNb_{1-x}O_3$ (0<x<1) and $K_xLi_{1-x}Ta_yNb_{1-y}O_3$ (0<x<1, 0<y<1), or $KTa_xNb_{1-x}O_3$ or $K_xLi_{1-x}Ta_yNb_{1-y}O_3$.

4 Claims, 46 Drawing Sheets

U.S. PATENT DOCUMENTS

| | | | |
|---|---|---|---|
| 4,866,406 A * | 9/1989 | Minakata et al. ............. | 359/315 |
| 5,361,270 A * | 11/1994 | Heismann .................... | 372/27 |
| 5,712,935 A | 1/1998 | Miyakawa | |
| 5,886,807 A | 3/1999 | Cummings | |
| 6,363,189 B1 | 3/2002 | Minakata et al. | |
| 6,470,125 B1 | 10/2002 | Nashimoto et al. | |
| 6,583,917 B2 | 6/2003 | Mellomi et al. | |
| 2002/0126933 A1 | 9/2002 | Goh et al. | |
| 2002/0141040 A1 | 10/2002 | Fujiura et al. | |

FOREIGN PATENT DOCUMENTS

| | | |
|---|---|---|
| JP | 53-006054 | 1/1978 |
| JP | 53-054040 | 5/1978 |
| JP | 59-093430 | 5/1984 |
| JP | 63-049732 | 3/1988 |
| JP | 02-114243 | 4/1990 |
| JP | 05-119287 | 5/1993 |
| JP | 06-289342 | 10/1994 |
| JP | 09-080490 | 3/1997 |
| JP | 09-243976 | 9/1997 |
| JP | 11-326855 | 11/1999 |
| JP | 2002-040378 | 2/2002 |
| JP | 2002-296632 | 10/2002 |
| JP | 2004-063506 | 2/2004 |

OTHER PUBLICATIONS

Yasufumi Yamada et al, *An Application of a Silica-on-Terraced-Silicon Platform to Hybrid Mach-Zehnder Interferometric Circuits Consisting of Silica-Waveguides and $LiNbO_3$ Phase-Shifters*, IEEE Photonics Technology Letters, vol. 6, No. 7, Jul. 1994, pp. 822-824.

P. Granestrand, *Integrated Optics 4 x 4 Switch Matrix with Digital Optical Switches*, Electronics Letters, vol. 26, No. 1, Jan. 4, 1990, pp. 4-5.

* cited by examiner

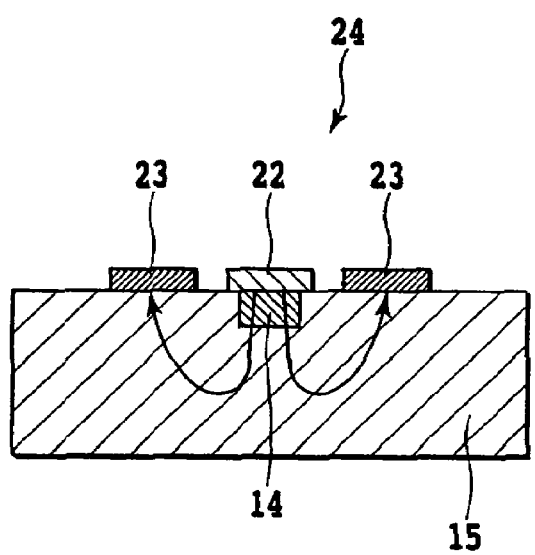 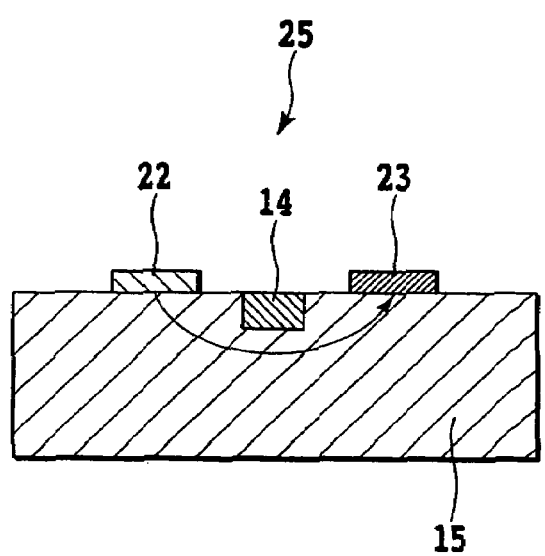
FIG.3A  FIG.3B

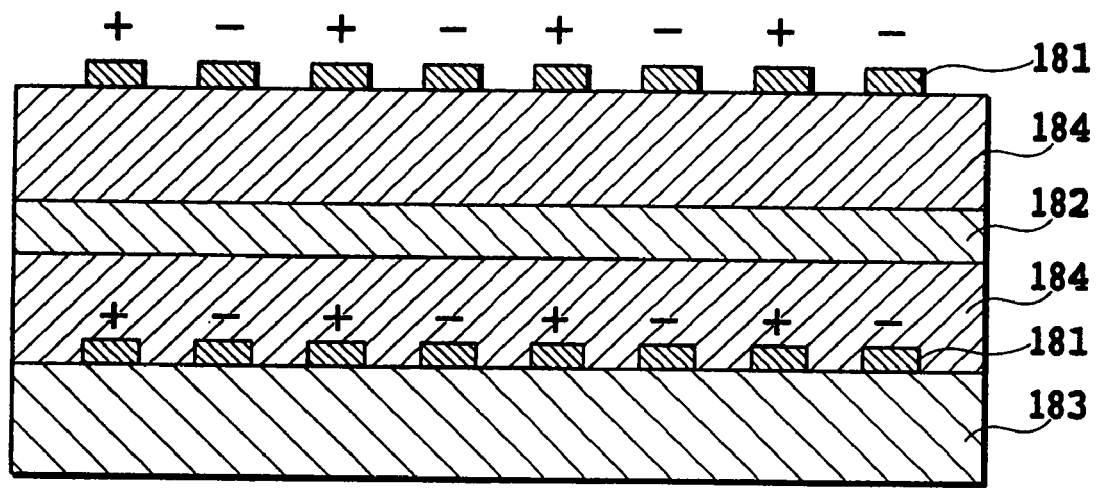
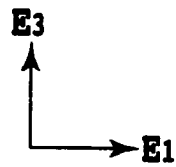
FIG.18A
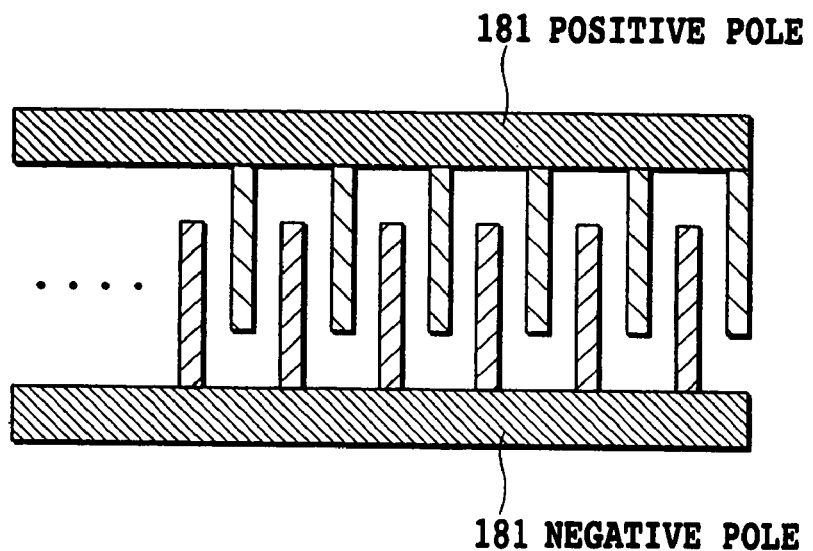
FIG.18B

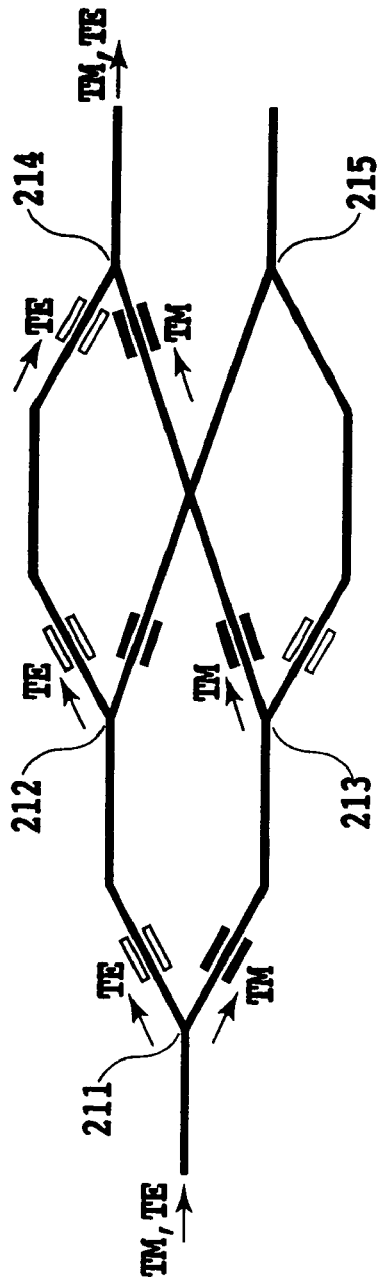
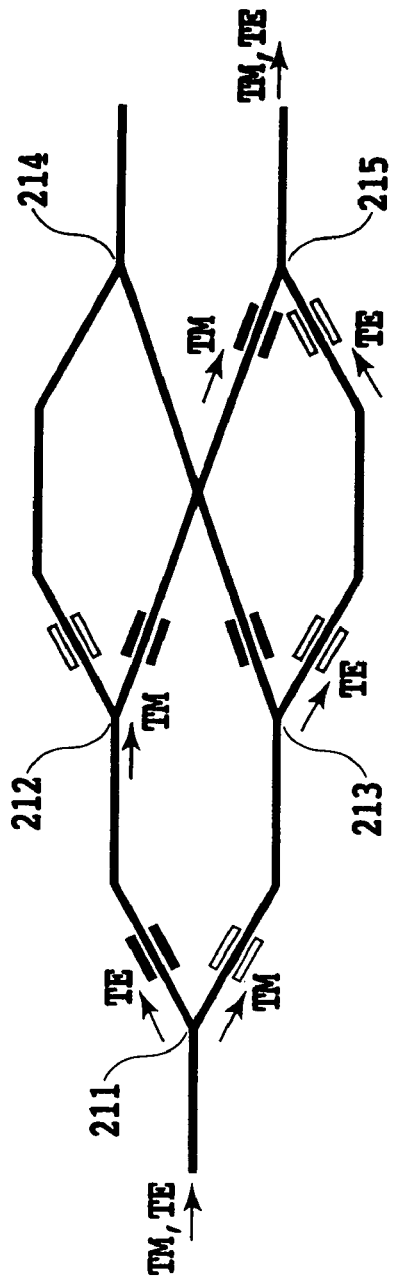
FIG.21A
FIG.21B

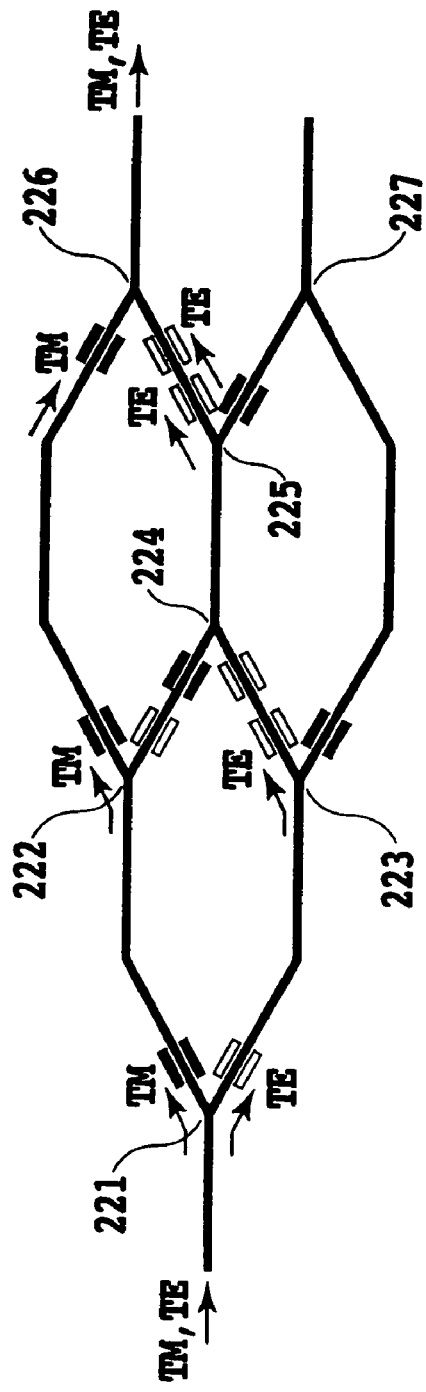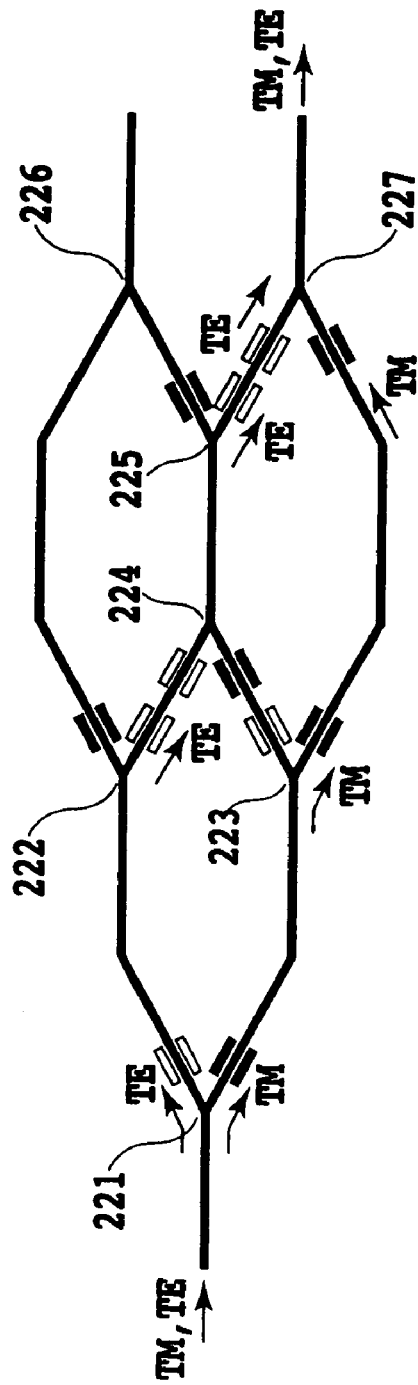
FIG.22A
FIG.22B

KTN AND KLTN CRYSTAL AXES
a1=a2=a3 (FOR CUBIC CRYSTAL)

OPTICAL SWITCH, OPTICAL MODULATOR AND WAVELENGTH VARIABLE FILTER

TECHNICAL FIELD

The present invention relates to an optical switch, an optical modulator, and a wavelength variable filter which are used as optical communication parts.

BACKGROUND ART

At present, there are rapidly growing demands for an increase in the capacity and speed of optical communication systems and for improvements in the functions of these systems. Optical switches and optical modulators are expected to serve as optical signal processing devices used for the optical communication system. In particular, optical crossconnect switches are becoming increasingly important in meeting the recent demands for improvements in the functions of networks. As such optical switches, the following have been developed: optical switches called MEMS (Micro Electromechanical System) and using a micromachine technique, and optical switches using the thermophotometric effect of silica on silicon waveguides. Further, optical switches have also been developed in which crossing parts of waveguides are filled with oil having a refractive index equal to that of the waveguides so that the waveguides are overheated to generate bubbles to reflect light at the crossing parts, thus switching an optical path.

However, these optical switches operate at a speed on the order of msec. An operating speed required by next-generation optical networks to route optical packets is 1 to 10 nsec. Optical switches using the electro-optic effects of $LiNbO_3$ (also referred to as LN) can accomplish an operating speed of 1 to 10 nsec. These switches are provided by varying the refractive index of waveguides on the basis of the primary electro-optic effect of the LN.

As a method for producing an optical switch based on the electro-optic effect of the LN, one is known which comprises using a Ti heat diffusion process to form a waveguide pattern having a Y branch form, on an LN substrate, then forming a buffer layer on the waveguide pattern, and further disposing electrodes corresponding to the waveguide pattern, on the buffer layer (refer to Nishihara, Haruna, and Suhara, "Optical Integrated Circuit", OHM Co., Ltd., pp. 310 to 326 (1985)).

However, the LN is a trigonal crystal, and light must guided in an orientation with birefringence in order to use $r_{33}$, which is a larger electro-optic constant. Thus, the optical switch has a polarization dependency, that is, its operation varies with the polarization of light. The polarization dependency may cause an error in the transmission of light. Accordingly, it is important that the optical switch is a polarization independence. Thus, attempts have been made to produce optical switches operating at the polarization independence, using the LN. However, with a crystal orientation without birefringence, $r_{13}$, which has a smaller electro-optic constant, is utilized, thus resulting in a driving voltage of 40 V or more.

As an optical switch operating at high speed, one has been proposed which uses a Mach-Zehnder interferometer composed of a semiconductor material. However, the Mach-Zehnder interferometer uses control light for switching and requires complicated arrangements for synchronization and the like. Consequently, the Mach-Zehnder interferometer is not practical.

Further, adigital optical switch has been proposed which controls a mode distribution. However, such a switch uses a higher driving voltage than other types of switches.

By the way, the electro-optic effect is a phenomenon in which the electron state of atoms constituting crystal is varied by electric fields. Accordingly, this effect responds very quickly to a change in electric fields. Thus, the electro-optic effect responds instantaneously to a change in electric fields on a femto second level. Consequently, this effect is a physical phenomenon optimum for very fast optical modulators. In particular, the LN can be relatively easily formed into optical waveguides using a method such as diffusion of impurities such as Ti, or ion exchange. Accordingly, the LN is a material also widely used for optical modulators utilizing the primary electro-optic effect (refer to Nishihara, Haruna, and Suhara, "Optical Integrated Circuit", OHM Co., Ltd., pp. 310 to 326 (1985)), Japanese Patent Application Laid-open No. 53-006054 (1978), and Japanese Patent Application Laid-open No. 53-054040 (1978).

In general, the electro-optic effect is dependent on the orientation of a crystal; electric fields are applied to a crystal axis having the largest electro-optic constant to modulate the refractive index. The LN utilizes the $r_{33}$ (30 pm/V), described above. Further, the operating speed and modulation voltage are important performance parameters for implementation of an optical modulator. The magnitude of phase modulation is proportional to the length of electrodes. Accordingly, a required modulation voltage decreases consistently with increasing electrode length. However, when the electrode length is 1 cm or more, it is difficult to uniformly apply a high frequency on the order of GHz using lumped constant electrodes. This is because the period of a modulation signal is equivalent to the time required by electric fields to move from end to end of an electrode. In contrast, if the electrode length is reduced in order to improve a response speed, a high voltage power source is required. Thus, in this case, an actually available power source is very expensive.

It is an object of the present invention to provide an optical switch, an optical modulator, and a wavelength variable filter each of which has a simple configuration, which requires only a low driving voltage, which is independent of polarization, and which can operate at high speed.

DISCLOSURE OF THE INVENTION

An embodiment of the present invention is an optical waveguide device comprising a three-dimensional optical waveguide for propagating light and including a dielectric crystal which is cubic and which has a secondary electro-optic effect, and an electrode that applies electric fields to the three-dimensional optical waveguide. The three-dimensional optical waveguide has only to be able to contain light not only in a direction perpendicular to a surface of a substrate but also in a direction parallel to it. For example, it may be a buried light waveguide or a ridge light waveguide.

Another embodiment is a waveguide type electro-optic phase shifter comprising a three-dimensional light waveguide that is a crystal material including $KTa_{1-x}Nb_xO_3$ (0<x<1) (also referred to as KTN) and $K_{1-y}Li_yTa_{1-x}Nb_xO_3$ (0<x<1, 0<y<1) (also referred to as KLTN), or KTN or KLTN, and for propagating light, and an electrode that applies electric fields to the three-dimensional optical waveguide.

Another embodiment is an optical switch comprising a Mach-Zehnder interferometer having a 3-dB coupler placed on an input side, a 3-dB coupler placed on an output side, and two optical waveguides connecting the input-side 3-dB coupler and the output-side 3-dB coupler together, and an electrode for applying electric fields to one or both of the two three-dimensional optical waveguides. In this optical switch, the at least two three-dimensional optical waveguides have a crystal material including KTN and KLTN, or KTN or KLTN.

In another embodiment, a core waveguide including a material of one of KLTN and KTN is placed on a substrate including a material of one of $KTaO_3$, $KN_bO_3$, and KTN. This embodiment comprises an electrode for applying electric fields to a core waveguide formed at least one of below a lower clad layer or above an upper clad layer in a three-dimensional waveguide having clad layers that is KLTN having a slightly smaller refractive index than that of the core waveguide. This embodiment comprises a Y branching waveguide composed of a three-dimensional optical waveguide and including a first input optical guide having an input end for receiving a transmitted optical signal, and a second and third output optical waveguides that branch from the first input waveguide, the electrode being placed on the second and third output optical waveguides.

Another embodiment is a Mach-Zehnder type optical modulator comprising at least one input waveguide, one output waveguide, a 3-dB coupler connected to the input waveguide, a 3-dB coupler connected to the output waveguide, and two three-dimensional optical waveguides connecting the two 3-dB couplers together, wherein a material for the waveguides is a crystal material including KTN and KLTN. At least one of the three-dimensional optical waveguides has an electro-optic phase shifter in which an electrode is placed.

Another embodiment is a broad-band optical modulator comprising a substrate including a material of one of KTN and KLTN and a three-dimensional optical waveguides including a material of one of KTN and KLTN. The optical modulator also comprises a plurality of electrodes each consisting of a progressive wave electrode matching the speed of a microwave with that of a light wave.

Another embodiment is a waveguide type electro-optic phase shifter comprising a three-dimensional optical waveguide having a core having a first crystal material including KTN and KLTN, the core having a core thickness, and a clad having a second crystal material including KTN and KLTN having a refractive index different from that of the first crystal material. The waveguide electro-optic phase shifter also comprises two electrodes arranged opposite each other and parallel to each other across the three-dimensional optical waveguide. The core is buried in the clad so that there is a first distance between a bottom surface of the core and a bottom surface of the clad and that there is a second distance between a top surface of the core and a top surface of the clad. The clad has a clad thickness such that $0 \leq$ first distance and second distance $\leq 3 \times$ core thickness.

Another embodiment is a waveguide electro-optic phase shifter comprising a three-dimensional optical waveguide having core having a first crystal material including KTN and KLTN, the core having a core width, and a clad having a second crystal material including KTN and KLTN and having a refractive index different from that of the first crystal material. The waveguide electro-optic phase shifter also comprises two electrodes arranged opposite each other and parallel to each other across the three-dimensional optical waveguide. The core is buried in the clad so that there is a first distance between a top surface of the core and a top surface of the clad. The clad has a clad thickness such that $0 \leq$ first distance $\leq 3 \times$ core width.

Another embodiment is an array optical waveguide lattice wavelength variable filter having an array optical waveguide consisting of a plurality of three-dimensional optical waveguides and electrodes provided on the three-dimensional optical waveguides. The array optical waveguide lattice wavelength variable filter has a waveguide electro-optic phase shifter in which for one of the channel optical waveguides, two electrodes are arranged opposite each other and parallel to each other across the three-dimensional optical waveguide.

Another embodiment is an array optical waveguide lattice wavelength variable filter comprising at least one input port channel optical waveguide, a channel optical waveguide array including channel optical waveguides having different channel optical path lengths, at least one output port channel optical waveguide, a first slab optical waveguide connecting the input port channel optical waveguide and the channel optical waveguide array together, and a second slab optical waveguide connecting the output port channel optical waveguide and the channel optical waveguide array together. The array optical waveguide lattice wavelength variable filter comprises a three-dimensional optical waveguide including a core having a first crystal material including KTN and KLTN, the core having a core thickness, a clad having a second crystal material including KTN and KLTN having a refractive index different from that of the first crystal material, and two electrodes arranged opposite each other and parallel to each other across the three-dimensional optical waveguide. The core is buried in the clad so that there is a first distance between a bottom surface of the core and a bottom surface of a clad and that there is a second distance between a top surface of the core and a top surface of a clad. The clad has a clad thickness such that $0 \leq$ first distance and second distance $\leq 3 \times$ core thickness.

Another embodiment is an array optical waveguide lattice wavelength variable filter comprising at least one input port channel optical waveguide, a channel optical waveguide array having channel optical waveguides having different channel optical path lengths, at least one output port channel optical waveguide, a first slab optical waveguide connecting the input port channel optical waveguide and the channel optical waveguide array together, and a second slab optical waveguide connecting the output port channel optical waveguide and the channel optical waveguide array together. The array optical waveguide lattice wavelength variable filter comprises a three-dimensional optical waveguide including a core having a first crystal material including KTN and KLTN, the core having a core width, a clad having a second crystal material including KTN and KLTN having a refractive index different from that of the first crystal material, and two electrodes arranged opposite each other and parallel to each other across the three-dimensional optical waveguide. The core is buried in the clad so that there is a first distance between a top surface of the core and a top surface of a clad. The clad has a clad thickness such that $0 \leq$ first distance $\leq 3 \times$ core width.

BRIEF DESCRIPTION OF THE DRAWINGS

FIG. 3A is a sectional view taken along a line IIIA-IIIA in FIG. 2;

FIG. 3B is a sectional view taken along a line IIIB-IIIB in FIG. 2;

FIG. 18A is a sectional view taken along a line XVIIIA-XVIIIA in FIG. 17;

FIG. 18B is a plan view of a comb-shaped electrode in FIG. 17;

FIG. 21A is a diagram illustrating a 1×2 polarization independent splitter (three connections; application of electric fields parallel to the substrate) according to one embodiment of the present invention;

FIG. 21B is a diagram illustrating the 1×2 polarization independent splitter (three connections; application of electric fields parallel to the substrate) according to one embodiment of the present invention;

FIG. 22A is a diagram illustrating a 1×2 polarization independent splitter (five connections; application of electric fields parallel to the substrate) according to one embodiment of the present invention;

FIG. 22B is a diagram illustrating the 1×2 polarization independent splitter (five connections; application of electric fields parallel to the substrate) according to one embodiment of the present invention;

BEST MODE FOR CARRYING OUT THE INVENTION

Figure 1:
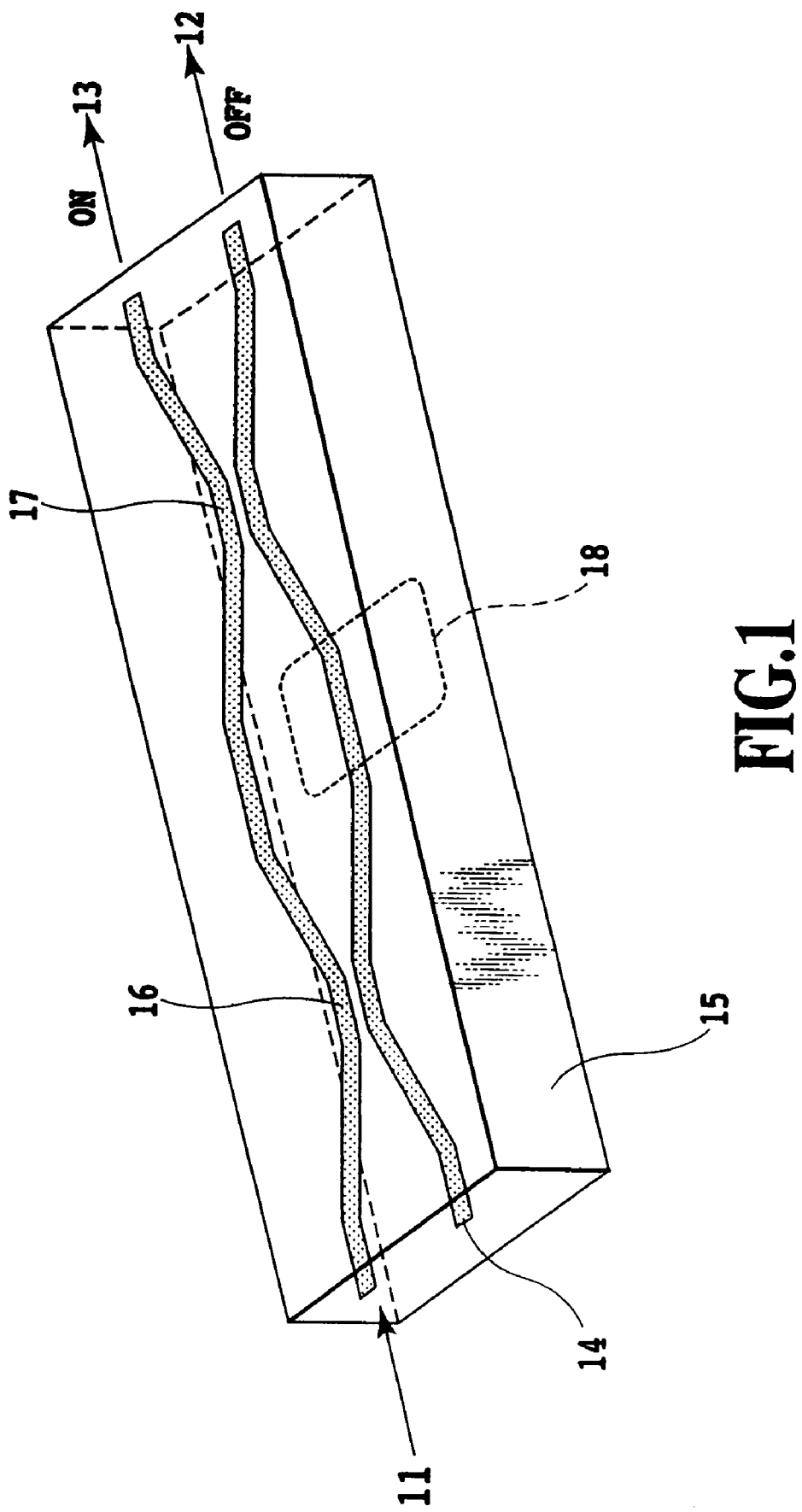
FIG. 1 is a diagram showing the configuration of an optical switch according to one embodiment of the present invention.

To describe the present invention in detail, description will be given with reference to the drawings.

An optical switch and an optical modulator according to the present embodiment employ a dielectric crystal which is cubic and which has a significant secondary electro-optic effect. Specifically, the optical switch and the optical modulator employ a crystal material consisting of KTN ($KTa_{1-x}Nb_xO_3$ (0<x<1)) and KLTN ($K_{1-y}Li_yTa_{1-x}Nb_xO_3$ (0<x<1, 0<y<1)), or KTN or KLTN. One embodiment of the present invention is characterized by using an optical waveguide device composed of these materials. Here, X denotes the composition ratio of Nb to Ta and Nb. Y denotes the composition ratio of Li to K and Li.

When an external electrode is applied to the KTN in the direction of a crystal axis, the KTN exhibits a secondary electro-optic effect. The value for the effect is (1,200 to 8,000 pm/V) and is significantly large compared to the nonlinear constant of LN, 30 pm/V.

Further, the KTN depends on its composition and causes a ferroelectric transition at a Curie transition temperature of −273 to 400° C. Above and below this range of Curie temperatures, a relative dielectric constant varies significantly between about 3,000 and about 20,000. A variation in refractive index based on a nonlinear effect is proportional to the square of the relative dielectric constant. Thus, in the vicinity of the transition temperature, the refractive index can be controlled by a reduced voltage. Moreover, although the Curie temperature varies with the value for the composition x of $KTa_{1-x}Nb_xO_3$, the range of the temperature can also be adjusted by adding Li to the KTN.

Besides the KTN and KLTN crystals, any dielectric crystal may be used which is cubic and which has a significant secondary electro-optic effect similarly to the KTN and KLTN crystals. For example, $BaTiO_3$(BTO), a crystal material obtained by substituting Ba for K of the KTN crystal and Ti for both Ta and Nb, has a tetragonal structure at the room temperature. However, BTO is subjected to a structural phase transition at about 100° C. or higher to become cubic. Accordingly, in this state, the optical switch and optical modulator according to the present invention can be constructed by a method using the KTN and KLTN crystal according to the present invention. Further, in spite of a degraded versatility in terms of the operating temperature and the like, STO, obtained by substituting Sr for K of the KTN crystal, or CTO, obtained by substituting Ca for K of the KTN crystal, has a similar nature. This also applies to materials obtained by mixing two or more of the three materials, BTO, STO, and CTO. As a further variation, a material may be obtained by substituting Pb and La for Ba of the BTO and substituting Zr for a part of Ti. In other words, a material may be used in exactly the same manner which is obtained by substituting Pb and La for K of the KTN crystal and Ti and Zr for Ta and Nb (a crystal material commonly called PLZT). This variation is applicable to the KLTN crystal similarly to the KTN crystal.

In this case, Li is replaced with Ba, Sr, or Ca, or Pb or La.

The KTN and KLTN crystals tend to changes from a cube to a tetragon and then to a rhombohedron in accordance with the temperature. These crystals are known to have a significant secondary electro-optic effect when they are cubic. In particular, in an area close to the phase transition temperature at which the cubic crystal changes to the tetragonal crystal, the relative dielectric constant may diverge, so that the secondary electro-optic effect, which is proportional to the square of the relative dielectric constant, has a very large value. Accordingly, a voltage required to drive the optical switch can be reduced to 1 V or lower. This reduces loads on a power source to enable driving by an IC.

Further, the operating temperature of the optical switch and optical modulator, which utilize the secondary electro-optic effect, is desirably near the phase transition at which the KTN and KLTN crystals change from a cube to a tetragon. For the KTN and KLTN crystals, by varying the composition ratio of Ta to Nb, it is possible to vary the phase transition temperature at which the phase changes from paraelectric one to ferroelectric one (the crystal system changes from cubic crystal to tetragonal system), from almost absolute 0 to 400° C. Thus, for an optical switch and an optical modulator produced using the KTN and KLTN crystals, the operating temperature can be easily set close to the room temperature. In addition, in the optical switch and optical modulator according to the present invention, the crystal in the area of the cubic crystal is used for an optical waveguide. Consequently, the optical waveguide has no birefringence and the optical switch can operate independently of polarization.

In connection with the composition ratio of the KTN and KLTN crystal material most significantly exhibiting the above characteristic, for the KTN, it is only necessary that 0<x<1. For the KLTN, it is only necessary that 0<x<1 and 0<y<1. However, a composition ratio X (the ratio of Nb to Ta and Nb) is preferably at least 0.55 and at most 0.90. A composition ratio Y (the ratio of Li to K and Li) is preferably more than 0 and less than 0.1. If the composition ratio X is out of the range of 0.55 to 0.90, the phase transition temperature of the crystal is inappropriately high or low. If the composition ratio Y is at least 0.1, the crystal structure inappropriately changes.

First Embodiment

An optical switch according to a first embodiment has optical waveguides that propagate light and electrodes that apply electric fields to the optical waveguides. Each of the optical waveguides is composed of a dielectric crystal such as a KTN or KLTN crystal which is cubic and which has significant secondary electro-optic effects.

A specific configuration is a Mach Zehnder interferometer type optical switch that can be switched by a smaller variation in refractive index, that is, by a reduced driving voltage. In order to operate this optical switch at a polarization independence, a variation in refractive index caused by the secondary electro-optic effect must be exactly equal in a TE direction and in a TM direction. The KTN and KLTN crystals used in the present embodiment has an electric field orientation in which the variation in refractive index is in principle equal in the TE direction and in the TM direction. In other words, an optical switch capable of operating independently of polarization can be provided by constructing an electrode that apply electric fields parallel to a propagating direction of light (see Example 3, described later). Further, in the present embodiment, within the same optical waveguide, a plurality of electrodes are combinably constructed which apply electric fields orthogonal to the propagating direction of light. This configuration can provide an optical switch capable of operating independently of polarization even if electric fields are applied in an orientation in which the variation in refractive index based on the electric fields differs between the TE direction and the TM direction (see Example 1, described later).

The optical switch according to the present embodiment operates in accordance with the secondary electro-optic effect. The optical switch comprises a material having a high relative dielectric constant. Thus, considerations must be made for a limit on the speed limited by a CR time constant. However, since the optical switch according to the present invention has a significant electro-optic effect, the size of the element can be sharply reduced. Further, the element can be designed to have a reduced electrostatic capacity. As a result, in addition to the polarization independent operation, operations at a high speed of 1 to 10 nsec can be realized.

As described above, the optical switch according to the present embodiment can use the simple configuration to provide advanced functions such as operations at a high speed of 1 to 10 nsec, a reduced driving voltage of at most 1 V, and polarization independent operations which cannot be realized by the conventional optical switches. Accordingly, such an optical switch can be utilized to route optical packets. Thus, using a number of examples, description will be given of the embodiment of the optical switch according to the present invention having the above characteristics. However, the present invention is not limited to the examples described below.

EXAMPLE 1

FIG. 1 is a diagram of the configuration of an optical switch, showing an example of the embodiment of the present invention. The optical switch has a Mach-Zehnder interferometer. Optical waveguides in this optical switch are made of a dielectric crystal. In the other examples of the present embodiment, description will be based on an optical switch having the Mach-Zehnder interferometer shown in FIG. 1.

As shown in FIG. 1, The optical switch according to the present invention is a Mach-Zehnder interferometer including a 3-dB coupler 16 placed on an input, a 3-dB coupler 17 placed on an output, and two optical waveguides (arm waveguides) connecting the input-side 3-dB coupler 16 and the output-side 3-dB coupler 17 together. The optical switch also comprises an electrode as a phase modulating part 18 which applies electric fields to one of the two optical waveguides. The input-side 3-dB coupler 16 and the output-side 3-dB coupler 17 are designed to precisely have a coupling constant of 3 dB.

Figure 2:
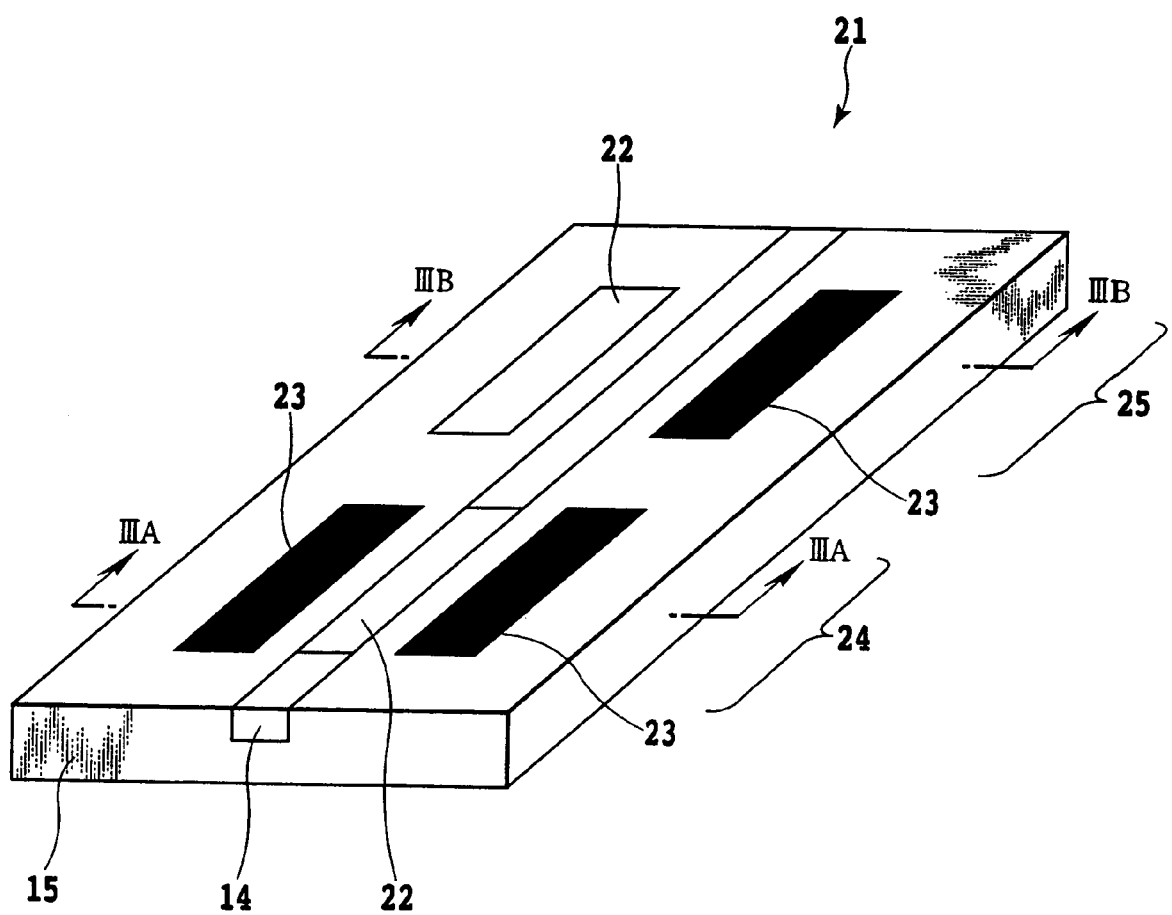
FIG. 2 is a diagram showing the configuration of a phase modulating section formed in one of the optical waveguides in a Mach-Zehnder interferometer of the optical switch shown in FIG. 1.

In the optical switch according to the present example, a dielectric crystal material used for a core 14 and a clad 15 is the KLTN crystal. The optical waveguides having a difference in specific refractive index of 0.75% have been provided by adjusting the concentrations of Li and Nb. A cross section of each optical waveguide constitutes a buried optical waveguide in which the core 14 is enclosed by the clad 15 as shown in FIG. 2, described later. The phase transition temperatures of the dielectric crystals of the core 14 and the clad 15 are 10 and 7° C., respectively. The operating temperature of the optical switch according to the present example is 12° C. At 12° C., the relative dielectric constants of the dielectric crystals of the core 14 and the clad 15 are 18,000 and 15,000, respectively.

In the optical switch according to the present example, light is inputted through an input port 11. If the phase modulating part 18 does not apply any electric fields to the optical waveguides (the phase modulating part 18 is off), all the light is outputted to an output port 12. If the phase modulating part 18 applies electric fields to the optical waveguides (the phase modulating part 18 is on), the output of the light is switched to an output port 13 by allowing the phase modulating part 18 to change a phase by π.

FIG. 2 is a diagram showing the configuration of the phase modulating part 18, formed in one of the optical waveguides in the Mach-Zehnder interferometer of the optical switch shown in FIG. 1. FIG. 3A is a sectional view taken along a line IIIA-IIIA in FIG. 2. FIG. 3B is a sectional view taken along a line IIIB-IIIB in FIG. 2.

As shown in FIGS. 2, 3A, and 3B, the phase modulating part 18 is composed of two phase modulating sections 24 and 25. These two phase modulating sections have different electrode structures. Specifically, the phase modulating section 24 has a transparent electrode 22 placed immediately above the core 24 and ground electrodes 23 arranged on the respective sides of the transparent electrode 22. In this electrode structure, as shown in FIG. 3A, electric fields are applied from the core 14 toward a substrate (parallel to a TM direction of a propagating light). On the other hand, in the phase modulating section 25, the transparent electrode 22 and the ground electrode 23 are arranged so as to sandwich the core 14 between them. Thus, as shown in FIG. 3B, electric fields are applied parallel to the substrate (parallel to a TE direction of a propagating light). This electrode structure enables electric fields to be applied in two directions orthogonal to the propagating direction of light and to each other.

The secondary electro-optic effects of the KTN and KLTN crystals can be expressed as shown below on the basis of their symmetry.

$$\Delta n_{//} = -\tfrac{1}{2} \times n_0^3 \times \epsilon_0^2 \times \epsilon_r^2 \times g_{11} \times E^2 \tag{1}$$

$$\Delta n_{\perp} = -\tfrac{1}{2} \times n_0^3 \times \epsilon_0^2 \times \epsilon_r^2 \times g_{12} \times E^2 \tag{2}$$

In these equations, $\Delta n_{//}$ denotes a change in refractive index in a direction parallel to applied electric fields. $\Delta n_{\perp}$ denotes a change in refractive index in a direction perpendicular to applied electric fields. $n_0$ denotes a refractive index obtained before application of electric fields to the KTN and KLTN. $g_{11}$ and $g_{12}$ denote nonlinear constants for the KTN and KLTN. $\epsilon_0$ denotes a dielectric constant for vacuum. $\epsilon_a$ denotes a relative dielectric constant for the crystal. E denotes applied electric fields.

Figure 4:
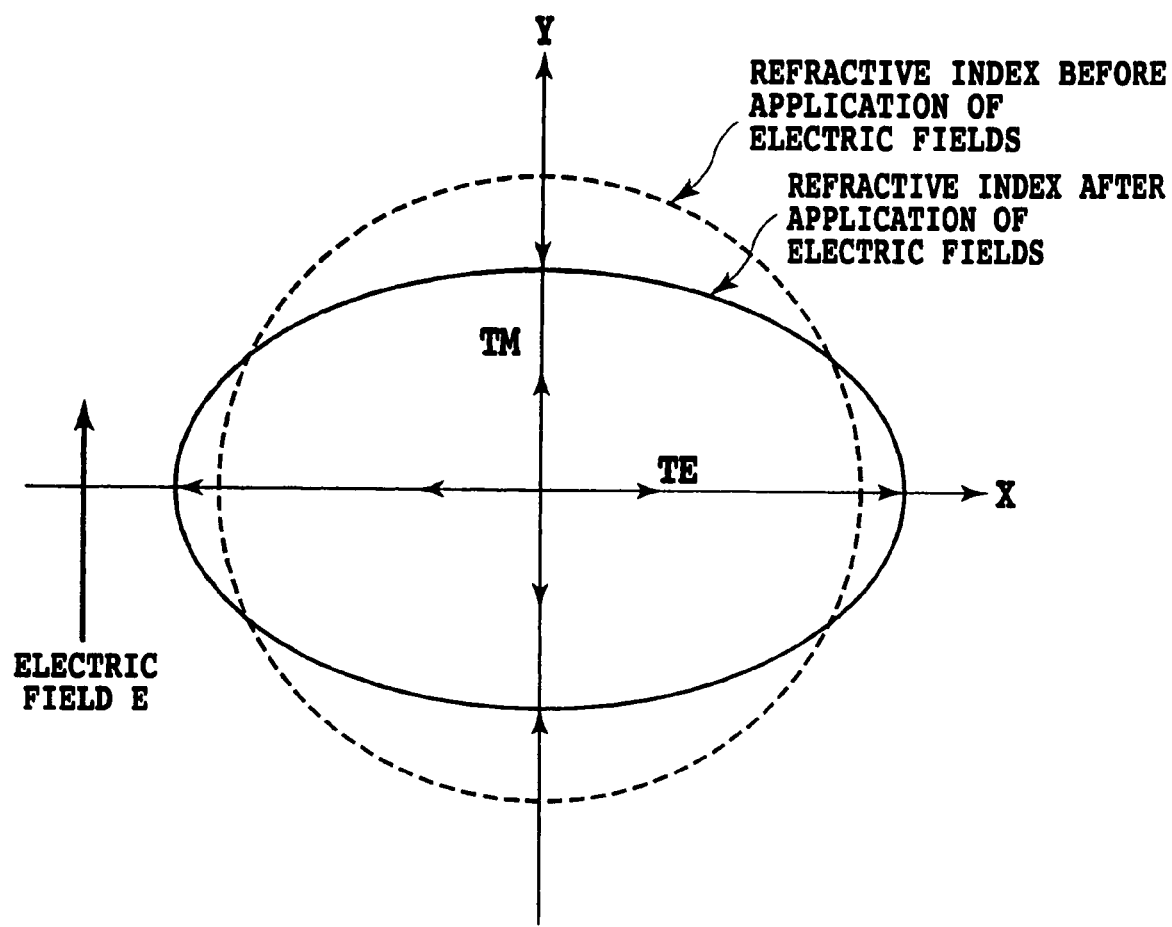
FIG. 4 is a diagram showing a variation in refractive index caused by application of electric fields in the phase modulating section in FIGS. 3A and 3B.

Electro-optic constants for the KTN and KLTN crystals are $g_{11}=0.136$ m$^4$/C$^2$ and $g_{12}=-0.038$ m$^4$/C$^2$, respectively. Thus, application of electric fields reduces the refractive index in a direction parallel to the electric fields. Application of electric fields increases the refractive index in a direction perpendicular to the electric fields. Moreover, the amount of changes in the refractive index in the direction parallel to electric fields is about threefold to fourfold larger than that in the direction perpendicular to electric fields. The refractive index in the direction orthogonal to the propagating direction of light varies before and after application of electric fields as shown in FIG. 4. Accordingly, in the phase modulating part 18, shown in FIG. 2, if two orthogonal electric fields are equal, a change in refractive index which is equal to the addition of Equations (1) and (2) equally occurs in both polarizations in the TE and TM directions, as shown in Equations (1) and (2). Thus, in the phase modulating part 18, the magnitude of phase modulation is independent of polarization. This indicates that the optical switch according to the present invention operates independently of polarization.

In the optical switch according to the present example, the thickness of the clad immediately below the electrode is sharply reduced in order to allow electric fields applied by the electrode to act effectively on the core through which light is guided. Moreover, in consideration of the containment of photoelectric fields, part or all of the electrode, particularly the electrode immediately above the core, is composed of a material that is transparent to a light of wavelength 1.55 μm (for example, ITO: Indium Tin Oxide). This enables applied electric fields to be applied to the core substantially without being dropped.

Each of the two types of electrodes shown in FIG. 2 has a length of 4 mm; the total length of both electrodes is 8 mm. The optical switch suffers an insertion loss of about 3 dB. Thus, an optical waveguide including a Mach-Zehnder interferometer produced using the KLTN crystal is low loss extremely.

Figure 5:
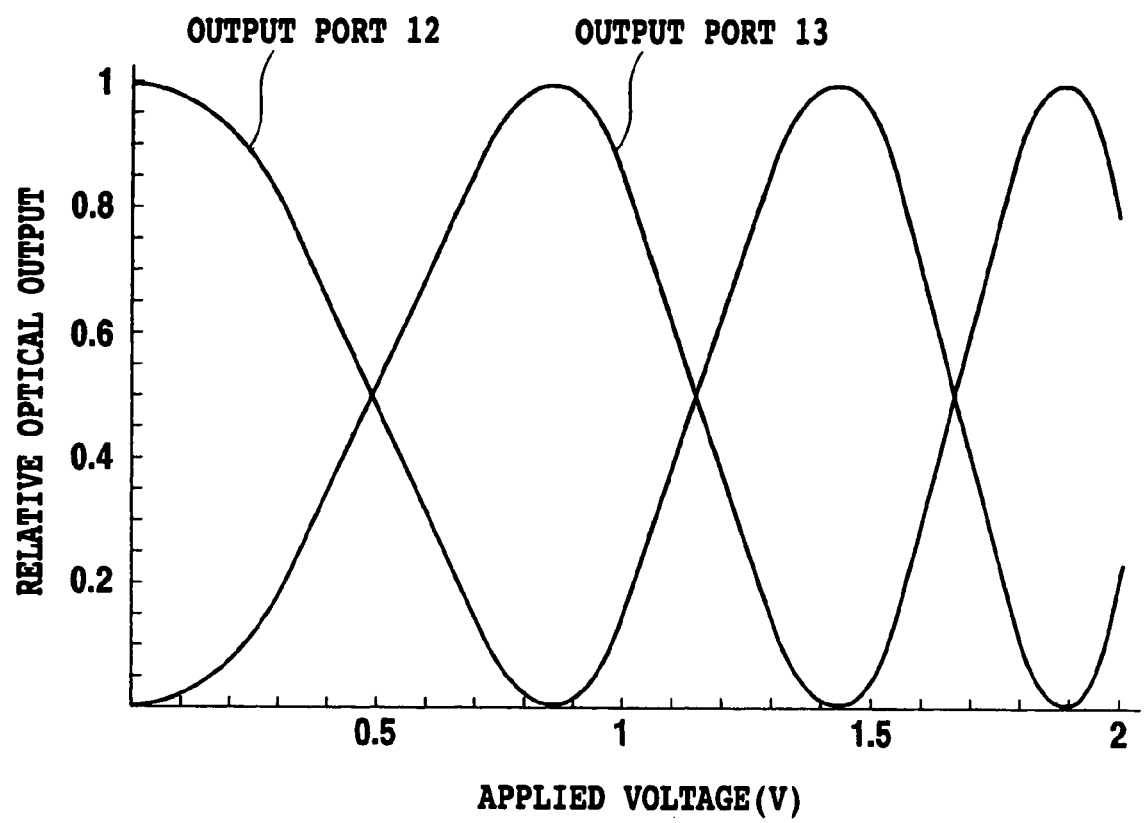
FIG. 5 is a graph showing the operational characteristic of the optical switch according to one embodiment of the present invention.

FIG. 5 is a graph showing the operational characteristic of the optical switch according to one embodiment of the present invention.

The graph shows the results of measurements of optical power outputted to the outputs 12 and 13 when the same bias electric fields (voltage) of 1 V are applied to the phase modulating sections 24 and 25 and the electric fields required for switching are applied. FIG. 5 indicates that the optical output is switched by the application of the electric fields (voltage). With the optical switch according to the present example, the use of the secondary electro-optic effect serves to increase the amount of changes in refractive index consistently with the magnitude of the applied electric fields (voltage). Thus, the magnitude of the electric fields (voltage) required to change the phase by π gradually decreases. With the configuration of the optical switch according to the present example and under driving conditions for it, the voltage ($V_\pi$) required for operations is 0.85 V and the switch has an extinction ratio of 32 dB; both values are favorable. Moreover, a switching speed measured by applying electric fields of rectangular waves to the switch is about 1.5 nsec. Accordingly, high-speed operations required for packet switching are possible.

In the present example, the KLTN crystal is used to facilitate the control of the refractive index. However, a similar optical switch can be produced using the KTN crystal. A driving voltage of 0.87 V, a switching speed of 1.2 nsec and polarization independent operations have been confirmed.

EXAMPLE 2

An optical switch according to the present example is configured so that the phase modulating section 24 of the phase modulating part 18, shown in FIG. 2, is provided in one of the optical waveguides (arm waveguides) of a Mach-Zehnder interferometer, while the phase modulating section 25 of the phase modulating part 18 is provided in the other optical waveguide. The remaining part of the configuration is almost the same as that of the optical switch according to Example 1. In the present example, an optical switch configured as described above was produced and its operations were checked.

With the configuration of the optical switch according to Example 1, electric fields are applied to only one of the arm waveguides of the Mach-Zehnder interferometer, so that a change in refractive index corresponds to the addition of Equations (1) and (2). As described in Example 1, the secondary electro-optic constants for the KTN and KLTN crystals have opposite signs in orthogonal directions. Consequently, the addition of Equations (1) and (2) eliminates the dependence of the refractive index on polarization but serves to reduce the amount of changes in refractive index.

Thus, in the optical switch according to Example 2, the phase modulating part 18 (see FIG. 2) is produced in both arm waveguides in order to allow a switching operation to be more effectively performed on applied electric fields. Then, the same electric fields are applied to the phase modulating section 24 of one of the arm waveguides and to the phase modulating section 25 of the other arm waveguide. When the optical output is switched, then conversely, the same electric fields are applied to the phase modulating section 25 of one of the arm waveguides and to the phase modulating section 24 of the other arm waveguide. This enables a push pull operation, and the change in refractive index corresponds to the difference between Equations (1) and (2). Consequently, switching is able to be realized by a further reduced voltage. In this case, the driving voltage $V_\pi$ is 0.53 V, and the other switching characteristics are similar to those of the optical switch according to Example 1. That is, clearly, the configuration of the present example enables the maintenance of the characteristics of the optical switch, that is, its high speed and polarization independence, while still enabling the optical switch to be driven by a reduced voltage.

EXAMPLE 3

Figure 6:
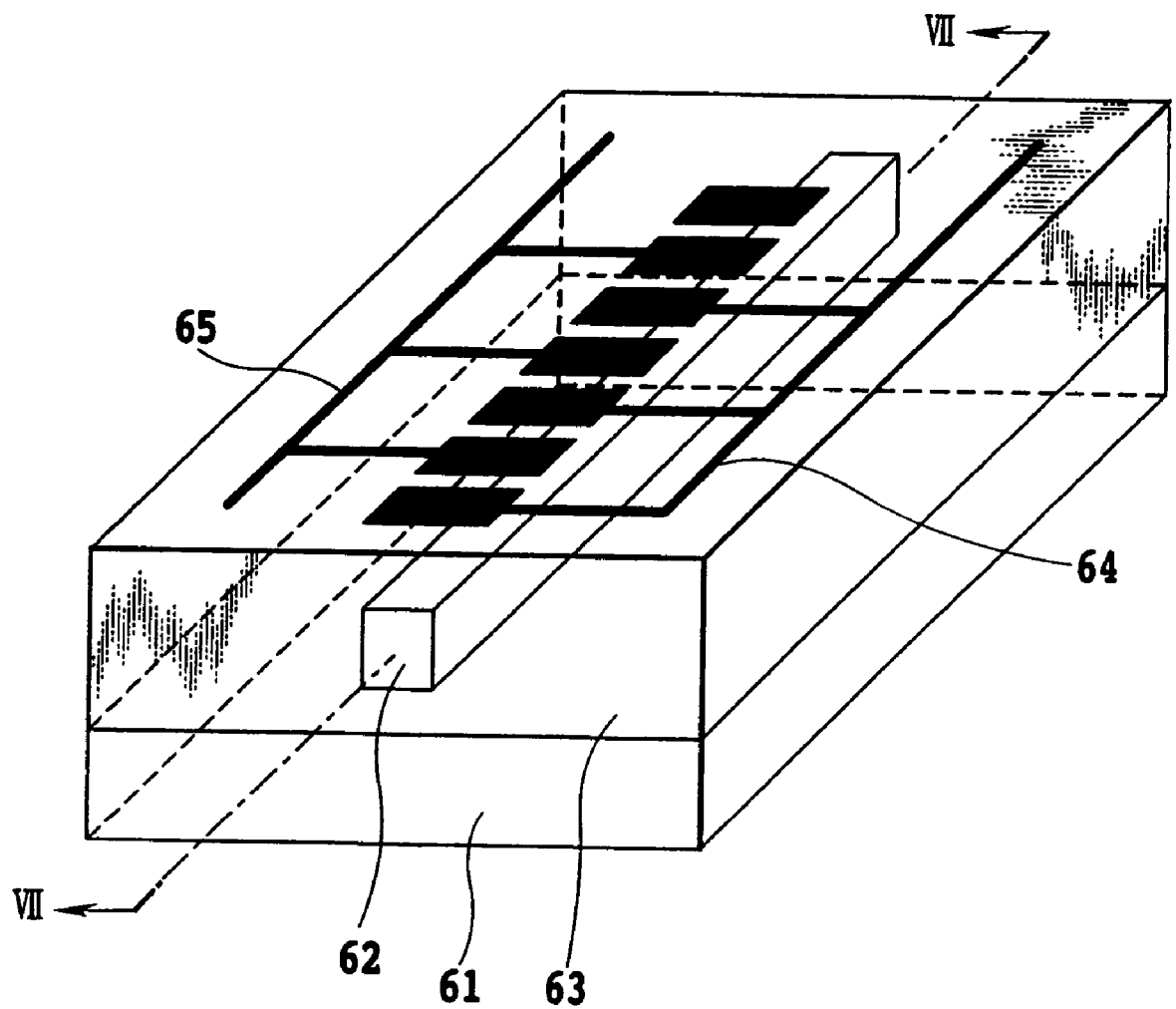
FIG. 6 is a diagram showing the configuration of a phase modulating part of the optical switch according to the present embodiment of the present invention.
Figure 7:
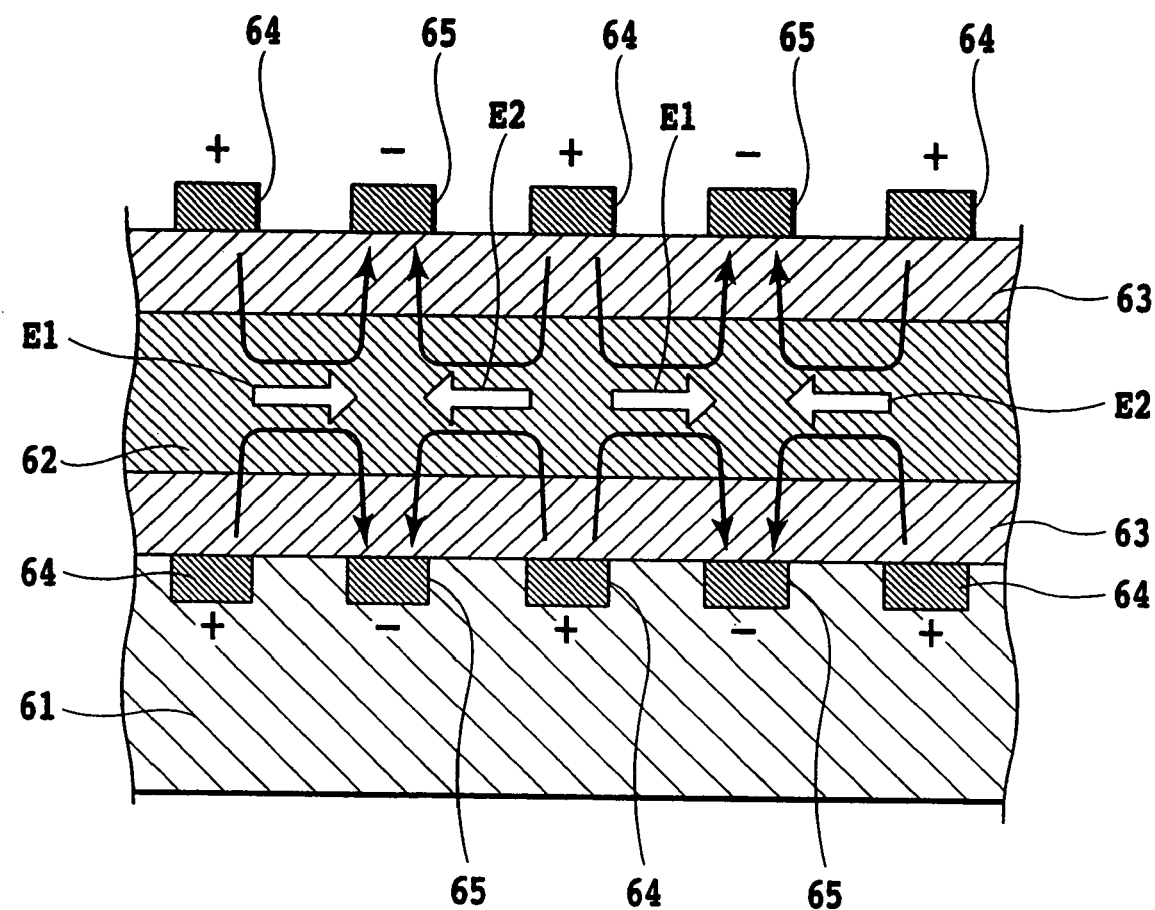
FIG. 7 is a sectional view taken along a line VII-VII in FIG. 6 and showing the directions of electric fields in the phase modulating part using a comb-shaped electrode.

FIG. 6 is a diagram of another example of the optical switch according to the present embodiment, showing the configuration of its phase modulating part. FIG. 7 is a sectional view taken along a line VII-VII in FIG. 6 and showing the directions of electric fields in the phase modulating part using a comb-shaped electrode.

The optical switch according to Example 3 comprises a Mach-Zehnder interferometer similarly to the optical switch according to Example 1. However, the major difference of the optical switch according to Example 3 from the optical switch according to Example 1 is that a comb-shaped electrode structure shown in FIG. 6 is used in the phase modulating part of an optical waveguide (arm waveguide).

As shown in FIGS. 6 and 7, the phase modulating part according to the present example constitutes a buried waveguide formed so that a core 62 is enclosed by a clad 63 formed on a substrate 61. Above the core 62, a comb-shaped electrode 64 and a ground electrode 65 which are shaped like comb are formed in a longitudinal direction of the core 62 so that their electrodes alternate with one another. Further, as shown in FIG. 7 (not shown in FIG. 6), a lower comb-shaped electrode 64 and a lower ground electrode 65 are formed at the interface between the substrate 61 and the clad 63 and opposite the upper comb-shaped electrode 64 and ground electrode 65.

A plurality of electric fields applied by the comb-shaped electrodes 64 and ground electrodes 65 are formed parallel to the direction in which light is propagated, as shown by electric fields E1 and E2 in FIG. 7. The adjacent electric fields E1 and E2 have alternately reversed orientations. The electrodes are produced so that the opposite comb-shaped electrodes 64 have the same polarity and that the opposite ground electrodes 65 have the same polarity. Consequently, electric fields orthogonal to the core are negated with only electric fields parallel to the core 62 remaining.

Figure 8:
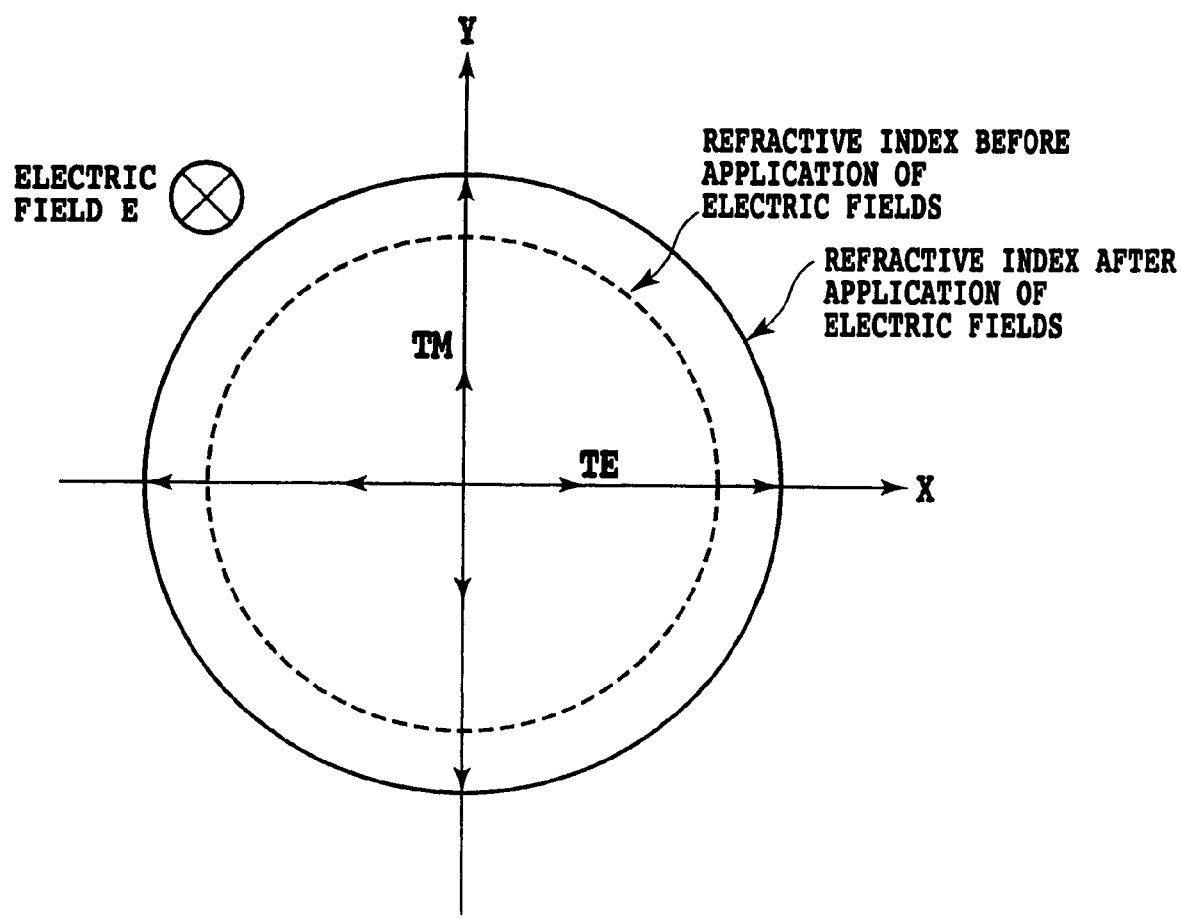
FIG. 8 is a diagram showing a variation in refractive index caused by application of electric fields in the phase modulating part in FIG. 7.

The refractive index in the direction orthogonal to the propagating direction of light varies before and after application of such electric fields as shown in FIG. 8. In Example 3, a variation in refractive index in the direction orthogonal to the propagating direction of light corresponds to a variation in refractive index in Equation (2). In other words, as is apparent from FIG. 8, the direction of the variation in refractive index is isotropic; the refractive index varies isotropically in response to polarization. This results in the independence of polarization.

The comb-shaped electrode structure in Example 3 is characterized by its ability to vary the refractive index in a fixed direction regardless of the directions of the electric fields in spite of the alternate reversal of the directions of the electric fields E1 and E2 as shown in FIG. 7. This is because the use of the secondary electro-optic effect enables the obtainment of a variation in refractive index proportional to the square of the absolute value for the electric fields regardless of the signs (directions) of the electric fields. This is a major advantage of the use of the secondary electro-optic effect, which enables the use of the comb-shaped electrodes.

Moreover, with the comb-shaped electrodes, a change in the pitch of the comb-shaped electrodes advantageously enables the magnitude of the electric fields to be changed. A sandwich type electrode structure does not allow the interval between the electrodes to be reduced to a value equal to or smaller than the thickness of the optical waveguide. There is no other way but to apply a high voltage in order to increase the magnitude of the electric fields. However, in the comb-shaped electrodes, the positive and negative electrodes are present on the same plane. Accordingly, the interval between these electrodes can be arbitrarily changed. Thus, a reduction in the interval enables large electric fields to be obtained even with the same applied voltage. Specifically, even a low applied voltage enables large electric fields to be applied by using the comb-shaped electrodes in the dielectric crystal having the secondary electro-optic effect. Moreover, the refractive index can be varied in a fixed direction in spite of the alternate changes in the directions of the electric fields. This provides optical waveguides having a refractive index varying significantly uniformly in the propagating direction of light. Therefore, by using the phase modulating part with the comb-shaped electrode structure according to Example 3, in one (or both) of the arm waveguides of the Mach-Zehnder interferometer, it is possible to provide an optical switch which is independent of polarization and which can be driven by a low voltage.

A polarization independent optical switch can also be provided using an electrode structure forming electric fields in a direction which is parallel to the propagating direction of light and which only extends forward or backward along the propagating direction, instead of a comb-shaped electrode structure such as the one shown in Example 3.

In Example 3, the optical waveguide including the Mach-Zehnder interferometer is produced using a KTN crystal having a phase transition temperature almost equal to that used in Example 1. Further, the optical switch is produced using platinum for the lower electrode and ITO for the upper electrode. The electrodes can perform switching operations provided that they are conductive. If the thickness of the upper and lower clads is reduced to increase the efficiency of application of electric fields, light absorption by the electrode material can be suppressed by using transparent electrodes. This makes it possible to reduce the insertion loss. Further, if the phase modulating part has a length of 1 cm and the bias voltage is set at 1 V, the driving voltage $V_\pi$, for the optical switch according to the present example is 0.98 V and the extinction ratio is 35 dB; both values are favorable. The optical switch also operates independently of polarization.

The optical switches according to Examples 1 to 3 are operated by application of the bias voltage. With the circuit configurations of the optical switches, a modulation voltage required for switching can be easily superimposed on the bias voltage. Further, the use of the secondary electro-optic effect enables the amount of changes in refractive index in response to a change in electric fields to be increased by the application of the bias voltage. Thus, clearly, more efficient switching can be accomplished by applying such a bias voltage as does not impose any loads on a power supply circuit.

EXAMPLE 4

An optical switch according to Example 4 comprises a Mach-Zehnder interferometer similarly to the optical switch according to Example 1. Two arm waveguides are formed of the KLTN crystal, and a phase modulating part similar to that according to Example 1 is produced in both arm waveguides. However, an input-side 3-dB coupler and an output-side 3-dB coupler are made of silica on silicon waveguides. These materials are used, and the end surface of the KLTN crystal which is closer to the phase modulating part is polished and coated with AR. The end surface is joined to the input-side 3-dB coupler and output-side 3-dB coupler using an optical adhesive. An optical switch is thus constructed.

The driving voltage for and the switching speed of the optical switch according to Example 4 are almost the same as those in Example 1. However, the insertion loss and the extinction ratio are improved and are 2.4 dB and 42 dB, respectively. This indicates that the 3-dB couplers made of the silica on silicon waveguide are a low loss and accomplish a higher accuracy than 3-dB couplers made of the KLTN crystal. Thus, clearly, a similar optical switch can be produced even if only the phase modulating part includes an optical waveguide consisting of the KTN or KLTN crystal, while the other parts includes a different optical waveguide made of silica on silicon waveguide or the like.

EXAMPLE 5

An optical switch according to Example 5 is configured similarly to the optical switch according to Example 1. However, the optical switch according to Example 5 differs from the optical switch according to Example 1 in that its optical waveguides are made of a BTO crystal or the like. An optical switch having such a configuration was produced and its operations were checked.

When the optical switch according to Example 5 is operated while controllably adjusting the temperature of the BTO waveguide part at 110° C., the driving voltage V, must be 1.5 V. Nevertheless, performance similar to that of the optical switch according to Example 1 can be accomplished. Further, the switching speed is at most 1 ns. Furthermore, the BTO and STO are mixed together in the ratio of 0.73:0.27 to produce waveguides consisting of the single crystal $Ba_{0.73}Sr_{0.27}TiO_3$. The waveguides are then used to produce a similar optical switch. In this case, at 10° C., the optical switch exhibits characteristics similar to those obtained using the BTO waveguides. Similar operations are able to be performed by an optical switch using PLZT as a material for the waveguides.

EXAMPLE 6

In Example 6, a 16×16 matrix switch is produced by densely integrating optical switches according to Example 2 together on a 4-inch substrate. The produced optical switches have a non-blocking configuration, and the number of optical switches is 256. The optical switch according to Example 6 operates independently of polarization and has an insertion loss of 8.5 dB and an extinction ratio of 43 dB. The driving voltage is 0.9 V and the power consumed for switching is 0.8 W. For the optical switch according to Example 6, charging and discharging corresponding to the electrostatic capacity of the switch part are repeated during switching. This results in power consumption corresponding to the switching speed. Specifically, if a continuous switching operation is performed at 1 GHz, the maximum power consumption is 0.8 W. Clearly, this power consumption is very low compared to the conventional optical switches.

EXAMPLE 7

In the present embodiment, the Mach-Zehnder interferometer type optical switches have been described. In Example 7, a directional coupler will be described.

Figure 9:
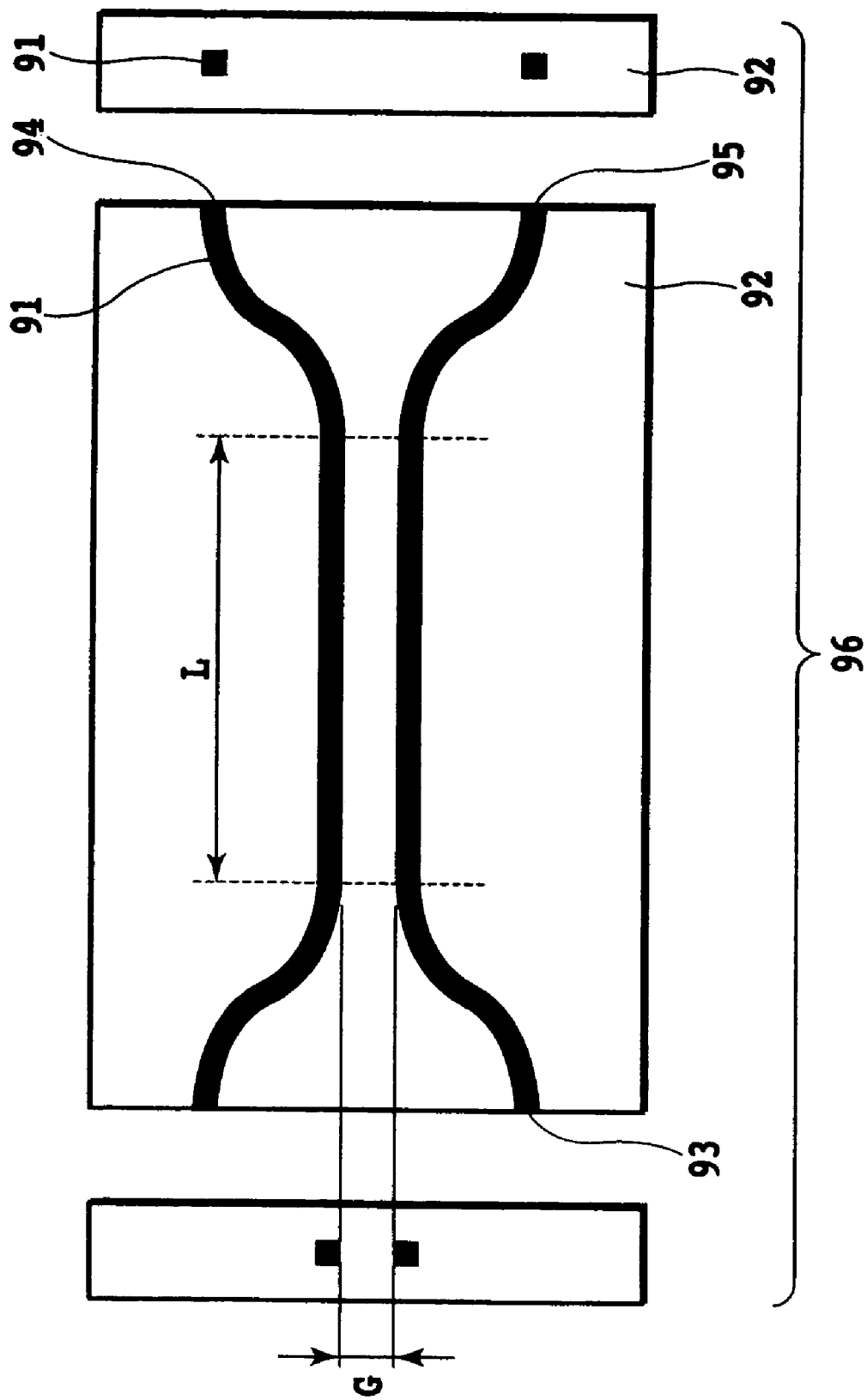
FIG. 9 is a diagram showing the configuration of the optical switch according to one embodiment of the present invention.

As shown in FIG. 9, in a waveguide type device according to Example 7, the KLTN crystal is used for both core 91 and clad 92 as a waveguide material. Optical waveguides with a difference in specific refractive index of 0.5% are provided by adjusting the concentrations of Li and Nb in the above material. Core ridges are processed by lithography and dry etching so as to have a size of about 6×6 μm.

Example 7 comprises a directional coupling type optical branching element 96. When light is inputted through an input port 93, mode coupling occurs between the two waveguides in an interaction area to shift energy. By adjusting the gap G between the cores and the interaction area L, it is possible to provide an element having a branching ratio of 1:1, that is, a 3-dB coupler.

Figure 10:
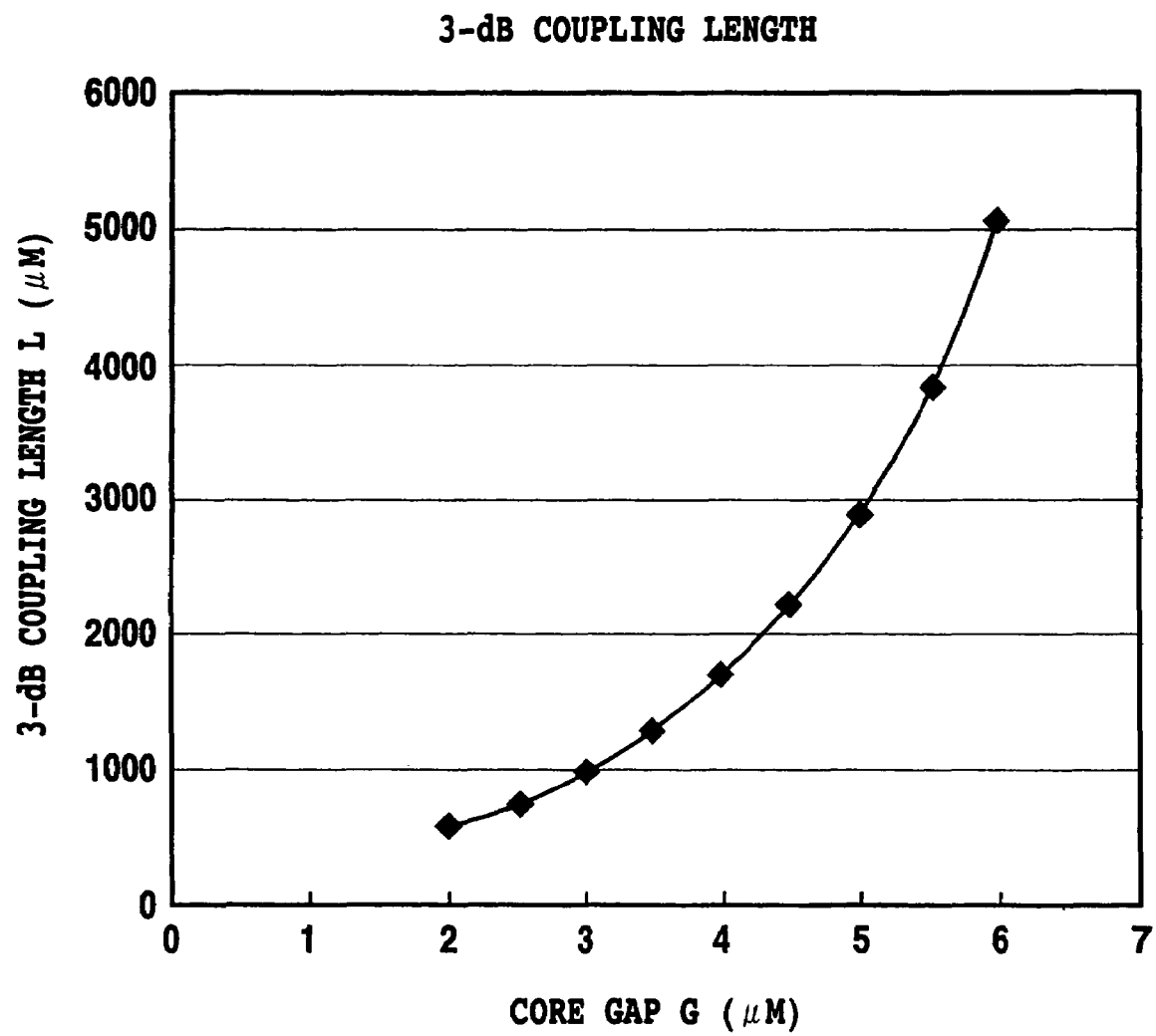
FIG. 10 is a graph showing typical conditions under which a directional coupling type optical branching element has a branching ratio of 1:1 according to one embodiment of the present invention.

A plurality of directional coupling type optical branching elements were produced which had different core gaps G and interaction lengths L. A light of wavelength 1.55 μm was inputted through the input port 93. Then, the intensities of output lights from output ports 94 and 95 were measured. FIG. 10 shows typical conditions under which the branching ratio is 1:1. FIG. 10 shows that the produced directional coupling type optical branching element has an excess loss of at most about 0.1 dB. This is an excellent optical characteristic.

EXAMPLE 8

Figure 11:
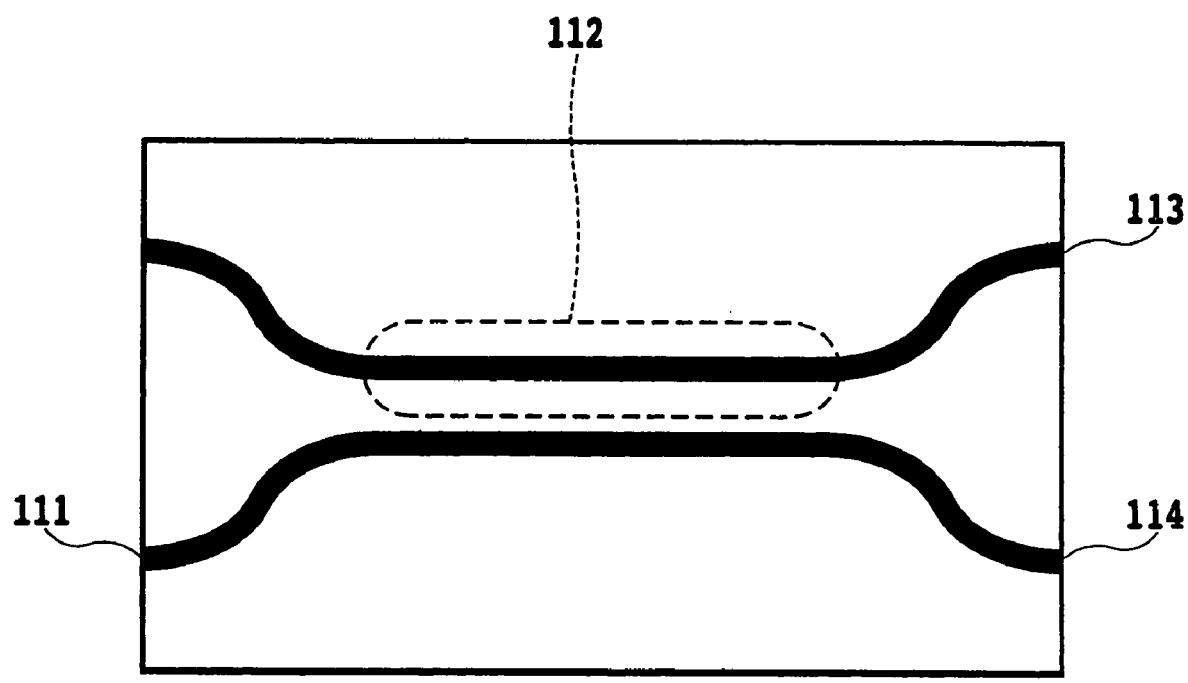
FIG. 11 is a diagram showing the configuration of a branching ratio variable waveguide type branching element according to one embodiment of the present invention.

In the directional coupler according to Example 7, an electrode (not shown) is formed immediately above one of the waveguides to produce a branching ratio variable waveguide type branching element. FIG. 11 shows the structure of the branching ratio variable waveguide type branching element.

In the waveguide type branching element according to Example 8, as shown in FIG. 11, when light is inputted through an input port 111, then in a phase modulating part 112, the inputted light shifts to the other optical waveguide and then back to the original optical waveguide. On this occasion, a bias voltage is applied to allow all the light to be outputted to an output port 114. If electric fields for controlling the branching ratio are applied to the optical waveguides in the phase modulating part 112 (the waveguide is turned on), the application of electric fields by the phase modulating part 112 changes the effective refractive index of one of the waveguides. This results in a difference in propagation constant between the two waveguides to cause a mismatch in phase. When the electric fields for controlling the branching ratio are used to change the amount of mismatch in phase, the optical output shifts to an output port 113 to change the branching ratio.

Figure 12:
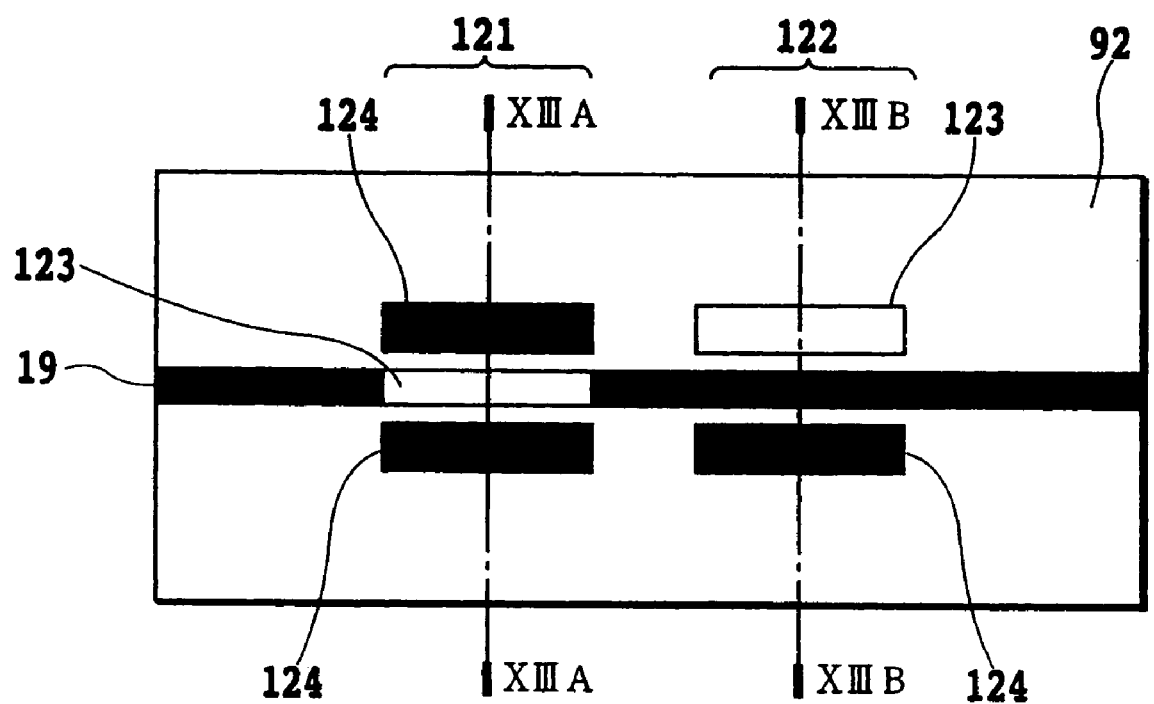
FIG. 12 is a diagram showing the configuration of a phase modulating part formed in one of the optical waveguides of a directional coupler shown in FIG. 11.
Figure 13A:
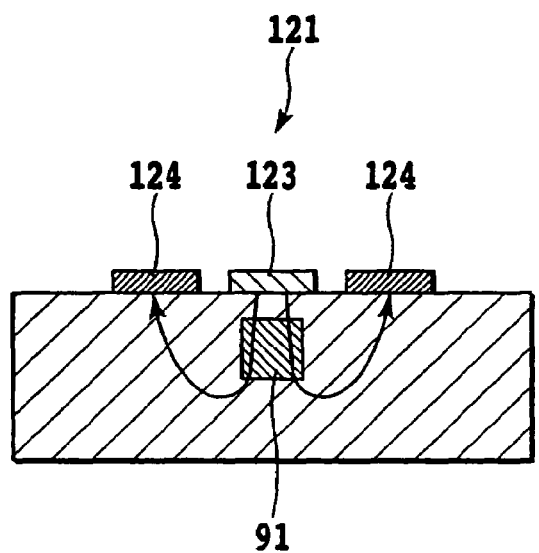
FIG. 13A is a sectional view taken along a line XIIIA-XIIIA in FIG. 12.
Figure 13B:
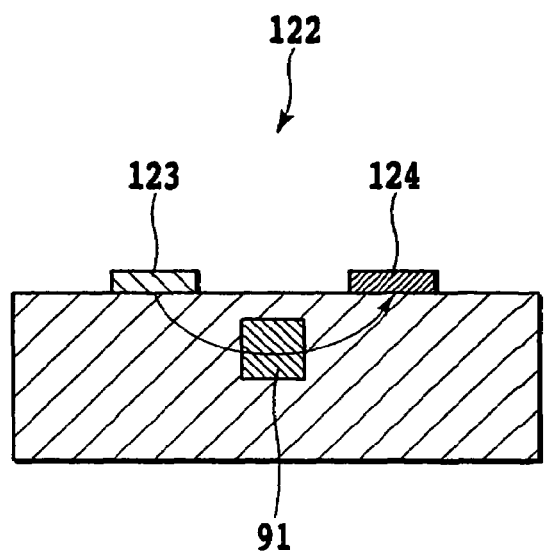
FIG. 13B is a sectional view taken along a line XIIIB-XIIIB in FIG. 12.

FIG. 12 is a diagram showing the configuration of the phase modulating part 112, formed in one of the optical waveguides of the directional coupler shown in FIG. 11. FIG. 13A is a sectional view taken along a line XIIA-XIIA in FIG. 12. FIG. 13B is a sectional view taken along a line XIIB-XIIB in FIG. 12.

As shown in FIGS. 12, 13A, and 13B, the phase modulating section 112 comprises two phase modulating sections 121 and 122. The phase modulating sections have two different electrode structures. Specifically, in the phase modulating section 121, an electrode 123 is placed immediately above the core 91. Ground electrodes 124 are arranged on the respective sides of the electrode 123. In this electrode structure, electric fields are applied from the core 91 to the substrate (parallel to the TM direction of a propagating light) as shown in FIG. 13A. On the other hand, in the phase modulating section 122, the electrode 123 and the ground electrode 124 are arranged so as to sandwich the core 91 between them. Thus, as shown in FIG. 13B, electric fields are applied parallel to the substrate (parallel to the TE direction of the propagating light). This electrode structure enables electric fields to be applied in two directions orthogonal to the propagating direction of light and to each other.

That is, in accordance with Equations (1) and (2), in the phase modulating part 112, shown in FIG. 11, if two orthogonal electric fields are equal, a change in refractive index which is equal to the addition of Equations (1) and (2) equally occurs in both polarizations in the TE and TM directions. Thus, in the phase modulating part 112, the magnitude of phase modulation is independent of polarization. Therefore, the optical switch according to the present embodiment performs a branching ratio variable operation independently of polarization.

Each of the two types of electrodes shown in FIG. 2 has a length of 4 mm; the total length of both electrodes is 8 mm. The optical switch suffers an insertion loss of about 2.5 dB. Thus, an optical waveguide including a directional coupler produced using the KLTN crystal is low loss extremely.

Figure 14:
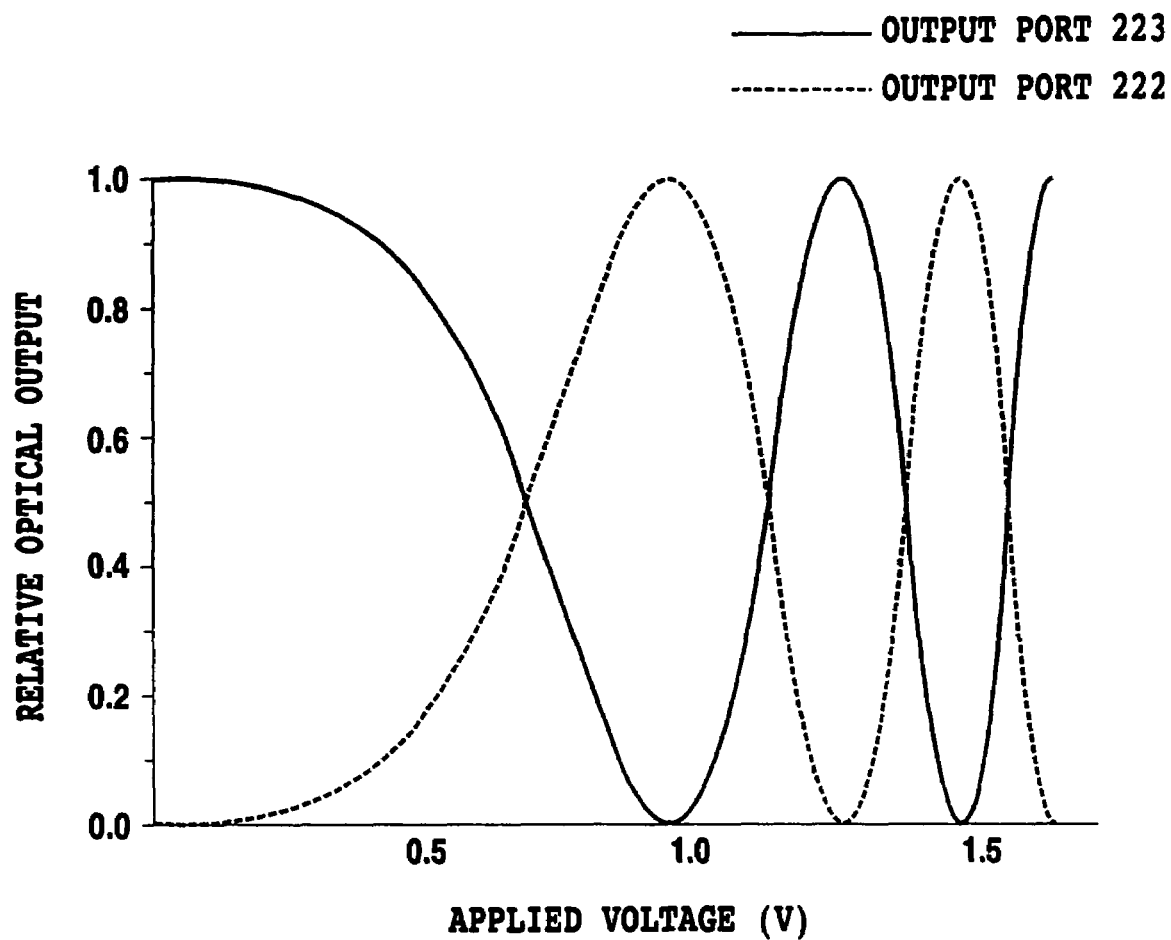
FIG. 14 is a graph showing the operational characteristic of the optical switch according to one embodiment of the present invention.

FIG. 14 is a graph showing the branching characteristic of the optical switch according to the present embodiment. The graph shows the results of measurements of optical power outputted to the outputs 113 and 114 when the same bias electric fields (voltage) of 3 V are applied to the phase modulating sections 121 and 122, and the electric fields required to change the branching ratio are applied. FIG. 14 indicates that the optical output is switched by the application of the electric fields. The waveguide type device according to Example 8 can vary the branching ratio and has a switching function. According to Example 8, the use of the secondary electro-optic effect serves to increase the amount of changes in refractive index consistently with the magnitude of the applied electric fields. Thus, the magnitude of the electric fields (voltage) required for a switching operation gradually decreases. With the configuration of the optical switch according to the present example and under driving conditions for it, the voltage required for the switching operation is 0.95 V and the switch has an extinction ratio of 30 dB; both values are favorable. Moreover, the switching speed measured by applying electric fields of rectangular waves to the switch is about 2 nsec. Accordingly, the optical switch according to the present example enables high-speed operations required for packet switching.

In Example 8, the KLTN crystal is used, but a similar optical switch can be produced using the KTN crystal. A driving voltage of 0.97 V, a switching speed of 1.7 nsec and polarization-independent operations have been confirmed. The electrode configuration for phase modulation was composed of two phase modulating sections as shown in FIGS. 13A and 13B. However, polarization independent operations were confirmed even when a configuration with a comb-shaped electrode was used.

EXAMPLE 9

Figure 15:
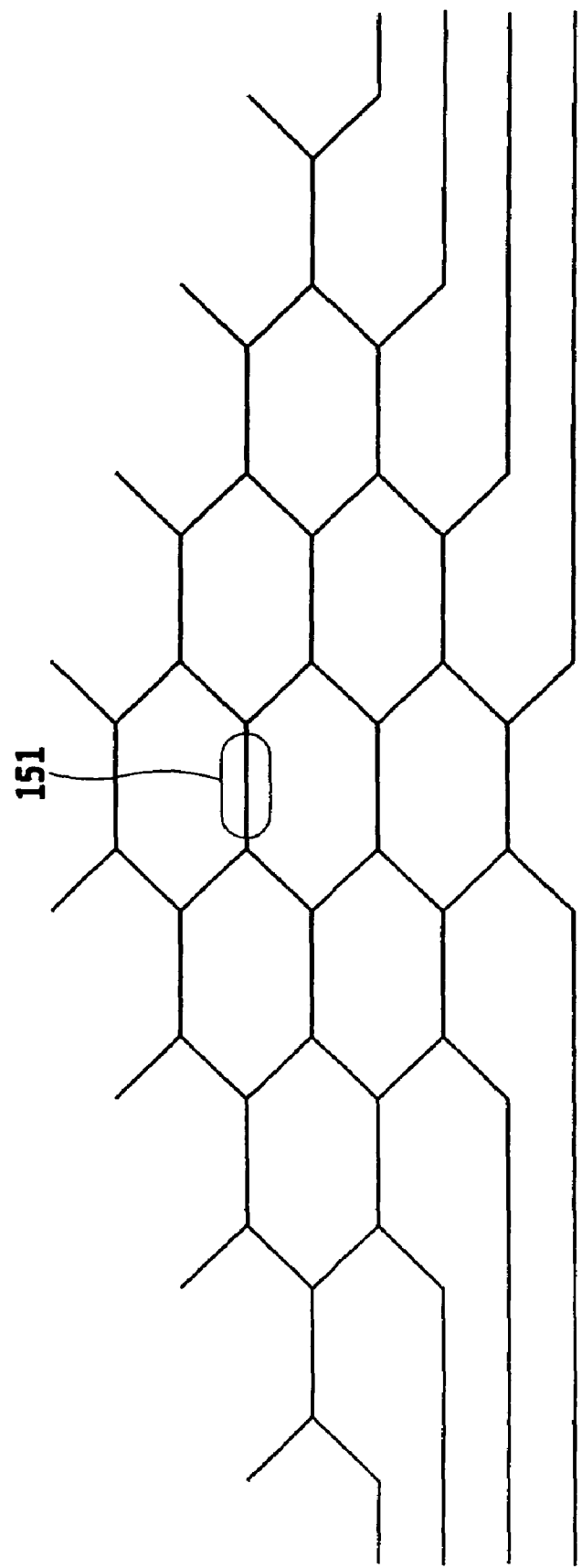
FIG. 15 is a schematic diagram of a 16×16 matrix switch according to one embodiment of the present invention.

In Example 9, a 16×16 matrix switch is produced by densely integrating optical switches according to Example 8 together on a 4-inch substrate. The produced optical switches have a non-blocking configuration, and the number of optical switches is 256. FIG. 15 shows 16 elements 151. Each of the elements 151 is an optical switch using the directional coupler shown in FIG. 11. This optical switch operates independently of polarization and has an insertion loss of 8.0 dB and an extinction ratio of 45 dB. The driving voltage is 0.90 V and the power consumed for switching is 0.83 W.

For the present optical switch, charging and discharging corresponding to the electrostatic capacity of the switch part are repeated during switching. This results in power consumption corresponding to the switching speed. Specifically, if a continuous switching operation is performed at 1 GHz, the maximum power consumption is 0.8 W. This power consumption is very low compared to the conventional optical switches.

The optical switches according to the first embodiment may comprise a temperature controller in order to allow the KTN, KLTN, or the like to operate near a Curie transition temperature. The temperature controller may be a Peltier element.

As described above, according to the first embodiment, by using the KTN crystal, the KLTN crystal, or the like as optical waveguides, it is possible to provide an optical switch which can operate at high speed independently of polarization and which can be driven by a reduced voltage compared to the prior art. Since the optical switch can be driven by a reduced voltage, an expensive power source operating at high speed is not required. Instead, the optical switch can be driven directly using an IC or the like. Further, the optical switches according to the first embodiment can be inexpensively produced as high-density switch boards using an integrated circuit or a board implementation or the like. Moreover, the optical switches according to the first embodiment can be formed into a matrix. A large-scale matrix switch can thus be constructed. Therefore, the optical switches according to the first embodiment are useful as core switches for optical packet routers.

Second Embodiment

Figure 16:
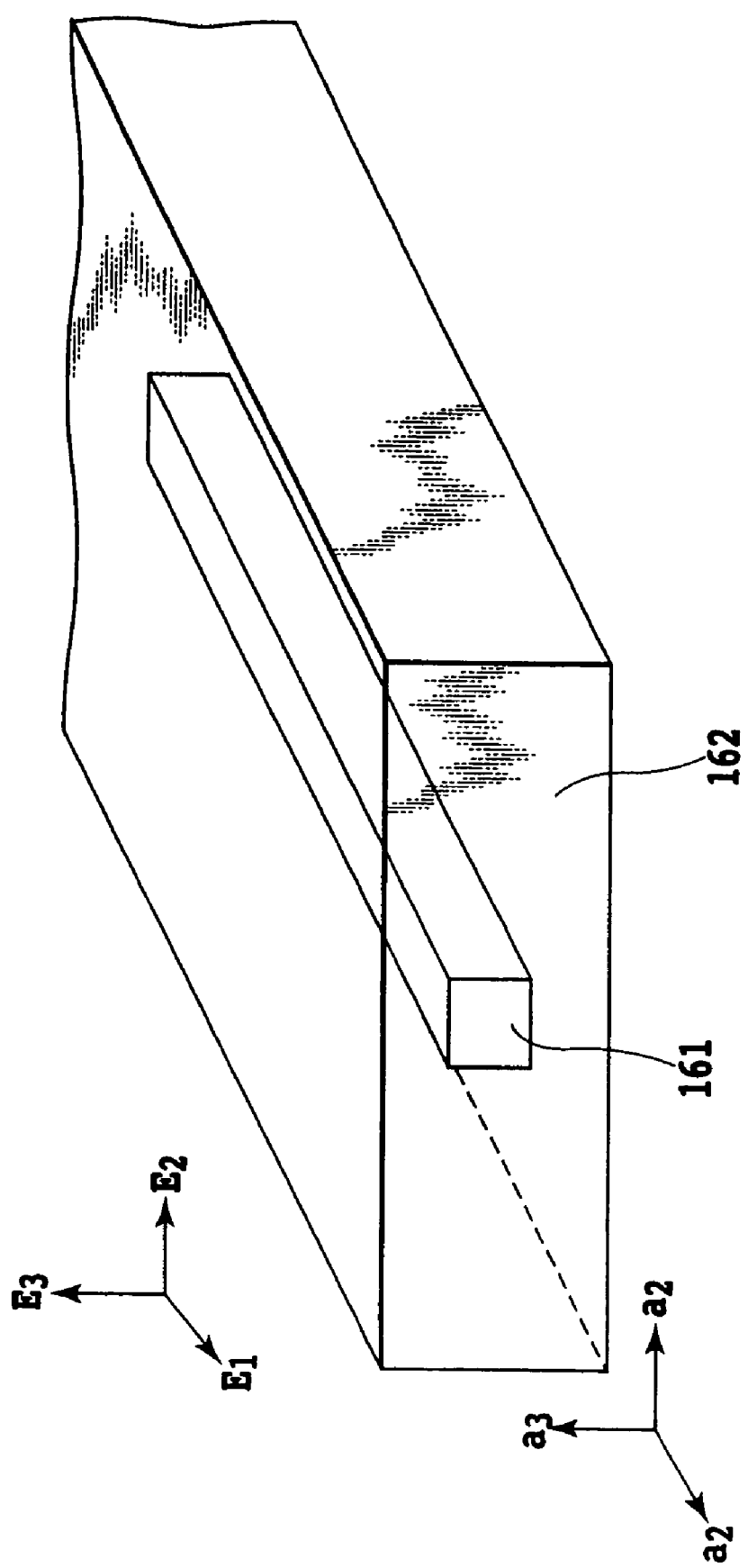
FIG. 16 is a diagram showing the configuration of a waveguide according to one embodiment of the present invention.

According to a second embodiment, a digital optical switch is constructed using optical waveguides based on the KTN crystal. For example, as shown in FIG. 16, a buried three-dimensional optical waveguide is used in which a core 161 includes a KTN or KLTN, whereas a clad layer 162 includes a KTN or KLTN having a slightly smaller refractive index than that of the core 161. Although not shown in FIG. 16, the buried three-dimensional waveguide is placed on a $KTaO_3$ (KT), $KNbO_3$(KN), or KTN substrate.

Figure 17:
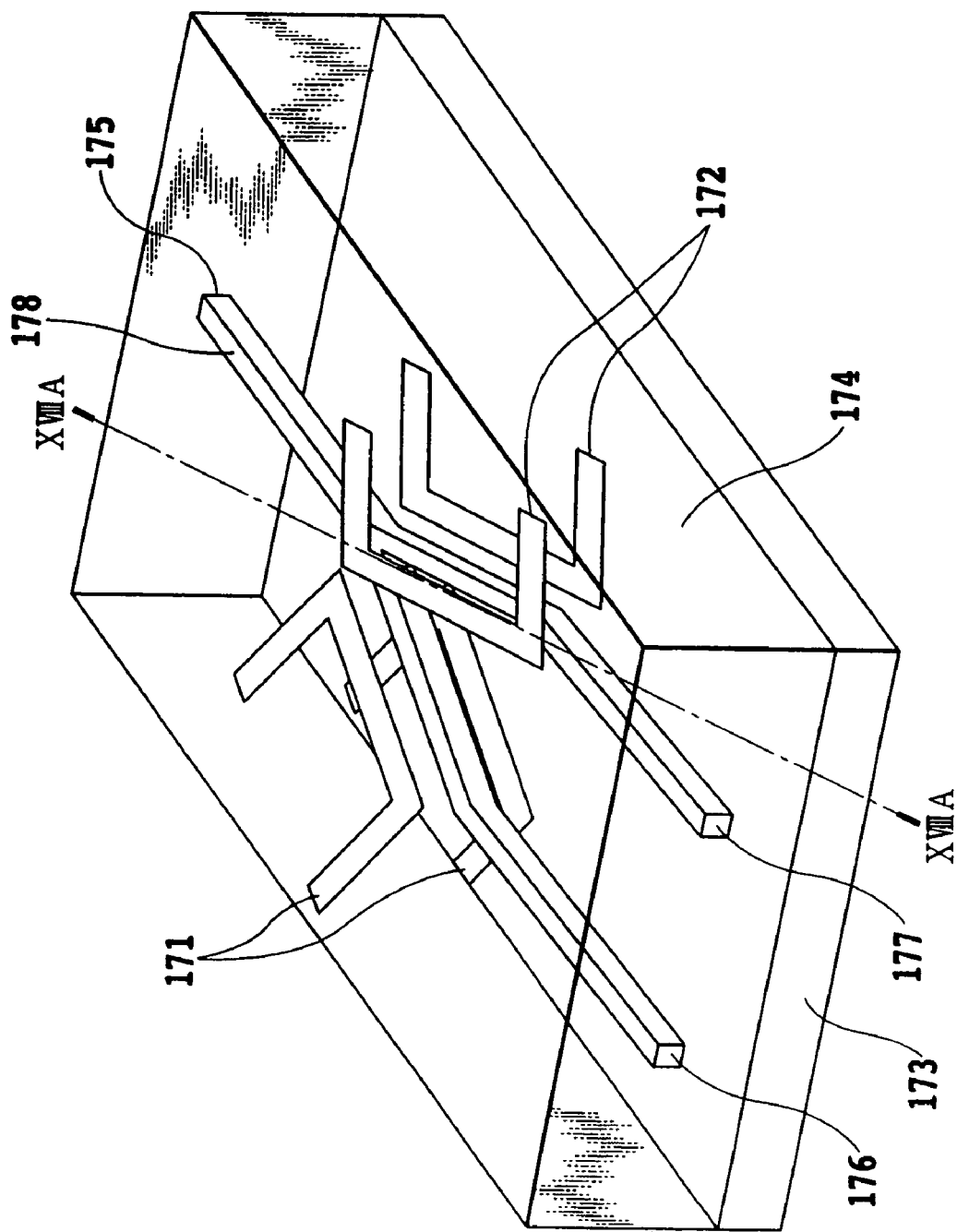
FIG. 17 is a diagram showing the configuration of a 1×2 digital optical switch according to one embodiment of the present invention.

FIG. 17 shows a 1×2 digital optical switch utilizing such a buried three-dimensional optical waveguide. In this optical switch, comb-shaped electrodes are arranged below a lower clad and above an upper clad, respectively, in order to apply the electric field $E_1$ only in the direction of wave guiding.

Specifically, as a buried three-dimensional optical waveguide consisting of a core 178 and a clad layer 174, a Y branching optical waveguide is constructed in which one input optical waveguide (input port) 175 branches to two output waveguides (output ports) 176 and 177. Comb-shaped electrodes 171 and 172 are arranged below the lower clad layer 174 and above the upper clad layer 174 and along parts of the output waveguides 176 and 177 which are near the Y branch; the comb-shaped electrodes 171 and 172 provide electric fields to the core 178.

Such a digital optical switch can undergo the same change in refractive index in both TE and TM directions as described later. This enables the polarization dependence to be eliminated. The KTN used in the present embodiment is a dielectric crystal material having a cubic crystal structure at the Curie temperature or higher. Then, when external electric fields $E_1$, $E_2$, and $E_3$ are applied in the directions of crystal axes $a_1$, $a_2$, and $a_3$ as shown in FIG. 16, the secondary electro-optic effect is exhibited.

When the crystal is cubic, the dependence of the refractive index in each of a TE and TM modes on the electric fields can be described as shown below when the $E_2$ or $E_3$ is zero.

$$n_{TE} = n_0 - 0.5 n_0^3 \epsilon_0^2 \epsilon_a^2 (g_{12} E_1^2 + g_{11} E_2^2) - 0.5 n_0^3 g_{12} \epsilon_0^2 \epsilon_a^2 E_3^2$$

$$n_{TM} = n_0 - 0.5 n_0^3 \epsilon_0^2 \epsilon_a^2 g_{12} (E_1^2 + E_2^2) - 0.5 n_0^3 g_{11} \epsilon_0^2 \epsilon_a^2 E_3^2 \quad (3)$$

$$(g_{11} > 0, g_{12} < 0)$$

In these equations, $n_0$ denotes the refractive index of the KTN or KLTN obtained before application of electric fields. $g_{11}$ and $g_{12}$ denote the nonlinear constants for the KTN and KLTN. $\epsilon_a$ denotes the relative dielectric constant for the KTN and KLTN. The directions of the electric fields $E_1$, $E_2$, and $E_3$ correspond to the electric fields in the directions of the principal axes of the core 161, shown in FIG. 16. When the $E_2$ or $E_3$ is zero, the principal axe of the index ellipsoid does not change. This prevents a mode conversion. Further, when the $E_3$ is not zero, since the $g_{11}$ and $g_{12}$ have different signs, the refractive index varies in different directions.

$n_{TE}$ decreases consistently with increasing $E_3$. On the other hand, since $n_{TM}$ increases consistently with $E_3$, resulting in the polarization dependency of switch operations. Thus, when only the electric field $E_1$ in the direction of wave guiding are applied, a change in refractive index can be given by the same equation for both modes. This enables the polarization dependency to be eliminated.

$$n_{TE} = n_0 - 0.5 n_0^3 \epsilon_0^2 \epsilon_a^2 g_{12} E_1^2$$

$$n_{TM} = n_0 - 0.5 n_0^3 \epsilon_0^2 \epsilon_a^2 g_{12} E_1^2 \quad (4)$$

($g_{11} > 0$, $g_{12} < 0$)

Thus, for application of only the electric field $E_1$ in the direction of wave guiding, the comb-shaped electrodes 171 and 172 are arranged above and below the output ports 176 and 177, which serve as the core 178, as shown in FIG. 17.

FIG. 18A is a sectional view of a Y branching waveguide in which the comb-shaped electrodes 171 and 172 are arranged. FIG. 18B is a plan view of the comb-shaped waveguide.

As shown in FIG. 18A, a buried three-dimensional optical waveguide consisting of a clad layer 184 and a core 182 is placed on a substrate 183. Comb-shaped electrodes 181 are arranged above the upper clad layer 184 and below the lower clad layer 184, respectively. As shown in FIG. 18B, in the comb-shaped electrodes 181, positive poles 181a and negative poles 181b are alternately arranged at fixed intervals. The poles of one of the polarities in the upper comb-shaped electrodes are arranged opposite the corresponding poles of the same polarity in the lower comb-shaped electrodes.

Thus, the electric field $E_3$, penetrating the core 182, is ideally zeroed when electric field components from the upper and lower comb-shaped electrodes 181 negate one another. Consequently, the comb-shaped electrodes according to the present example enables the electric field $E_1$ to be effectively applied only in the direction of wave guiding. Moreover, the effect of the electric fields according to the present invention is proportional to the square of the electric fields because the secondary electro-optic effect is utilized. Therefore, the switch can be operated with a reduced power consumption by pre-applying a DC bias voltage to the two output ports 176 and 177 and using a switch operation to apply a voltage only to the output port 176 or 177 to which the optical path is to be switched.

Figure 19:
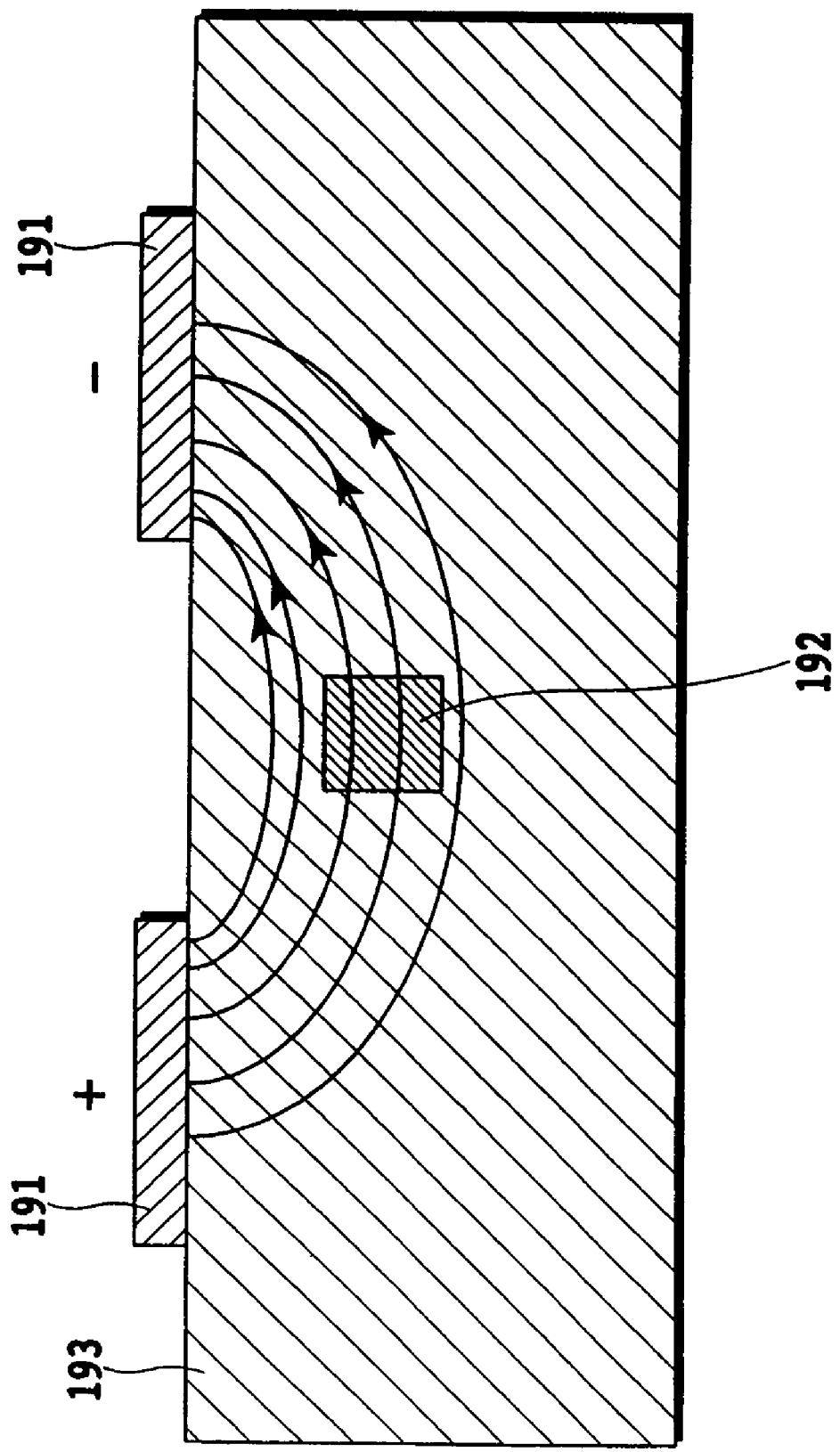
FIG. 19 is a diagram illustrating a method of applying electric fields (parallel to a substrate) according to one embodiment of the present invention.

On the other hand, as shown in FIG. 19, a positive and negative electrodes 191 are arranged on a surface of an upper clad layer 193 to the right and left of a core 192 and a voltage is applied perpendicularly to the direction of wave guiding. Then, an electric field $E_2$ is mainly generated in a direction which is parallel to the substrate and which traverses the core 192. In this case, a change in refractive index can be expressed by the equation below. The $n_{TE}$ decreases, while the $n_{TM}$ increases.

$$n_{TE} = n_0 - 0.5 n_0^3 \epsilon_0^2 \epsilon_a^2 g_{11} E_2^2$$

$$n_{TM} = n_0 - 0.5 n_0^3 \epsilon_0^2 \epsilon_a^2 g_{12} E_2^2 \quad (5)$$

($g_{11} > 0$, $g_{12} < 0$)

Figure 20:
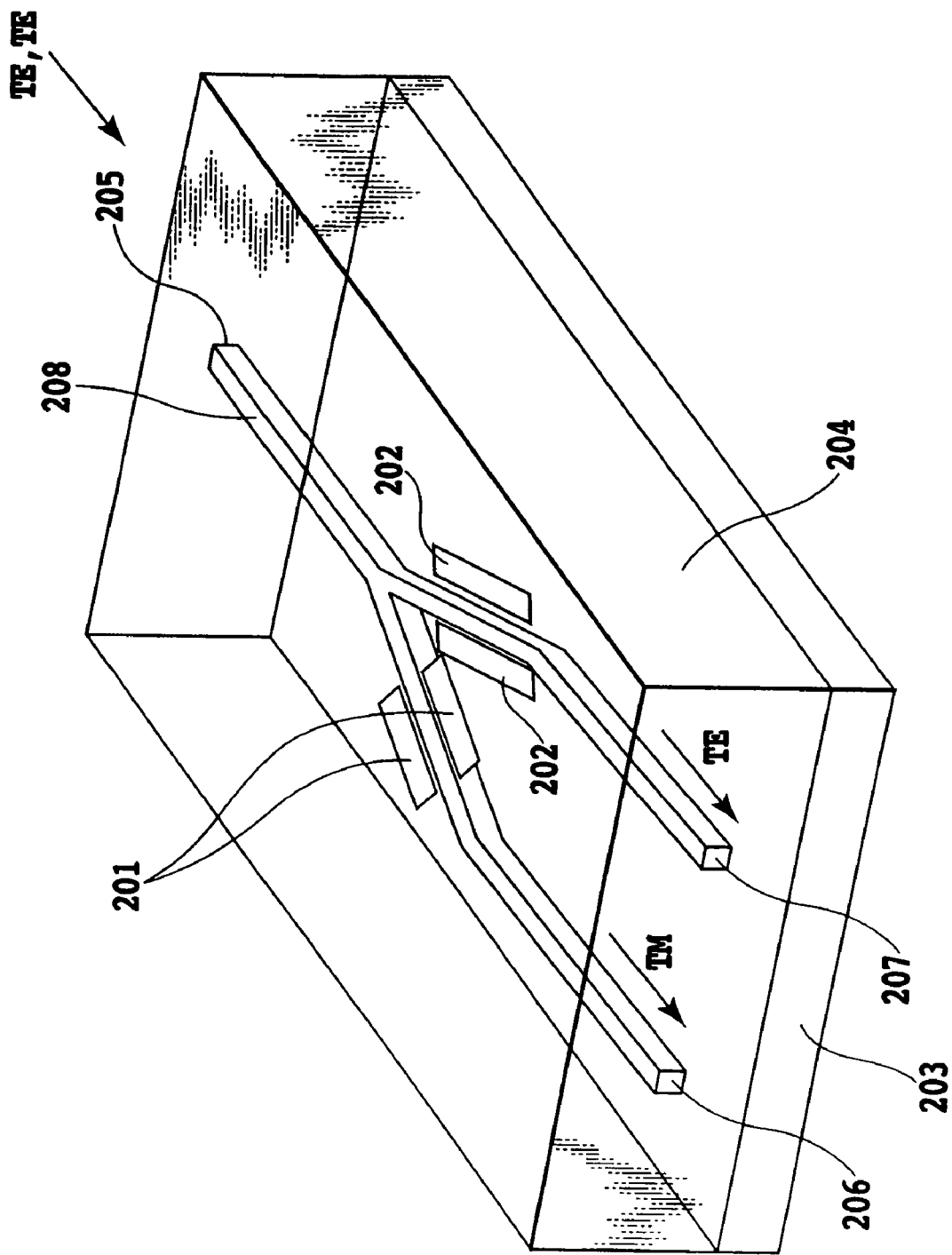
FIG. 20 is a diagram showing the configuration of a 1×2 polarization splitter (application of electric fields parallel to the substrate) according to one embodiment of the present invention.

FIG. 20 shows a 1×2 polarization splitter utilizing this principle. Specifically, as shown in FIG. 20, as a buried three-dimensional optical waveguide having a core 208 and a clad layer 204, a Y branching optical waveguide is placed on a substrate 203; in this waveguide, one input optical waveguide 205 branches to two output waveguides 206 and 207. On a surface of the clad layer 204, switching electrodes 201 and 202 are arranged near the Y branch and on the right and left sides of each of the output waveguides 206 and 207.

Accordingly, when a TM light and TE light are allowed to enter the input port 205 and a voltage is applied to one of the switching electrodes 201, an electric field $E_2$ is generated in a direction which is parallel to the substrate and which traverses the core 208. Thus, the TM light is outputted to the output port 206, whereas the TE light is outputted to the output port 207.

Therefore, a polarization splitter can be provided which can separate the TE mode from the TM mode.

FIGS. 21A and 21B show are schematic diagrams showing 1×2 polarization-independent optical switches in which five Y branching waveguides are combined together like a tree. Specifically, a first Y branching waveguide 211 branches one waveguide to two waveguides. A second and third waveguides 212 and 213 branch the two waveguides to four waveguides. Each of a fourth and fifth Y branching waveguides 214 and 215 couples a crossing waveguide and a linear waveguide together to form one waveguides. Further, a switching electrode is placed along an output waveguide of each of the Y branching waveguides 211 to 215. A voltage is actually applied to the electrodes shown in black in FIGS. 21A and 21B.

In FIG. 21A, the TM light and the TE light propagate through the respective optical paths shown by arrows. Both lights are finally outputted to the output port shown in the upper part of the figure. On the other hand, in FIG. 21B, the TM light and the TE light propagate through the respective optical paths shown by arrows. Both lights are finally outputted to the output port shown in the lower part of the figure.

FIGS. 22A and 22B are schematic diagrams showing 1×2 polarization-independent optical switches in which seven Y branching waveguides are combined together like a tree. Specifically, a first Y branching waveguide 221 branches one waveguide to two waveguides. A second and third waveguides 222 and 223 branch the two waveguides to four waveguides. A fourth Y branching waveguide 224 couples two waveguides together to form one waveguide. A fifth Y branching waveguide 225 branches this waveguide to two waveguides. Moreover, a sixth and seventh Y branching waveguides 226 and 227 couples the four waveguides together to form two waveguide. A switching electrode is placed along an output waveguide of each of the Y branching waveguides 221 to 227. A voltage is actually applied to the electrodes shown in black in FIGS. 22A and 22B.

In FIG. 22A, the TM light and the TE light propagate through the respective optical paths shown by arrows. Both lights are finally outputted to the output port shown in the upper part of the figure. On the other hand, in FIG. 22B, the TM light and the TE light propagate through the respective optical paths shown by arrows. Both lights are finally outputted to the output port shown in the lower part of the figure.

As described above, a polarization-independent optical switch can be provided by connecting multiple Y branching waveguides together. The smallest polarization-independent switch can be provided by connecting five to seven Y branching waveguides together like tree as shown in FIGS. 21A and 21B and 22A and 22B.

Figure 23:
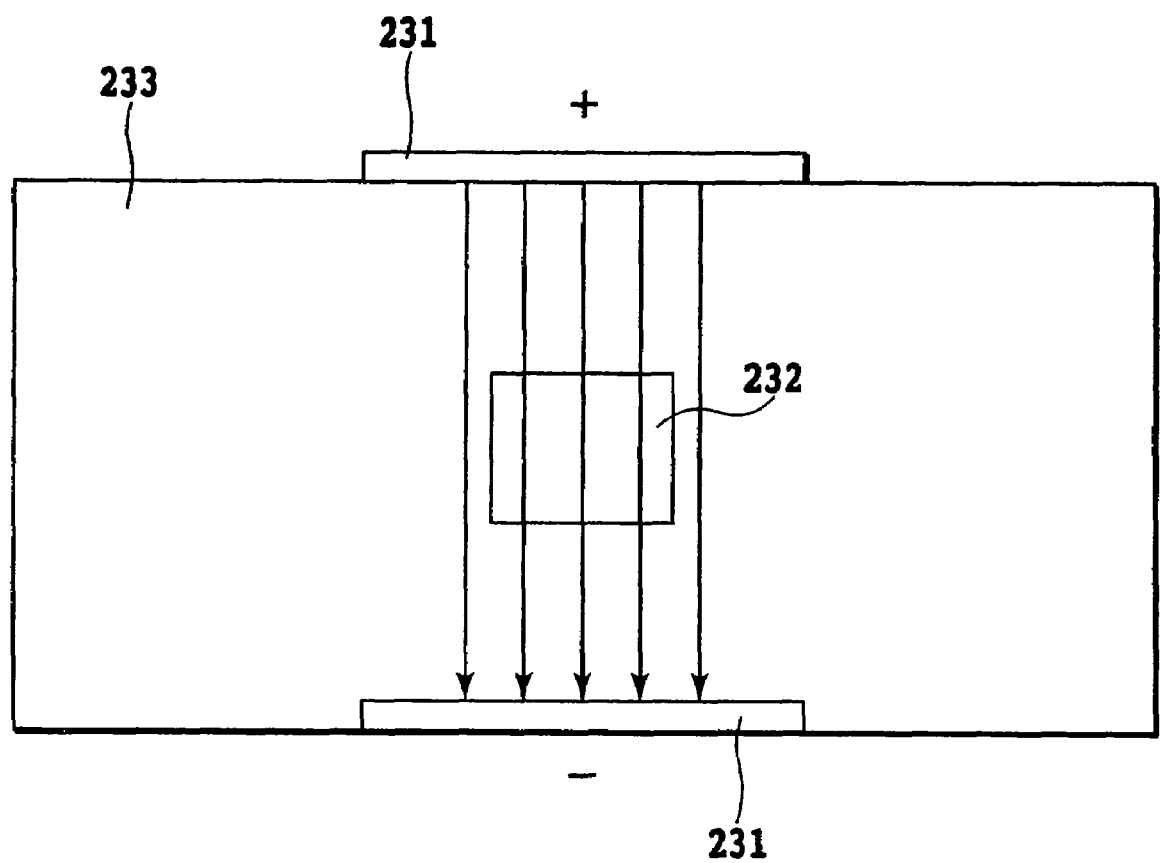
FIG. 23 is a diagram illustrating a method of applying electric fields (perpendicular to the substrate) according to one embodiment of the present invention.

On the other hand, as shown in FIG. 23, a positive and negative electrodes 231 are arranged below a lower clad layer 233 and above an upper clad layer 233, respectively. If a voltage is applied perpendicularly to the direction of wave guiding, an electric field $E_3$ is mainly generated in a direction which is perpendicular to the substrate and which traverses the core 232.

$$n_{TE} = n_0 - 0.5 n_0^3 g_{12} \epsilon_0^2 \epsilon_a^2 E_3^2$$

$$n_{TM} = n_0 - 0.5 n_0^3 g_{11} \epsilon_0^2 \epsilon_a^2 E_3^2 \quad (6)$$

($g_{11} > 0$, $g_{12} < 0$)

In this case, when electric fields are applied, the $n_{TE}$ increases, while the $n_{TM}$ decreases.

Figure 24:
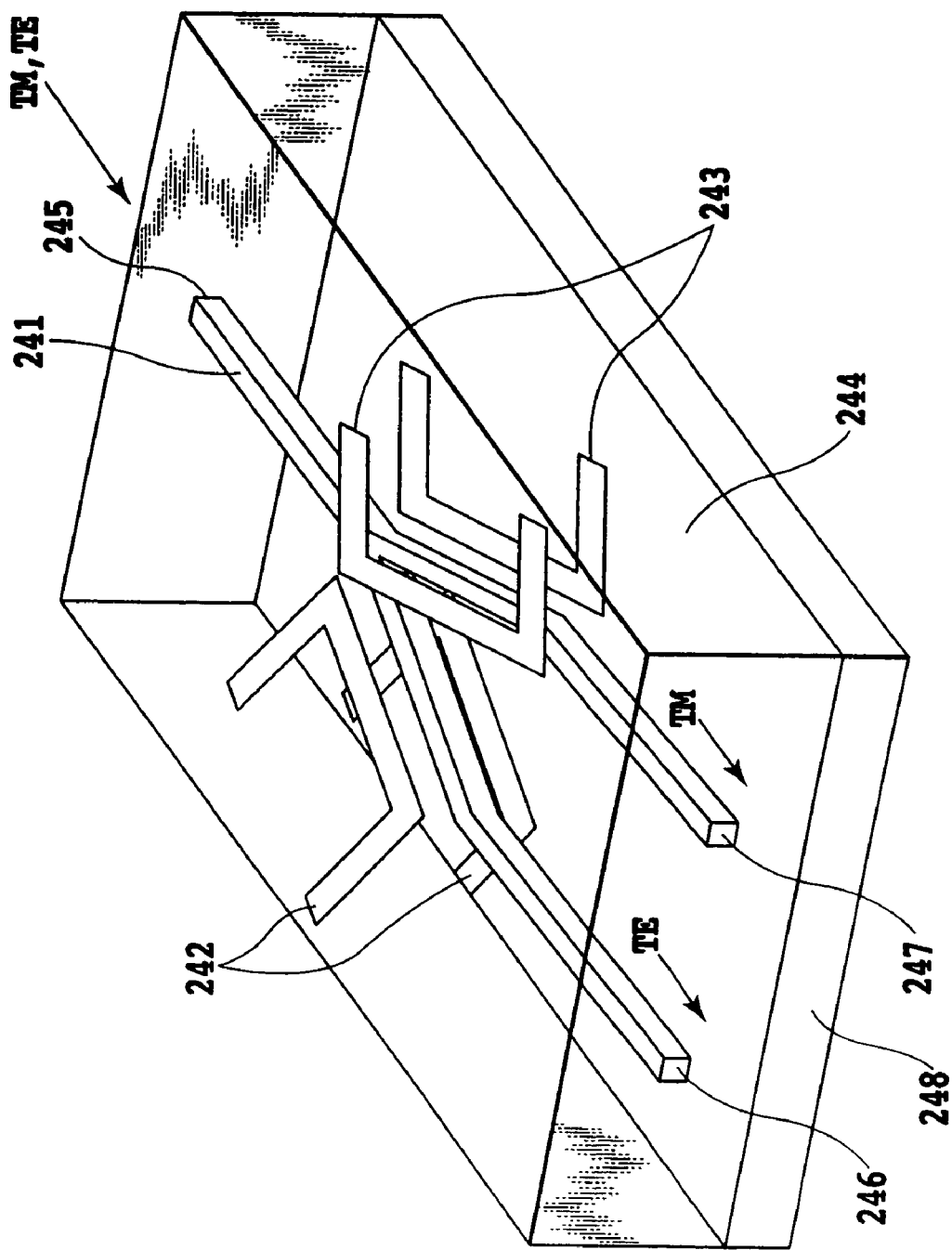
FIG. 24 is a diagram showing the configuration of a 1×2 polarization splitter (application of electric fields perpendicular to the substrate) according to one embodiment of the present invention.

FIG. 24 shows a 1×2 polarization splitter utilizing this principle. As shown in FIG. 24, as a buried three-dimensional optical waveguide having a core 241 and a clad layer 244, a Y branching optical waveguide is placed on a substrate 248; in this waveguide, one input optical waveguide 245 branches to two output waveguides 246 and 247. On each of a top and bottom surfaces of the clad layer 244, switching electrodes 242 and 243 are arranged along parts of output waveguides 246 and 247 which are near the Y branch.

In this configuration, when a TM light and TE light are allowed to enter the input port 245 and a voltage is applied to one of the switching electrodes 242, an electric field $E_3$ is generated in a direction which is perpendicular to the substrate and which traverses the core 246. Thus, the TE light is outputted to the output port 246, whereas the TM light is outputted to the output port 247. Therefore, a polarization splitter can be provided which can separate the TE mode from the TM mode.

Figure 25A:
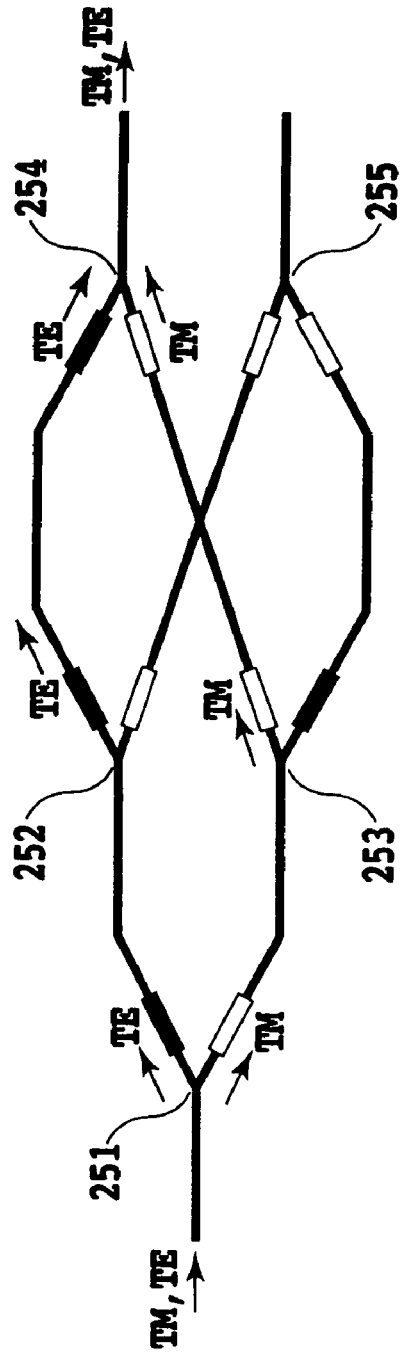
FIG. 25A is a diagram illustrating a 1×2 polarization independent splitter (three connections; application of electric fields perpendicular to the substrate) according to one embodiment of the present invention.
Figure 25B:
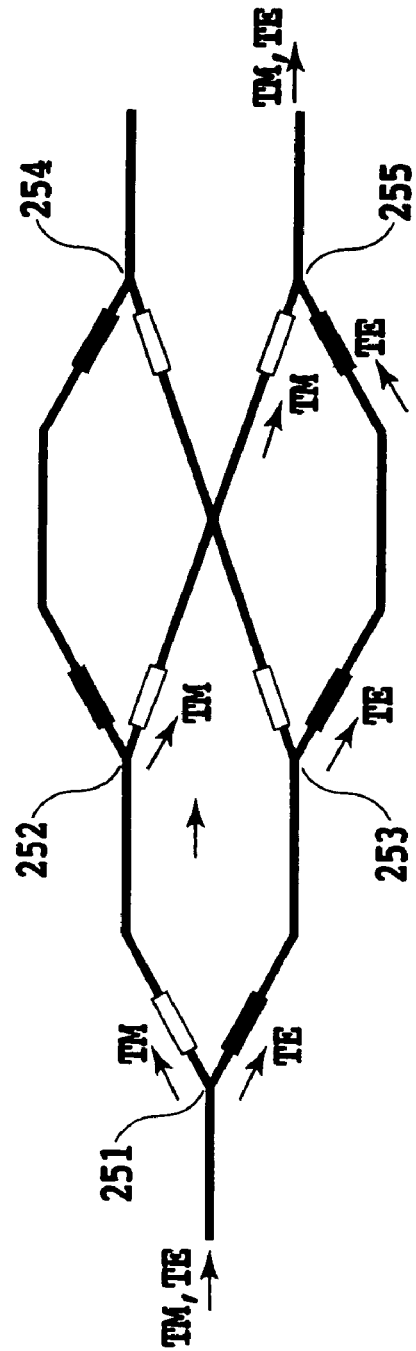
FIG. 25B is a diagram illustrating the 1×2 polarization independent splitter (three connections; application of electric fields perpendicular to the substrate) according to one embodiment of the present invention.

FIGS. 25A and 25B show are schematic diagrams showing 1×2 polarization-independent optical switches in which five Y branching waveguides are combined together like a tree. Specifically, a first Y branching waveguide 251 branches one waveguide to two waveguides. A second and third waveguides 252 and 253 branch the two waveguides to four waveguides. Each of a fourth and fifth Y branching waveguides 254 and 255 couples a crossing waveguide and a linear waveguide together to form one waveguide. Further, a switching electrode is placed along an output waveguide of each of the Y branching waveguides 251 to 255. A voltage is actually applied to the electrodes shown in black in FIGS. 25A and 25B.

In FIG. 25A, the TM light and the TE light propagate through the respective optical paths shown by arrows. Both lights are finally outputted to the output port shown in the upper part of the figure. On the other hand, in FIG. 25B, the TM light and the TE light propagate through the respective optical paths shown by arrows. Both lights are finally outputted to the output port shown in the lower part of the figure.

Figure 26A:
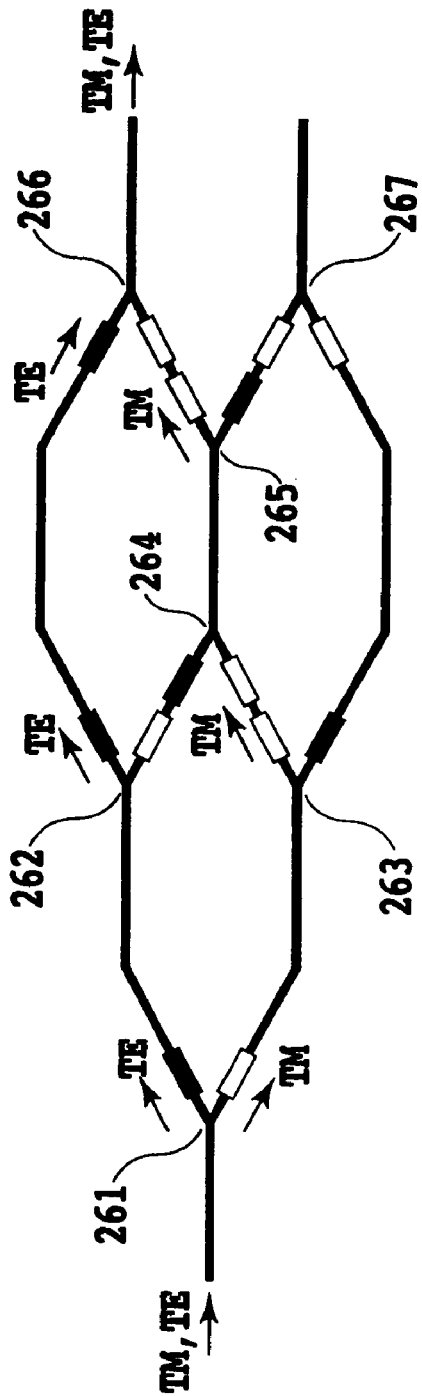
FIG. 26A is a diagram illustrating a 1×2 polarization independent splitter (five connections; application of electric fields perpendicular to the substrate) according to one embodiment of the present invention.
Figure 26B:
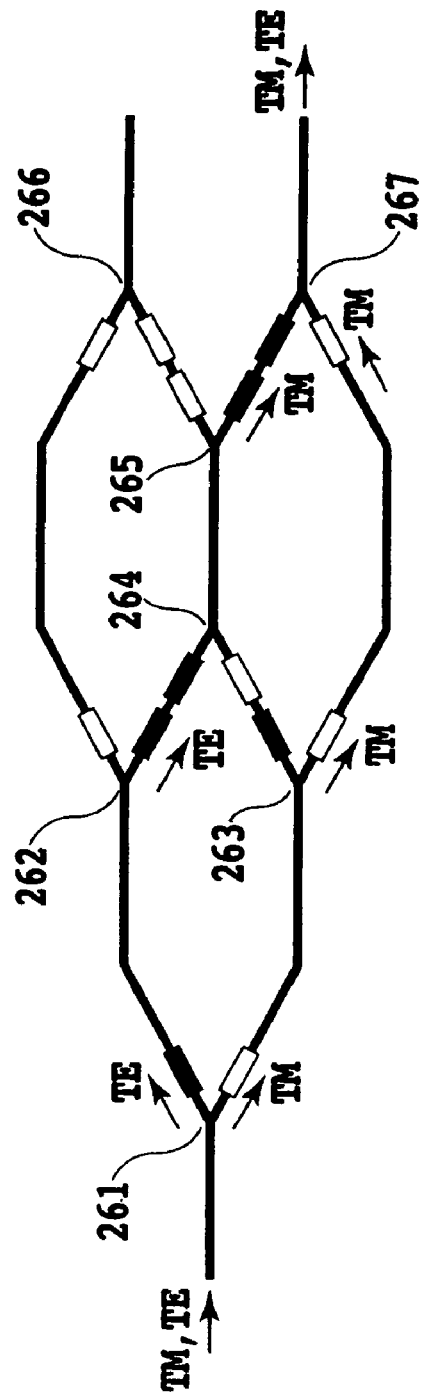
FIG. 26B is a diagram illustrating the 1×2 polarization independent splitter (five connections; application of electric fields perpendicular to the substrate) according to one embodiment of the present invention.

FIGS. 26A and 26B are schematic diagrams showing 1×2 polarization-independent optical switches in which seven Y branching waveguides are combined together like a tree. Specifically, a first Y branching waveguide 261 branches one waveguide to two waveguides. A second and third waveguides 262 and 263 branch the two waveguides to four waveguides. A fourth Y branching waveguide 264 couples two waveguides together to form one waveguide. A fifth Y branching waveguide 265 branches this waveguide to two waveguides. Moreover, a sixth and seventh Y branching waveguides 266 and 267 couples the four waveguides together to form two waveguide.

A switching electrode is placed along an output waveguide of each of the Y branching waveguides 261 to 267. A voltage is actually applied to the electrodes shown in black in FIGS. 26A and 26B.

In FIG. 26A, the TM light and the TE light propagate through the respective optical paths shown by arrows. Both lights are finally outputted to the output port shown in the upper part of the figure. On the other hand, in FIG. 26B, the TM light and the TE light propagate through the respective optical paths shown by arrows. Both lights are finally outputted to the output port shown in the lower part of the figure.

Examples of optical switches produced using the above techniques will be shown below. However, the switch producing technique is not limited to the contents of the description.

EXAMPLE 1

A technique such as photolithography is used to produce a platinum comb-shaped electrode on a surface of a KTN crystal. A Y branching buried waveguide is produced on the platinum comb-shaped electrode; the Y branching buried waveguide comprises a core composed of a KLTN having a large refractive index and a clad layer composed of a KLTN having a small refractive index, the refractive indices being obtained by adjusting the Li concentration. The code and clad have a difference in refractive index $\Delta n=0.3\%$. A core size is 8×8 μM2. Moreover, a technique such as photolithography is used to produce a platinum comb-shaped electrode on a surface of the upper clad crystal as a driving electrode.

A smaller electrode length is advantageous in terms of a response speed determined by the CR constant. However, a larger electrode length is advantageous in terms of crosstalk. Thus, the optimum value was obtained by evaluating the optical characteristics of a plurality of optical switches having different patterns with the respective electrode lengths. The temperature of the optical switches is adjusted using Peltier elements so that the optical switch can operate near the Curie transition temperature. A DC bias of 3 V is applied to both switching electrodes. A modulation voltage was then applied to the ON port side switching electrode to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 2

A technique such as photolithography is used to produce a platinum comb-shaped electrode on a surface of a KTN crystal. A Y branching buried waveguide is produced on the platinum comb-shaped electrode; the Y branching buried waveguide comprises a core composed of a KTN having a large refractive index obtained and a clad layer composed of a KTN having a small refractive index, the refractive indices being obtained by adjusting the Ta/Nb concentration. The code and clad have a difference in refractive index $\Delta n=0.3\%$. A core size is 8×8 $\mu m^2$. Moreover, a technique such as photolithography is used to produce a platinum comb-shaped electrode on a surface of the upper clad crystal as a driving electrode.

A smaller electrode length is advantageous in terms of the response speed determined by the CR constant. However, a larger electrode length is advantageous in terms of crosstalk. Thus, since a larger electrode length is advantageous in terms of crosstalk, the optimum value was obtained by evaluating the optical characteristics of a plurality of optical switches having different patterns with the respective electrode lengths. A temperature of the optical switches is adjusted using Peltier elements so that the optical switches can operate near the Curie transition temperature. A DC bias of 3 V is applied to both switching electrodes. A modulation voltage is then applied to one of the switching electrodes to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 3

A waveguide is produced which comprised a core composed of a KTN having a large refractive index obtained and a clad layer composed of a KTN having a small refractive index, refractive indices being obtained by adjusting the Ta/Nb concentration. This waveguide is used to produce a buried waveguide in which seven Y branching waveguides 221 to 227 are connected together as shown in FIGS. 22A and 22B. The code and clad have a difference in refractive index Δn=0.3%. A core size is 8×8 μm². Moreover, a technique such as photolithography is used to produce a platinum surface electrode on a surface of the upper clad crystal as a switching electrode. The temperature of the optical switch was adjusted using a Peltier element so that the optical switch could operate near the Curie transition temperature.

A modulation voltage was then applied to the electrodes shown in black in FIGS. 22A and 22B to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 4

A waveguide is produced which comprises a core composed of a KTN having a large refractive index and a clad layer composed of a KTN having a small refractive index, the refractive indices being obtained by adjusting the Ta/Nb concentration. This waveguide is used to produce a buried waveguide in which five Y branching waveguides 211 to 215 are connected together as shown in FIGS. 21A and 21B. The code and clad have a difference in refractive index Δn=0.3%. A core size is 8×8 μm². Moreover, a technique such as photolithography is used to produce a platinum surface electrode on a surface of the upper clad crystal as a driving electrode. The temperature of the optical switch is adjusted using a Peltier element so that the optical switch can operate near the Curie transition temperature.

A modulation voltage is then applied to the electrodes shown in black in FIGS. 21A and 21B to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 5

A technique such as photolithography is used to produce a platinum switch electrode on a surface of a KTN crystal. A waveguide is produced which comprises a core composed of a KTN having a large refractive index and a clad layer composed of a KTN having a small refractive index, refractive indices being obtained by adjusting the Ta/Nb concentration. This waveguide is used to produce a buried waveguide in which five Y branching waveguides 251 to 255 are connected together as shown in FIGS. 25A and 25B. The code and clad have a difference in refractive index Δn=0.3%. A core size is 8×8 μm². Moreover, a technique such as photolithography is used to produce a platinum electrode on a surface of the upper clad crystal and below the lower clad crystal as a switching electrode. A temperature of the optical switch is adjusted using a Peltier element so that the optical switch can operate near the Curie transition temperature.

A modulation voltage is then applied to the electrodes shown in black in FIGS. 25A and 25B to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 6

A technique such as photolithography is used to produce a platinum switch electrode on a surface of a KTN crystal. A waveguide is produced which comprises a core composed of a KTN having a large refractive index and a clad layer composed of a KTN having a small refractive index, the refractive indices being obtained by adjusting the Ta/Nb concentration. This waveguide is used to produce a buried waveguide in which seven Y branching waveguides 261 to 267 are connected together as shown in FIGS. 26A and 26B. The code and clad have a difference in refractive index Δn=0.3%. A core size is 8×8 μm². Moreover, a technique such as photolithography is used to produce a platinum electrode on a surface of the upper clad crystal and below the lower clad crystal as a driving electrode. A temperature of the optical switch is adjusted using a Peltier element so that the optical switch can operate near the Curie transition temperature.

A modulation voltage is then applied to the electrodes shown in black in FIGS. 26A and 26B to operate the switch. This 1×2 digital EO switch exhibited optical characteristics including an operating voltage of less than 1 V (DV bias of 3V), a crosstalk of less then −30 dB, and a response speed of less than 1 ns.

EXAMPLE 7

An optical switch according to Example 7 is configured similarly to the optical switch according to Example 1. However, the optical switch according to Example 7 differs from the optical switch according to Example 1 in that its optical waveguides are made of a BTO crystal or the like. An optical switch having such a configuration is produced and its operations were checked.

When the optical switch according to Example 7 is operated while controllably adjusting the temperature of the BTO waveguide part at 110° C., the driving voltage V, must be 1.5 V. Nevertheless, performance similar to that of the optical switch according to Example 1 can be accomplished. Further, the switching speed is at most 1 ns. Furthermore, the BTO and STO were mixed together in the ratio of 0.73:0.27 to produce waveguides including the single crystal $Ba_{0.73}Sr_{0.27}TiO_3$. The waveguides are then used to produce a similar optical switch. In this case, at 10° C., the optical switch exhibited characteristics similar to those obtained using the BTO waveguides. Similar operations were able to be performed by an optical switch using PLZT as a material for the waveguides.

The optical switches according to the second embodiment may comprise a temperature controller in order to allow the KTN, KLTN, or the like to operate near the Curie transition temperature. The temperature controller may be a Peltier element.

As described above, the present embodiment relates to an optical device using a dielectric crystal substrate and a dielectric crystal waveguide, specifically, an optical device comprising a $KTaO_3$, $KNbO_3$, or KTN substrate, a buried optical waveguide placed on the substrate and having a core composed of a KLTN and a clad layer composed of a KLTN waveguide having a slightly smaller refractive index than the core, and an electrode providing electric fields.

As described above, the second embodiment can provide a waveguide type device such as an optical switch that can operate independently of polarization. That is, according to the second embodiment, the buried waveguide using the KTN/KLTM crystal material comprises the switching electrode. This enables a switch operation to be performed using a small-sized inexpensive high-speed power source.

Moreover, since the optical switch can operate independently of polarization and can be subjected to integration, it can be used as a high-speed switch for a network system, for example, an optical packet switch. This makes it possible to provide a new network system.

Third Embodiment

A third embodiment is characterized by an optical modulator configured using a phase shifter based on a dielectric crystal which is a cubic crystal having a very large electro-optic constant and which has a secondary electro-optic constant. In the present embodiment, the dielectric crystal is a KTN or a KLTN.

When the crystal is cubic, the dependence of the refractive index in each of the TE and TM modes on the electric fields can be described as shown below when the $E_2$ or $E_3$ is zero.

$$\Delta n_{TE} = -0.5 n_0^3 \epsilon_0^2 \epsilon_a^2 (g_{12} E_1^2 + g_{11} E_2^2) - 0.5 n_0^3 g_{12} \epsilon_0^2 \epsilon_a^2 E_3^2 \quad (7)$$

$$\Delta n_{TM} = -0.5 n_0^3 \epsilon_0^2 \epsilon_a^2 g_{12} (E_1^2 + E_2^2) - 0.5 n_0^3 g_{11} \epsilon_0^2 \epsilon_a^2 E_3^2 \quad (8)$$

In these equations, $n_0$ denotes the refractive index of the KTN or KLTN obtained before application of electric fields. $g_{11}$ and $g_{12}$ denote the nonlinear constants for the KTN and KLTN. $\epsilon_a$ denotes the relative dielectric constant for the KTN and KLTN. Further, the $g_{11}=0.136$ and $g_{12}=-0.038$.

Figure 27:
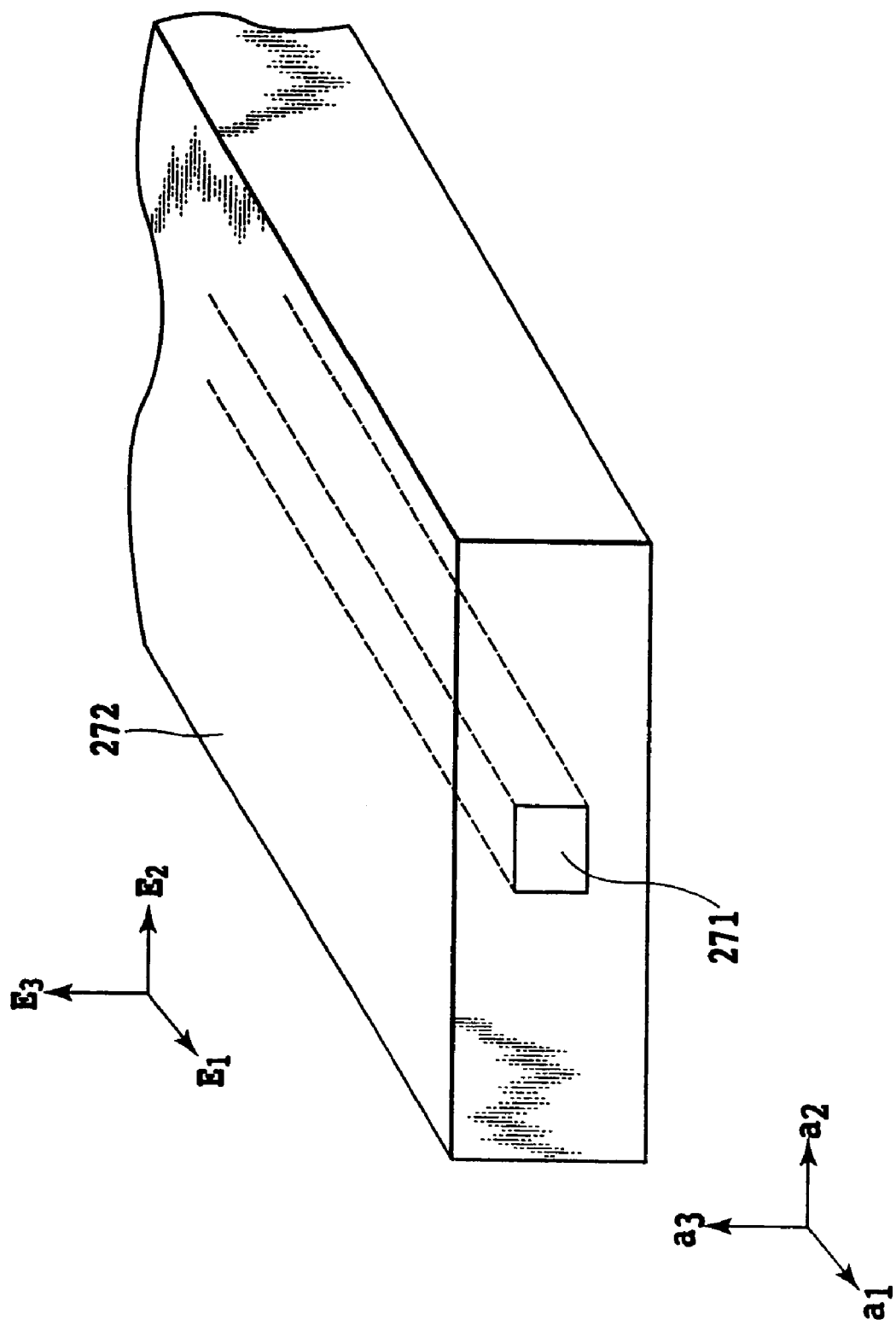
FIG. 27 is a diagram showing the configuration of a waveguide according to one embodiment of the present invention.

FIG. 27 is a diagram showing the orientation of a crystal and the directions of electric fields in a waveguide of a dielectric crystal material. Reference numerals 271 and 272 denote a core and a clad, respectively. Here, the directions of the electric fields $E_1$, $E_2$, and $E_3$ correspond to the electric fields in the directions of the principal axes of the KTN waveguide. When the $E_2$ or $E_3$ is zero, the principal axe of the index ellipsoid does not change. This prevents a mode conversion.

Figure 28A:
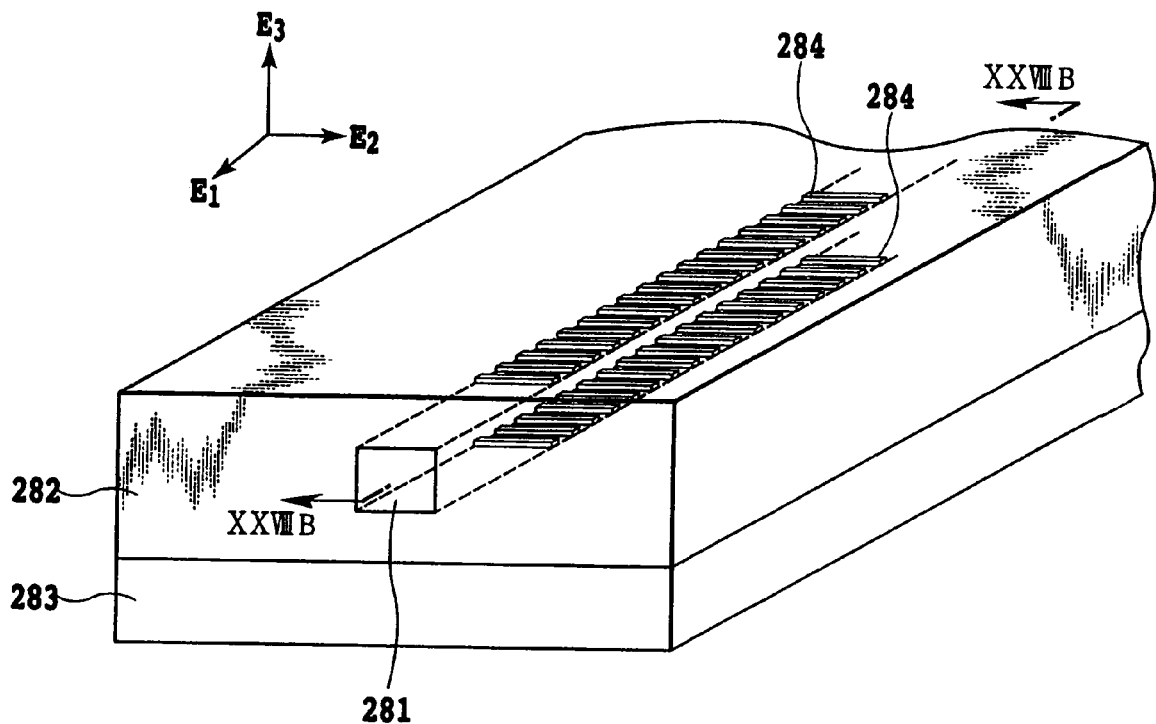
FIG. 28A is a perspective view of the waveguide according to the present embodiment of the present invention.
Figure 28B:
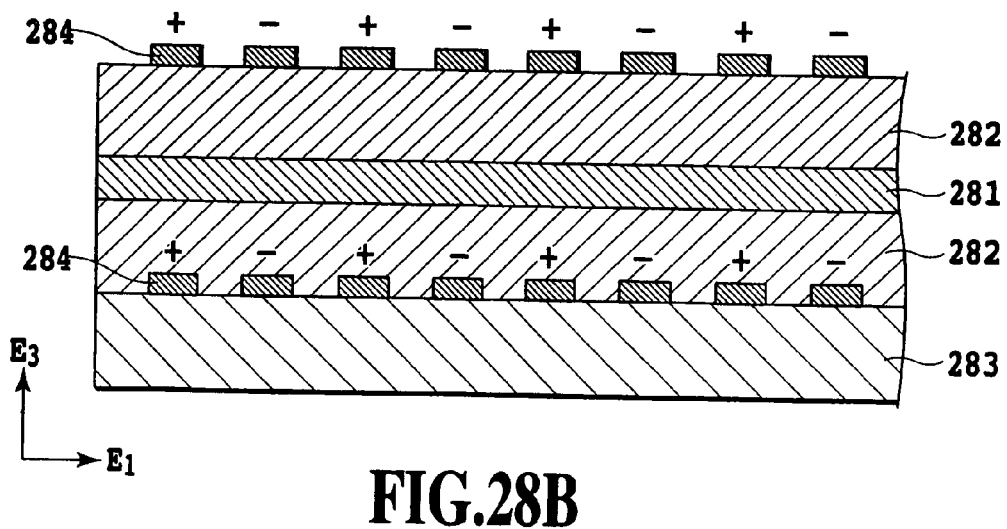
FIG. 28B is a sectional view taken along a line XXVIIIB-XXVIIIB in FIG. 28A.

FIGS. 28A and 28B are diagrams showing the configuration of an optical waveguide with a comb-shaped electrode. FIG. 28A is a perspective view of the optical waveguide with the comb-shaped electrode. FIG. 28B is a sectional view taken along a line XXVIIIB-XXVIIIB in FIG. 28A. In the figures, reference numerals 281 and 282 denote a core and a clad, respectively. Reference numerals 283 and 284 denote a substrate and a comb-shaped electrode, respectively. The comb-shaped electrodes 284 are arranged so as to sandwich the core 281 between them from above and below. In each of the comb-shaped electrodes 284, positive and negative poles are alternately arranged in a longitudinal direction. That is, the clad 282 is formed on the substrate 283, with the core 281 buried in the clad 282. The comb-shaped electrodes 284 are arranged above and below the clad 282, respectively.

When the electrodes 284 are used to apply electric fields only in the direction $E_1$ as shown in FIGS. 28A and 28B, a change in refractive index can be given by the same equation for both modes. This enables the polarization dependence to be eliminated.

$$\Delta n_{TE} = -0.5 n_0^3 \epsilon_0^2 \epsilon_a^2 g_{12} E_1^2 \quad (9)$$

$$\Delta n_{TM} = -0.5 n_0^3 \epsilon_0^2 \epsilon_a^2 g_{12} E_1^2 \quad (10)$$

Figure 29A:
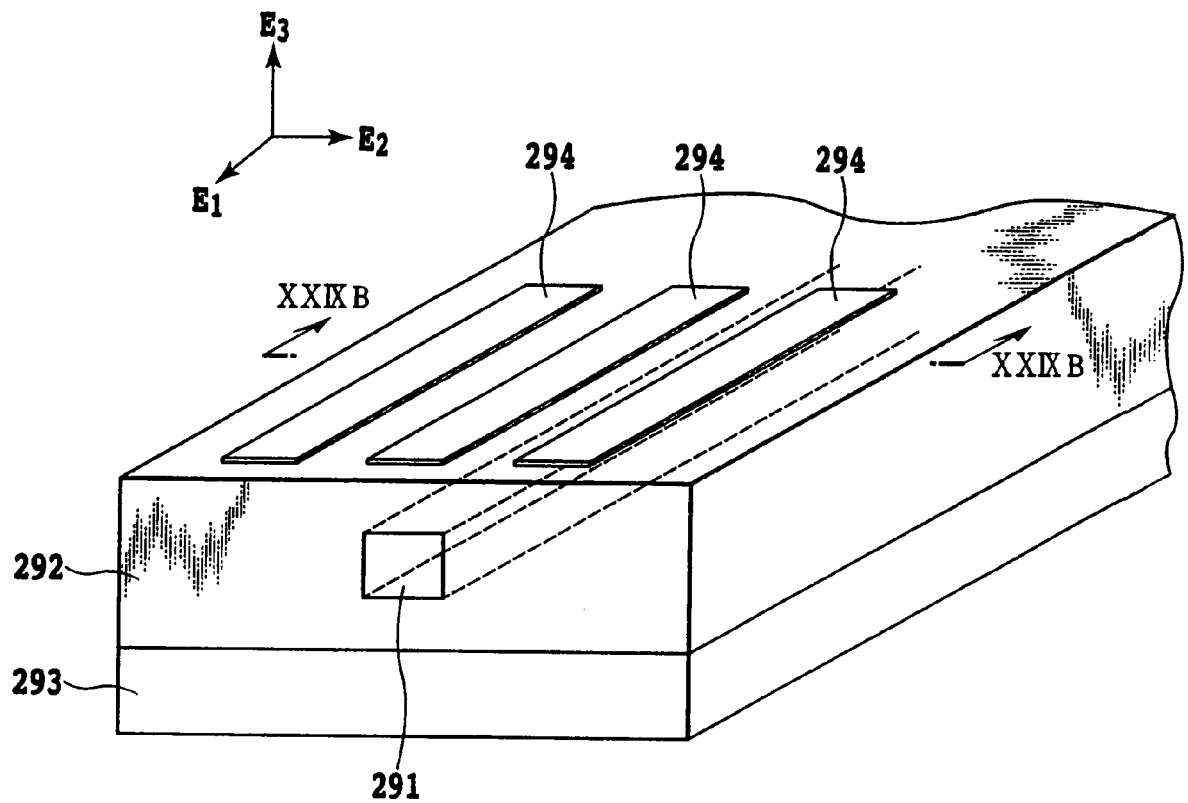
FIG. 29A is a perspective view of the waveguide according to the present embodiment of the present invention.
Figure 29B:
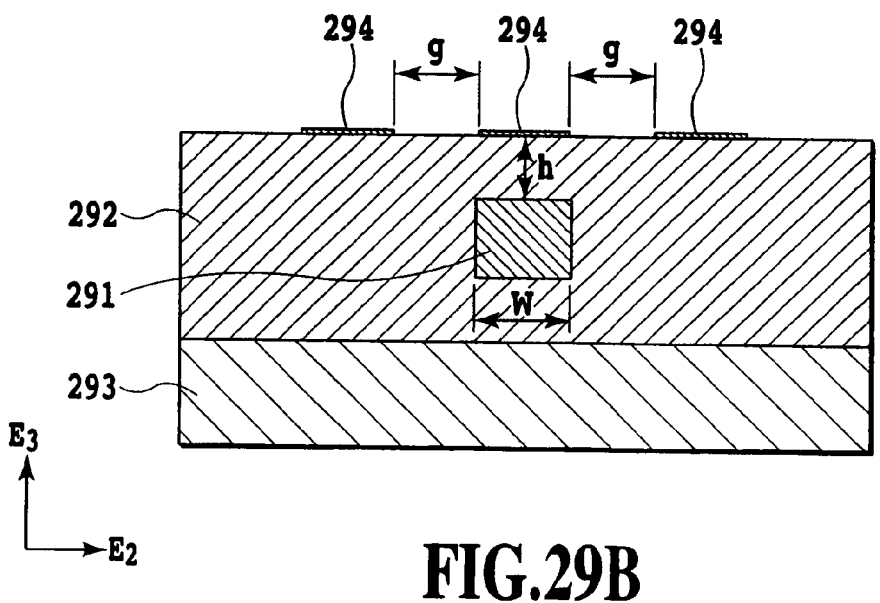
FIG. 29B is a sectional view taken along a line XXIXB-XXIXB in FIG. 29A.

FIGS. 29A and 29B are diagrams showing the configuration of an optical waveguide with electrodes. FIG. 29A is a perspective view of the optical waveguide with the electrodes. FIG. 29B is a sectional view taken along a line XXIXB-XXIXB in FIG. 29A. In the figures, reference numerals 291 and 292 denote a core and a clad, respectively. Reference numerals 293 and 294 denote a substrate and an electrode, respectively. One electrode 294 is placed above the core 291 and immediately above a surface of the clad 292, while two are arranged above the core 291 and on the respective sides of the above electrode 294.

When the electrodes 294 are used to apply electric fields only in the direction $E_2$ as shown in FIGS. 29A and 29B, a change in refractive index can be given by:

$$\Delta n_{TE} = -0.5 n_0^3 \epsilon_0^2 \epsilon_a^2 g_{11} E_2^2 \quad (11)$$

$$\Delta n_{TM} = -0.5 n_0^3 \epsilon_0^2 \epsilon_a^2 g_{12} E_2^2 \quad (12)$$

Figure 30A:
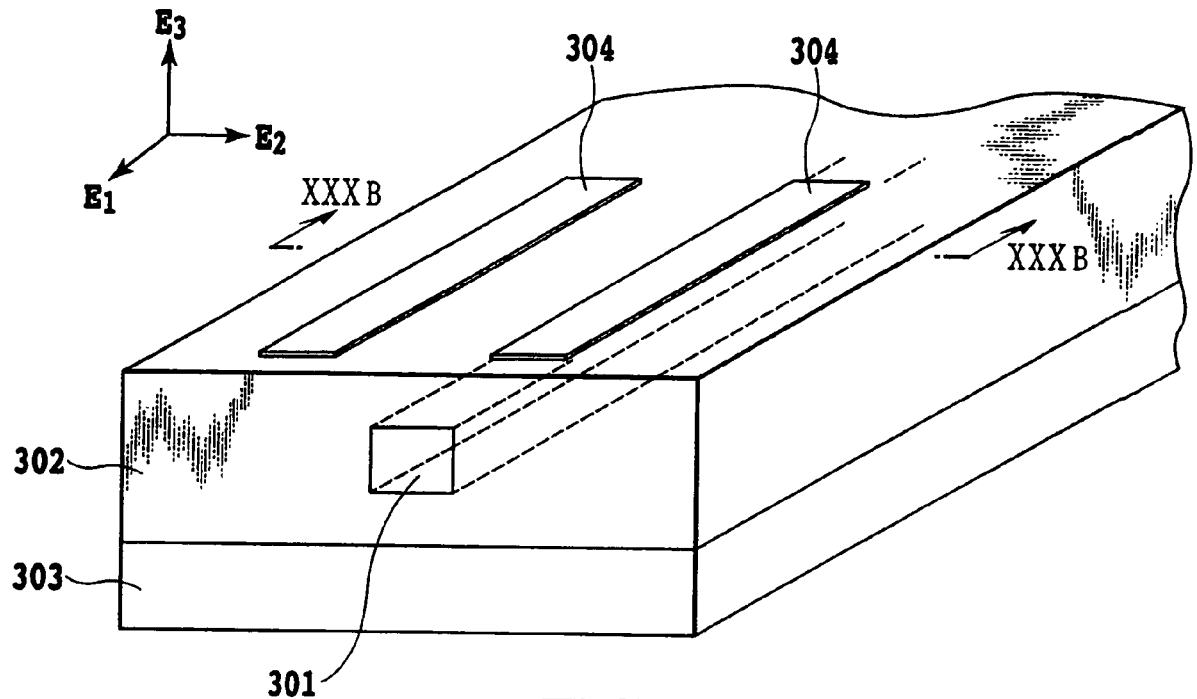
FIG. 30A is a perspective view of the waveguide according to the present embodiment of the present invention.
Figure 30B:
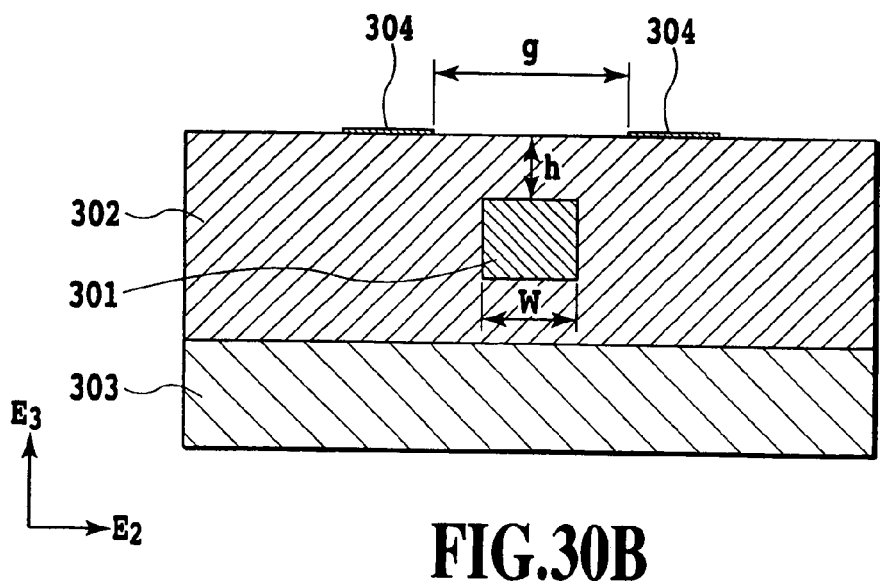
FIG. 30B is a sectional view taken along a line XXXB-XXXB in FIG. 30A.

FIGS. 30A and 30B are diagrams showing the configuration of an optical waveguide with electrodes. FIG. 30A is a perspective view of the optical waveguide with the electrodes. FIG. 30B is a sectional view taken along a line XXXB-XXXB in FIG. 30A. In the figures, reference numerals 301 and 302 denote a core and a clad, respectively. Reference numerals 303 and 304 denote a substrate and an electrode, respectively. Two electrodes 304 are arranged above the core 301 and on a surface of the clad 302 on the respective sides of a position immediately above the core 301.

When the electrodes 304 are used to apply electric fields only in the direction $E_3$ as shown in FIGS. 30A and 30B, a change in refractive index can be given by:

$$\Delta n_{TE} = -0.5 n_0^3 \epsilon_0^2 \epsilon_a^2 g_{12} E_3^2 \quad (13)$$

$$\Delta n_{TM} = -0.5 n_{03} \epsilon_0^2 \epsilon_a^2 g_{11} E_3^2 \quad (14)$$

Figure 31:
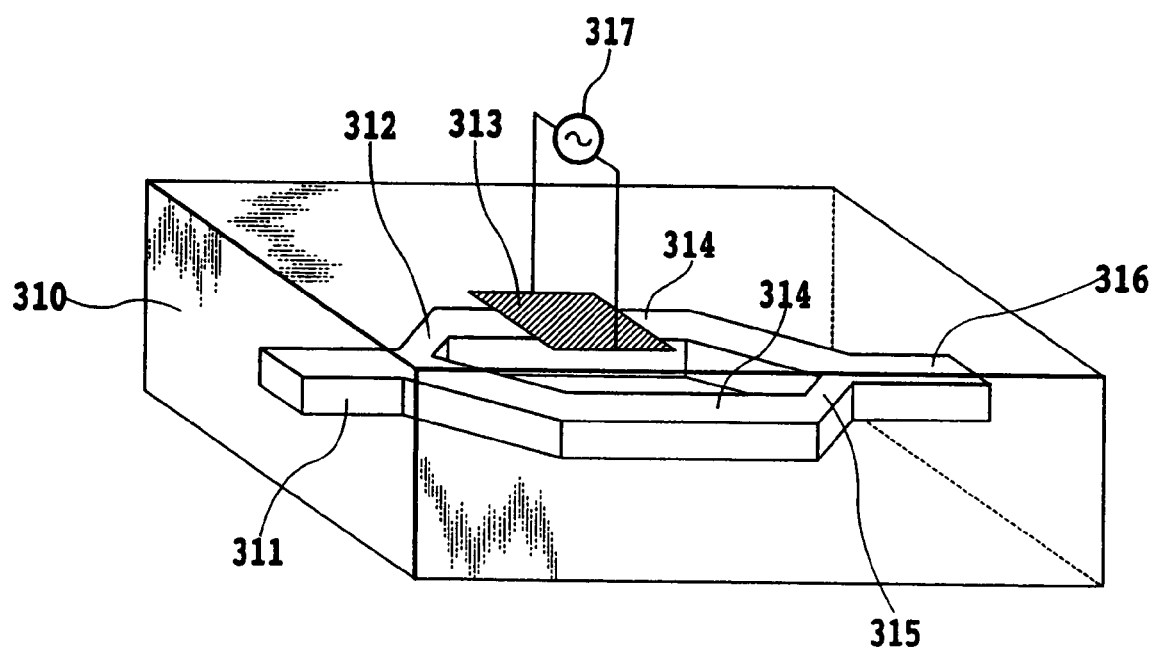
FIG. 31 is a diagram showing the configuration of an optical modulator according to one embodiment of the present invention.

In the latter two electric field application arrangements, the change in refractive index has opposite signs in the two modes. FIG. 31 (described in detail in Example 12) shows a basic structure of a Mach-Zehnder interferometer type optical modulator. An input light is divided into two lights by a 3-dB coupler 312. The two lights are guided through Y branching optical waveguides 314. One of the Y branching optical waveguides 314 operates as an optical phase modulator to modulate the phase of a light passing through this optical waveguide.

If light waves from the Y branching optical waveguides are incident with the same phase, they are added together and then guided to an output port. However, if the phases of the light waves are offset from each other by 180°, the light is emitted out of the Y branching optical waveguides as an emission mode. Consequently, the light is not guided to the output port 316. Since the KTN has a significant secondary electro-optic effect, a light intensity can be efficiently modulated on the basis of a change in phase corresponding to a change in refractive index determined by Equation (7) or (8) or (11) to (14) even if a current length is reduced.

The use of the electrode structure shown in FIG. 31 enables polarization-independent operations to be realized. However, the use of electrodes corresponding to FIGS. 32 (described in detail in Example 13) and 33 (described in detail in Example 14) results in polarization-dependent operations. However, the use of electrodes corresponding to FIGS. 32 and 33 enables a larger nonlinear constant ($g_{11}$) to be used. This enables the intensity to be modulated by a further reduced voltage. Normally, polarized laser beams are often used as a light source for intensity modulation. Consequently, even the polarization-dependent operations are not problematic in a practical sense provided that a light corresponding to laser polarization can be modified.

Figure 34:
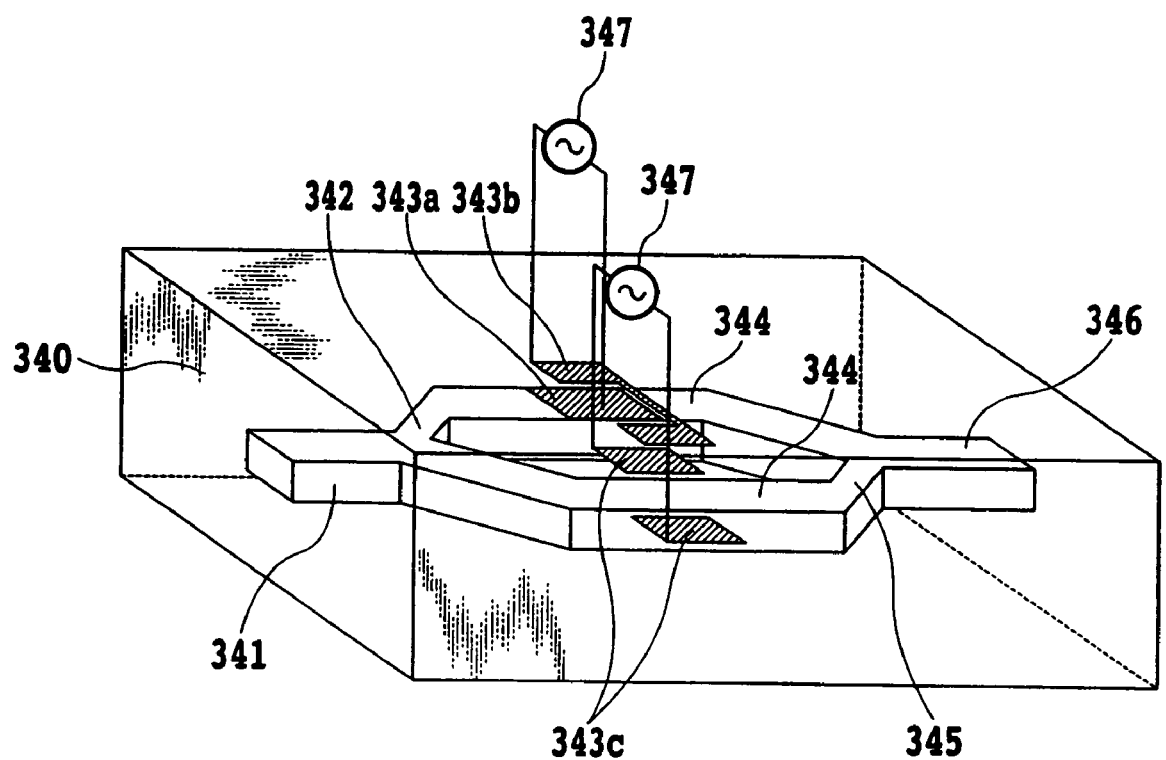
FIG. 34 is a diagram showing the configuration of an optical modulator according to one embodiment of the present invention.

Moreover, if the electrodes in FIGS. 29A and 29B are used for one of the Y branching optical waveguides 344 and the electrodes in FIGS. 30A and 30B are used for the other Y branching optical waveguide 344 as shown in FIG. 34 (described in detail in Example 15), since the nonlinear constants have opposite signs, the modulation can be more efficiently accomplished by a push pull operation in which phase modulations are carried out in opposite directions.

The KTN has a very large dielectric constant near a phase transition compared to other materials. Thus, certain improvements are required to reduce the electric capacity. If surface electrodes are used, the electric capacity of the device is expected to increase with decreasing gap between the electrodes and increasing thickness of the optical waveguide layer. With a smaller gap between the electrodes, stronger electric fields can be applied to the core. Accordingly, the gap between the electrodes is desirably as small as possible. Thus, a certain buried waveguide has been confirmed to have a sufficiently small electric capacity because it can operate at a high speed of at least 1 GHz; for this waveguide, when the core thickness is defined as hc, a lower clad thickness hu and an upper clad thickness ho are $0 \leq hu$ and $ho \leq 3hc$.

However, when the clad layer is thin and is at most 1 μm in thickness, the use of a simple metal electrode causes a guided light in the TM mode to suffer a heavy loss of at least 100 dB/cm owing to metal cladding. Thus, a phase shifter with a reduced loss is provided by using ITO and ZnO, which exhibit a high transparency in a communication wavelength band, as an electrode material. Further, for a clad thickness of more than 1 μm, it is possible to use, as an electrode material, a simple metal, for example, a metal typified by Pt, Au, Pd, Ti, or Cu, or their alloy.

The electric capacity can also be reduced by increasing the difference in specific refractive index between the core and clad to reduce the thickness of the core layer. For example, an increase in difference in refractive index up to 1.5% enables the core thickness for single mode wave guiding to be reduced down to 4 μm. A device with a reduced electric capacity can be provided by using a core and a clad with a large difference in refractive index. The electric capacity is further effectively reduced when the crystal material used for the substrate has a relative dielectric constant smaller than that of the crystal material constituting the waveguide by at least one order. The low-voltage driving phase shifter shown above can be used to provide a light intensity modulator which has a large modulation index and which operates over a broad band.

Moreover, the thickness of the clad on the core has been confirmed to be an important parameter in more effectively reducing the driving voltage. The driving voltage can be reduced consistently with the clad thickness. Thus, when a core width is defined as W, it is possible to accomplish a sufficiently low driving voltage for operations at a high speed of at least 1 GHz provided that the thickness h of the clad on the core and the gap g between the electrodes are $0 \leq h \leq 3W$ and $0 \leq g \leq 3W$, respectively. However, when the clad layer is thin and is at most 1 μm in thickness, the use of a simple metal electrode causes a guided light in the TM mode to suffer a heavy loss of at least 100 dB/cm owing to metal cladding. Thus, a phase shifter with a reduced loss is provided by using ITO and ZnO, which exhibit a high transparency in a communication wavelength band, as an electrode material.

Moreover, because of the secondary electro-optic effect of the KTN material, the driving voltage can be reduced by applying a bias voltage. In general, the driving voltage is defined as Vπ, indicating that the phase of a waveguide in a phase shifter varies by π. The relationship shown below is established between the Vπ and a driving voltage Vm obtained when a bias voltage Vb is applied.

$$(V_b+V_m)^2 - V_b^2 = V_\pi^2 \tag{15}$$

The driving voltage can be reduced in accordance with this equation. For example, in a phase shifter in which the Vπ is 2.5 V without any bias, application of a 6-V bias reduces the driving voltage down to 0.5 V.

Further, for a clad thickness of more than 1 μm, it is possible to use, as an electrode material, a simple metal, for example, a metal typified by Pt, Au, Pd, Ti, or Cu, or their alloy. The use of the low-voltage driving phase shifter enables the provision of a light intensity modulator having a large modulation index.

Examples will be shown below but the present invention is not limited to these examples.

The examples of the present invention will be described with reference to the drawings.

EXAMPLE 1

Example 1 relates to a waveguide electro-optic phase shifter using the electrodes shown in FIGS. 30A and 30B.

The waveguide electro-optic phase shifter according to the present embodiment employs a cubic crystal having a secondary electro-optic effect. The waveguide electro-optic phase shifter comprises a buried channel optical waveguide in which the thickness h of an overclad (upper layer) on the core 301, having a core width w, is $0 \leq h \leq 3w$. Two thin film electrodes (also simply referred to as electrodes) 304 for applying electric fields are arranged opposite each other and parallel to each other across a channel optical waveguide.

The gap g between the electrodes has a length such that $0 \leq g \leq 3w$. Further, the crystal is composed of a crystal material consisting of KTN and KLTN. Moreover, the electrodes are composed of an electrode material consisting of ZnO in which at least one of Al, Ga, In, and B is doped or ITO in which at least one of Sn, Ti, Zr, Hf, Nb, Ra, W, Ge, Mo, Sb, Te, Au, Pt, and Pg.

Description will be given below of a method of producing a waveguide electro-optic phase shifter according to Example 1.

First, a buried optical waveguide is produced which comprises a core composed of KTN having a refractive index of 2.184 and a clad composed of KTN having a small refractive index, the refractive indices being obtained by adjusting the Ta/Nb concentration ratio. Further, Li is doped in each of the clad and core layers in order to more precisely adjust the refractive indices. The size of a cross section of the core in the optical waveguide is 6×6 μm. The thickness of the clad on the core is set at 0 μm.

Moreover, an ITO film is formed on the optical waveguide by a sputter process. Then, photolithography and a dry etching process are used to produce electrodes for applying electric fields which consist of Sn doped ITO and which have a gap width of 6 μm, an electrode width of 100 μm, a thickness of 1 μm, and a gap width of 6 μm. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. During driving, the device temperature was controllably adjusted to the vicinity of a phase transition. A modulation operating voltage was at most 2.5 V when no bias was applied. Further, when a 6-V bias voltage was applied, the modulation operating voltage was at most 0.5 V.

EXAMPLE 2

Example 2 relates to a waveguide electro-optic phase shifter using the electrodes shown in FIGS. 29A and 29B. Description will be given below of a method of producing a waveguide electro-optic phase shifter according to Example 2.

First, a buried optical waveguide is produced which comprises a core composed of KTN having a refractive index of 2.184 and a clad composed of KTN having a small refractive index, the refractive indices being obtained by adjusting the Ta/Nb concentration ratio. Further, Li is doped in each of the clad and core layers in order to more precisely adjust the refractive indices. The size of a cross section of the core in the optical waveguide is 6×6 µm. The thickness of the clad on the core is set at 0 µm.

Moreover, an ITO film is formed on the optical waveguide by the sputter process. Then, photolithography and a dry etching process are used to produce electrodes for applying electric fields which consist of Al doped ITO and which have a gap width of 6 µm, an electrode width of 100 Wm, a thickness of 1 µm, and a gap width of 6 µm. The length of the electrodes is 1 mm. The electrodes are terminated at 50 ohm in order to suppress reflection of an applied voltage. A laser light source of wavelength 1.55 µm was connected to an input port. Then, modulation characteristics were measured using an oscilloscope. During driving, the device temperature was controllably adjusted to the vicinity of a phase transition. The modulation operating voltage was at most 2.5 V when no bias was applied. Further, when a 6-V bias voltage was applied, the modulation operating voltage was at most 0.5 V.

EXAMPLE 3

Example 3 relates to a waveguide electro-optic phase shifter using a simple metal as an electrode material and also using the electrodes shown in FIGS. 30A and 30B. A buried optical waveguide is produced which comprises a core composed of KTN having a refractive index of 2.184 and a clad composed of KTN having a small refractive index, the refractive indices being obtained by adjusting the Ta/Nb concentration ratio. Further, Li is doped in each of the clad and core layers in order to more precisely adjust the refractive indices. The size of a cross section of the core in the optical waveguide is 6×6 µm. The thickness of the clad on the core is set at 6 µm.

Moreover, a thin gold film is formed on the optical waveguide by the sputter process. Then, photolithography and the dry etching process are used to produce electrodes for applying electric fields which consist of Au and which have a gap width of 6 µm, an electrode width of 100 µm, a thickness of 1 µm, and a gap width of 6 µm. The length of the electrodes is 3 mm. The electrodes are terminated at 50 ohm in order to suppress reflection of an applied voltage. A laser light source of wavelength 1.55 µm was connected to an input port. Then, modulation characteristics were measured using an oscilloscope. During driving, the device temperature was controllably adjusted to the vicinity of a phase transition. The modulation operating voltage was at most 6 V when no bias was applied.

EXAMPLE 4

Example 4 relates to a waveguide electro-optic phase shifter using a simple metal as an electrode material and also using the electrodes shown in FIGS. 29A and 29B. A buried optical waveguide is produced which comprises a core composed of KTN having a refractive index of 2.184 and a clad composed of KTN having a small refractive index, the refractive indices being obtained by adjusting the Ta/Nb concentration ratio. Further, Li is doped in each of the clad and core layers in order to more precisely adjust the refractive indices. The size of a cross section of the core in the optical waveguide is 6×6 µm. The thickness of the clad on the core is set at 6 µm.

Moreover, a thin gold film is formed on the optical waveguide by the sputter process. Then, photolithography and the dry etching process are used to produce electrodes for applying electric fields which have a gap width of 6 µm, an electrode width of 100 µm, a thickness of 1 µm, and a gap width of 6 µm. The length of the electrodes is 3 mm. The electrodes are terminated at 50 ohm in order to suppress reflection of an applied voltage. During driving, the device temperature was controllably adjusted to the vicinity of a phase transition. A laser light source of wavelength 1.55 µm was connected to an input port. Then, modulation characteristics were measured using an oscilloscope. In both TE and TM modes, the modulation index decreased to a half of a direct current value over a bandwidth of 5 GHz. The modulation operating voltage was at most 6 V when no bias was applied. The resistance was adjusted to 50 ohm using a terminal resistor. The laser light source of wavelength 1.55 µm was connected to the input port. Then, modulation characteristics were measured using the oscilloscope. The modulation operating voltage was at most 6 V.

EXAMPLE 5

FIG. 34 is a diagram showing the configuration of an example of a Mach-Zehnder interferometer according to the present embodiment in which the electrodes shown in FIGS. 29A, 29B, 30A, and 30B are used as a waveguide electro-optic phase shifter. In FIG. 34, reference numerals 340, 341, and 342 denote a clad, an input port, and a 3-dB coupler, respectively. Reference numerals 343a, 343b, and 343c denote electrodes (electric field applying section). Reference numerals 344, 345, 346, and 347 denote a Y branching optical waveguide (three-dimensional optical waveguide), a 3-dB coupler, an output port, and an application power source, respectively. The Mach-Zehnder interferometer comprises the one input port 341, the 3-dB coupler 342, connected to the input port 341, the three-dimensional optical waveguides 344, connected to the 3-dB coupler 342, the 3-dB coupler 345, connected to the three-dimensional optical waveguides 344, and the output waveguide 346, connected to the 3-dB coupler 345. Further, the electrodes shown in FIGS. 30A and 30B are arranged along the channel waveguide closer to the reader in the figure. The electrodes shown in FIGS. 29A and 29B are arranged along the channel waveguide farther from the reader in the figure.

With this configuration, for a phase shifter having the electrodes shown in FIGS. 29A, 29B, 30A, and 30B, the phase shifter in the TE mode and the phase shifter in the TM mode are complementary to each other. Consequently, a light intensity modulator configured in this manner can operate independently of polarization. Actually, in both TE and TM modes, the modulation index decreased to a half of a direct current value over a bandwidth of 5 GHz. The modulation operating voltage was at most 6 V when no bias was applied.

However, it should be appreciated that with fixed polarization, similar effects can be produced by arranging the electrodes shown in FIGS. 29A and 29B or 30A and 30B along one of the two channel waveguides depending on whether an incident light is in the TE or TM mode.

EXAMPLE 6

Figure 35A:
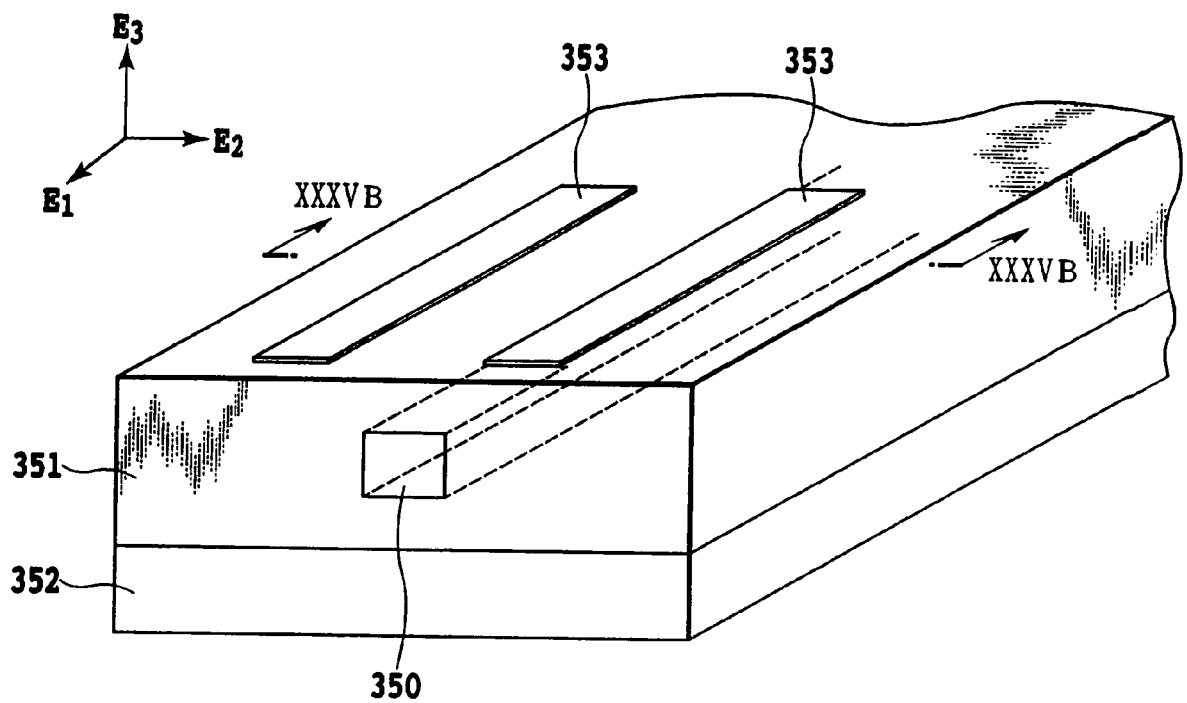
FIG. 35A is a perspective view illustrating a waveguide electro-optic phase shifter according to one embodiment of the present invention.
Figure 35B:
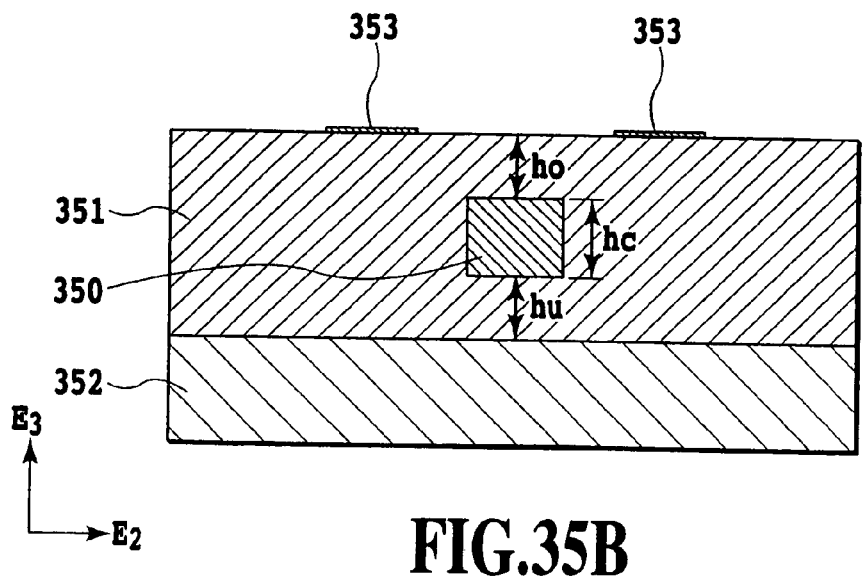
FIG. 35B is a sectional view taken along a line XXXVB-XXXVB in FIG. 35A.

FIGS. 35A and 35B are diagrams showing the configuration of a waveguide electro-optic phase shifter using the electrodes according to the present invention, the diagrams illustrating Example 6. FIG. 35A is a perspective view illustrating the waveguide electro-optic phase shifter.

FIG. 35B is a sectional view taken along a line XXXVB-XXXVB in FIG. 35A. In the figures, reference numerals 350 and 351 denote a core and a clad. Reference numerals 352 and 353 denote a substrate and an electrode.

The waveguide electro-optic phase shifter according to the present embodiment employs a cubic crystal having a secondary electro-optic effect. The waveguide electro-optic phase shifter comprises a buried three-dimensional channel optical waveguide in which when the core thickness of the crystal is defined as hc, the lower clad thickness hu and the upper clad thickness ho are $0 \leq hu$ and $ho \leq 3hc$. In the phase shifter, two electrodes 353 are arranged opposite each other and parallel to each other across a three-dimensional optical waveguide.

As a crystal, a waveguide composed of a crystal material consisting of KTN and KLTN is placed on a substrate using a crystal material consisting of KTN and KLTN.

For the composition ratio of the crystal material, the composition ratio X is at least 0 and at most 1. The composition ratio Y is more than 0 and less than 0.1. The KTN and KLTN, the material for the waveguide, has a relative dielectric constant larger than that of the crystal material used for the substrate by at least one order.

Moreover, the difference in specific refractive index between the core and the clad is more than 0% and at most 1.5%. Furthermore, the electrodes are composed of ZnO in which at least one of Al, Ga, In, and B is doped or ITO in which at least one of Sn, Ti, Zr, Hf, Nb, Ra, W, Ge, Mo, Sb, Te, Au, Pt, and Pg.

Description will be given below of a method of producing a waveguide electro-optic phase shifter according to Example 6.

First, a buried optical waveguide is produced which comprises a core portion composed of a KTN having a refractive index of 2.184 and a clad portion composed of a KTN having a small refractive index, the refractive indices being obtained by adjusting the Ta/Nb concentration ratio. The relative dielectric constant of the waveguide is confirmed to be larger than that of the substrate 352 by at least one order. Li is doped in each of the clad and core layers in order to more precisely adjust the refractive indices. The difference in refractive index between the core 350 and the clad 351 is 0.5%. The size of a cross section of the core in the optical waveguide is 6×6 µm. The thickness of the clad the lower clad hu below the core 350 is set at 6 µm. The thickness of the upper clad ho above the core 350 is set at 1 µm.

Moreover, a thin gold film is formed on the optical waveguide by the sputter process. Then, photolithography and the dry etching process are used to produce electrodes for applying electric fields which consist of Sn doped ITO and which have a gap width of 6 µm, an electrode width of 100 µm, a thickness of 1 µm, and a gap width of 6 µm. The length of the electrodes is 1 mm. The electrodes are terminated at 50 ohm in order to suppress reflection of an applied voltage. A laser light source of wavelength 1.55 µm was connected to an input port. Then, modulation characteristics were measured using an oscilloscope. During driving, the device temperature was controllably adjusted to the vicinity of a phase transition. The modulation operating voltage was at most 2.5 V when no bias was applied. Further, when a 6-V bias voltage was applied, the modulation operating voltage was at most 0.5 V. Furthermore, the response characteristic has been confirmed not to degrade until about 10 GHz.

EXAMPLE 7

Figure 36A:
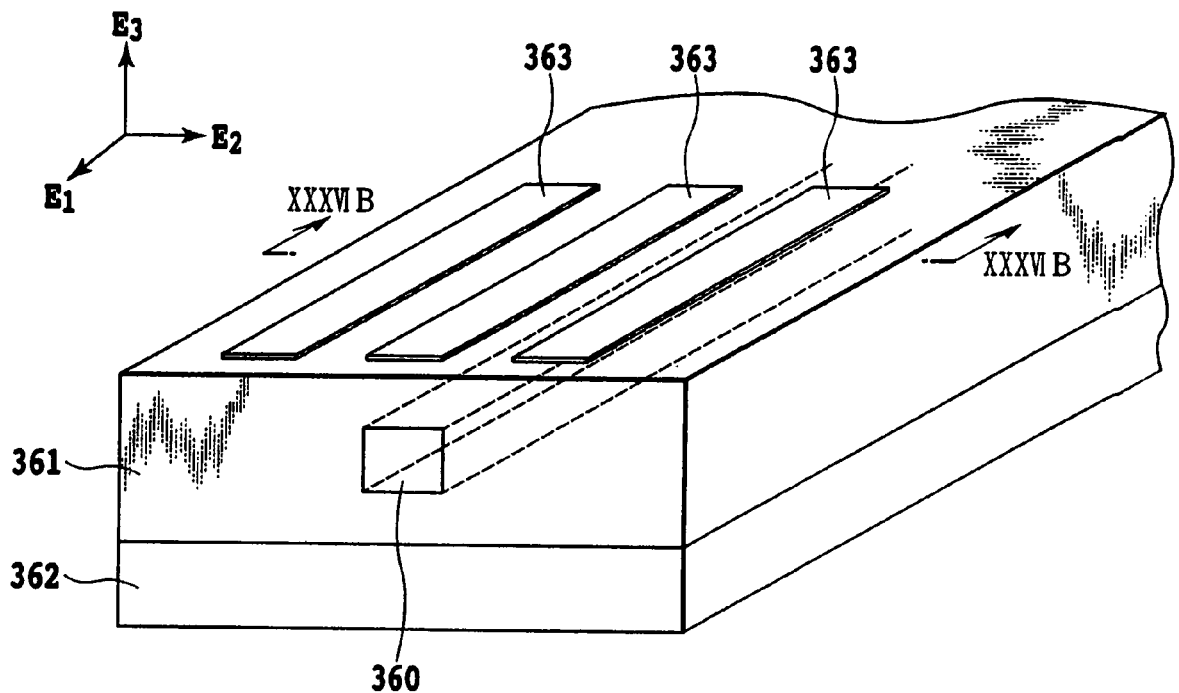
FIG. 36A is a perspective view illustrating a waveguide electro-optic phase shifter according to one embodiment of the present invention.
Figure 36B:
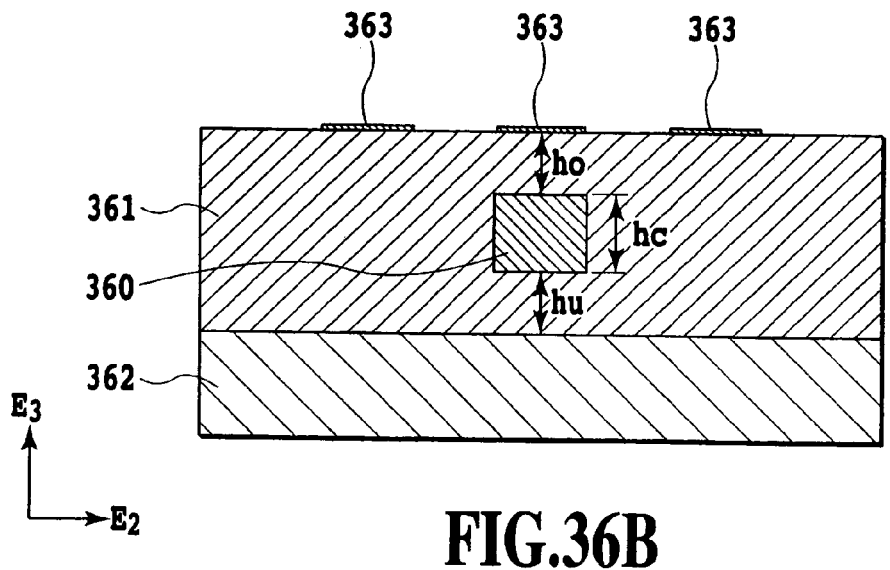
FIG. 36B is a sectional view taken along a line XXXVIB-XXXVIB in FIG. 36A.

FIGS. 36A and 36B are diagrams showing the configuration of a waveguide electro-optic phase shifter using the electrodes according to the present invention, the diagrams illustrating Example 7. FIG. 36A is a perspective view illustrating the waveguide electro-optic phase shifter. FIG. 36B is a sectional view taken along a line XXXVIB-XXXVIB in FIG. 36A. In the figures, reference numerals 360 and 361 denote a core and a clad. Reference numerals 362 and 363 denote a substrate and an electrode. In the phase shifter according to Example 7, two electrodes 363 are arranged opposite each other and parallel to each other across a three-dimensional optical waveguide. Further, one electrode 363 is placed on a channel waveguide.

Description will be given below of a method of producing a waveguide electro-optic phase shifter according to Example 7.

First, a buried optical waveguide is produced which comprises a core composed of a KTN having a refractive index of 2.184 and a clad composed of a KTN having a small refractive index, the refractive indices being obtained by adjusting the Ta/Nb concentration ratio. The relative dielectric constant of the waveguide is confirmed to be larger than that of the substrate 362 by at least one order. Li is doped in each of the clad and core layers in order to more precisely adjust the refractive indices. The difference in refractive index between the core 360 and the clad 361 is 0.5%. The size of a cross section of the core in the optical waveguide is 6×6 µm. The thickness of the lower clad hu below the core 360 is set at 6 µm. The thickness of the upper clad ho above the core 360 is set at 1 µm.

Moreover, an ITO film is formed on the optical waveguide by the sputter process. Then, photolithography and the dry etching process are used to produce electrodes for applying electric fields which consist of Sn doped ITO and which have a gap width of 6 µm, an electrode width of 100 µm, a thickness of 1 µm, and a gap width of 6 µm. The length of the electrodes is 1 mm. The electrodes are terminated at 50 ohm in order to suppress reflection of an applied voltage. A laser light source of wavelength 1.55 µm was connected to an input port. Then, modulation characteristics were measured using an oscilloscope. During driving, the device temperature was controllably adjusted to the vicinity of a phase transition. The modulation operating voltage was at most 2.5 V when no bias was applied. Further, when a 6-V bias voltage was applied, the modulation operating voltage was at most 0.5 V. Furthermore, the response characteristic has been confirmed not to degrade until about 10 GHz.

EXAMPLE 8

Example 8 relates to a waveguide electro-optic phase shifter using a simple metal as an electrode material and also using the electrodes shown in FIGS. 35A and 35B.

Description will be given below of a method of producing a waveguide electro-optic phase shifter according to Example 8.

First, a buried optical waveguide is produced which comprises a core composed of a KTN having a refractive index of 2.184 and a clad composed of a KTN having a small refractive index, the refractive indices being obtained by adjusting the Ta/Nb concentration ratio. Li is doped in each of the clad and core layers in order to more precisely adjust the refractive indices. The difference in refractive index between the core 350 and the clad 351 is 0.5%. The size of a cross section of the core in the optical waveguide is 6×6 μm. The thickness of the lower clad hu below the core 350 is set at 1 μm. The thickness of the upper clad ho above the core 350 is set at 6 μm.

Moreover, a thin gold film is formed on the optical waveguide by the sputter process. Then, photolithography and the dry etching process are used to produce electrodes for applying electric fields which consist of Au and which have a gap width of 6 μm, an electrode width of 100 μm, a thickness of 1 μl, and a gap width of 6 μm. The length of the electrodes is 3 mm. The electrodes are terminated at 50 ohm in order to suppress reflection of an applied voltage. A laser light source of wavelength 1.55 μm was connected to an input port. Then, modulation characteristics were measured using an oscilloscope. The modulation operating voltage was at most 6 V when no bias was applied. Furthermore, the response characteristic has been confirmed not to degrade until about 10 GHz.

EXAMPLE 9

Example 9 relates to a waveguide electro-optic phase shifter using a simple metal as an electrode material and also using the electrodes shown in FIGS. 36A and 36B.

Description will be given below of a method of producing a waveguide electro-optic phase shifter according to Example 9.

First, a buried optical waveguide is produced which comprises a core composed of a KTN having a refractive index of 2.184 and a clad composed of a KTN having a small refractive index, the refractive indices being obtained by adjusting the Ta/Nb concentration ratio. Li is doped in each of the clad and core layers in order to more precisely adjust the refractive indices. The difference in refractive index between the core 360 and the clad 361 is 0.5%. The size of a cross section of the core in the optical waveguide is 6×6 μm. The thickness of the lower clad hu below the core 360 is set at 1 μm. The thickness of the upper clad ho above the core 360 is set at 6 μm.

Moreover, a thin gold film is formed on the optical waveguide by the sputter process. Then, photolithography and the dry etching process are used to produce electrodes for applying electric fields which consist of Pt and which have a gap width of 6 μm, an electrode width of 100 am, a thickness of 1 μm, and a gap width of 6 μm. The length of the electrodes is 3 mm. The electrodes are terminated at 50 ohm in order to suppress reflection of an applied voltage. A laser light source of wavelength 1.55 μm was connected to an input port. Then, modulation characteristics were measured using an oscilloscope. The modulation operating voltage was at most 6 V when no bias was applied. Furthermore, the response characteristic has been confirmed not to degrade until about 10 GHz.

EXAMPLE 10

Figure 37A:
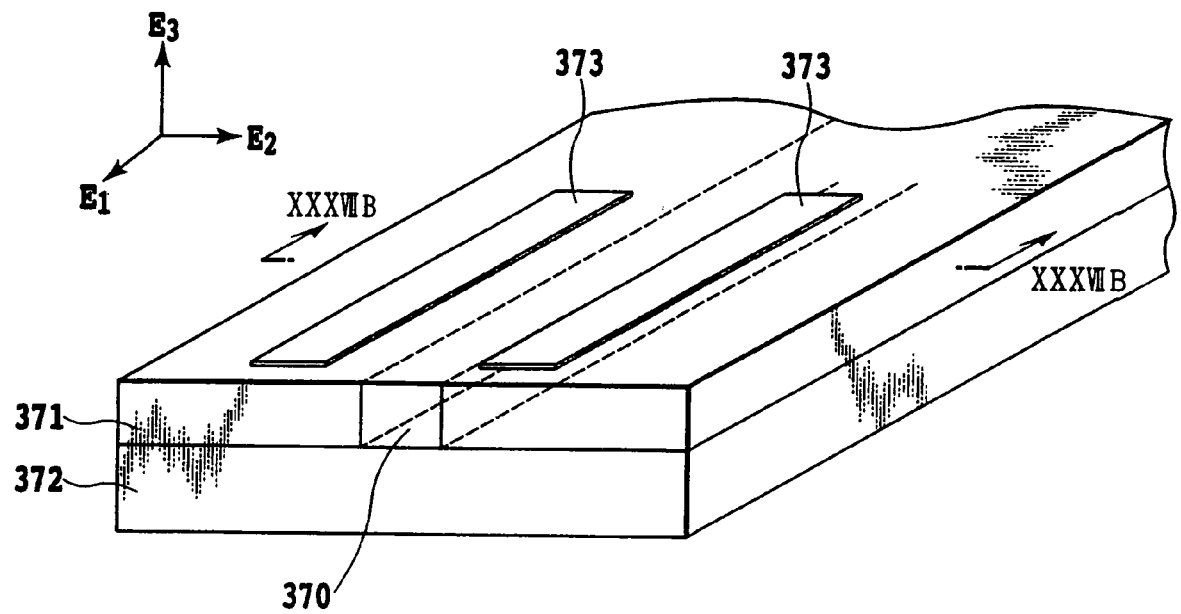
FIG. 37A is a perspective view illustrating a waveguide electro-optic phase shifter according to one embodiment of the present invention.
Figure 37B:
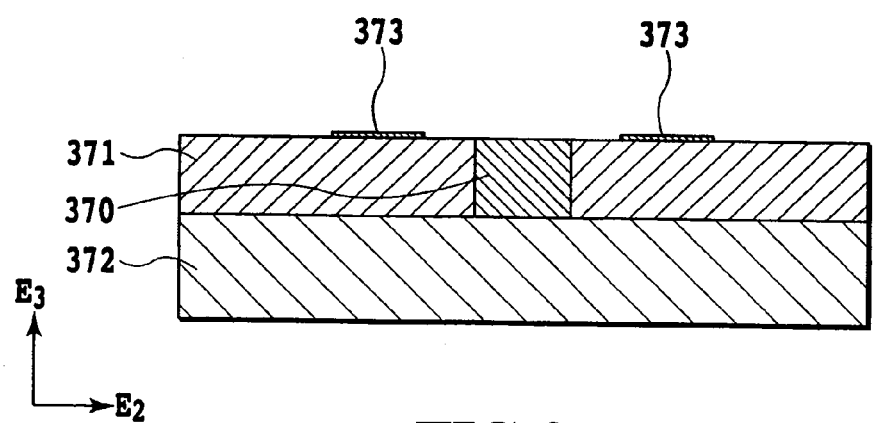
FIG. 37B is a sectional view taken along a line XXXVIIB-XXXVIIB in FIG. 37A.

FIGS. 37A and 37B are diagrams showing the configuration of a waveguide electro-optic phase shifter using the electrodes according to the present invention, the diagrams illustrating Example 10. FIG. 37A is a perspective view illustrating the waveguide electro-optic phase shifter. FIG. 37B is a sectional view taken along a line XXXVIIB-XXXVIIB in FIG. 37A. In the figures, reference numerals 370 and 371 denote a core and a clad. Reference numerals 372 and 373 denote a substrate and an electrode. In the phase shifter according to Example 10, two electrodes 373 are arranged opposite each other and parallel to each other across a three-dimensional optical waveguide. The core 370 is formed directly on the substrate 372 and the electrodes 373 are used, without using the lower clad shown in FIGS. 35A and 35B.

Description will be given below of a method of producing a waveguide electro-optic phase shifter according to Example 10.

First, a buried optical waveguide is produced which comprises a core composed of a KTN having a refractive index of 2.184 and a clad composed of a KTN having a small refractive index, the refractive indices being obtained by adjusting the Ta/Nb concentration ratio. The relative dielectric constant of the waveguide is confirmed to be larger than that of the substrate 372 by at least one order. Li is doped in each of the clad and core layers in order to more precisely adjust the refractive indices. The difference in refractive index between the core 370 and the clad 371 is 1.5%. The size of a cross section of the core in the optical waveguide is 6×6 μm. The thickness of the clad ho above the core 370 is set at 1 μm.

Moreover, a thin gold ITO film is formed on the optical waveguide by the sputter process. Then, photolithography and the dry etching process are used to produce electrodes for applying electric fields which consist of Sn doped ITO and which have a gap width of 6 am, an electrode width of 100 μm, a thickness of 1 μm, and a gap width of 6 am. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. During driving, the device temperature was controllably adjusted to the vicinity of a phase transition. The modulation operating voltage was at most 2.5 V when no bias was applied. Further, when a 6-V bias voltage was applied, the modulation operating voltage was at most 0.5 V. Furthermore, the response characteristic has been confirmed not to degrade until about 10 GHz.

EXAMPLE 11

Figure 38A:
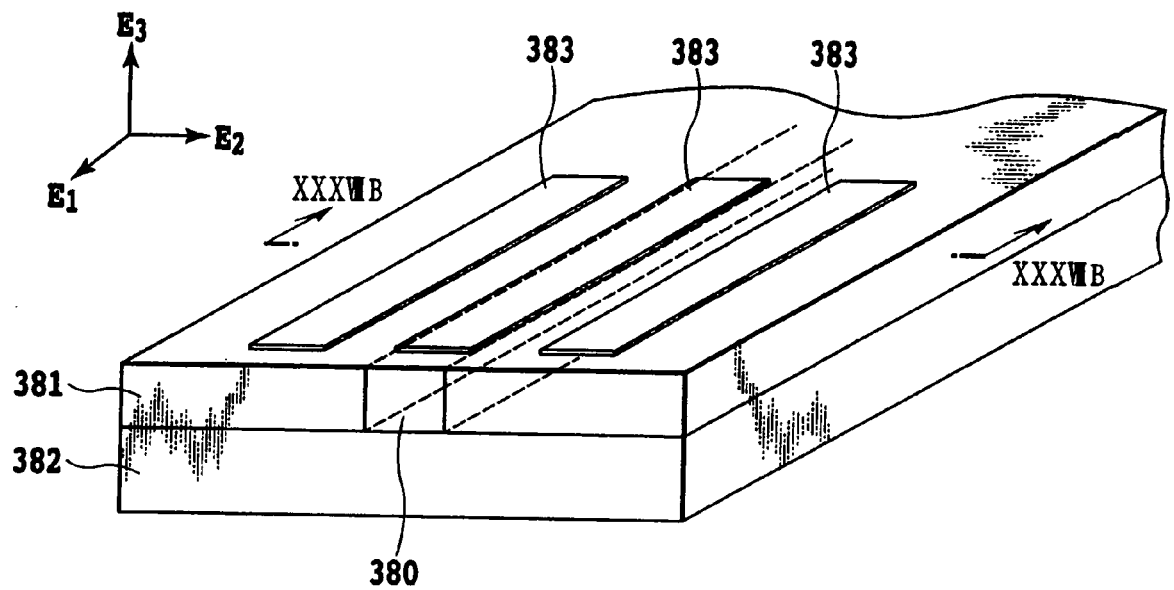
FIG. 38A is a perspective view illustrating a waveguide electro-optic phase shifter according to one embodiment of the present invention.
Figure 38B:
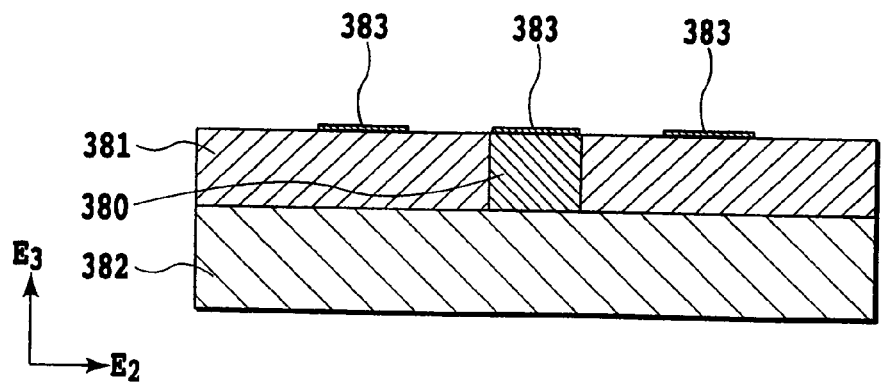
FIG. 38B is a sectional view taken along a line XXXVIIIB-XXXVIIIB in FIG. 38A.

FIGS. 38A and 38B are diagrams showing the configuration of a waveguide electro-optic phase shifter using the electrodes according to the present invention, the diagrams illustrating Example 11. FIG. 38A is a perspective view illustrating the waveguide electro-optic phase shifter. FIG. 38B is a sectional view taken along a line XXXVIIIB-XXXVIIIB in FIG. 38A. In the figures, reference numerals 380 and 381 denote a core and a clad. Reference numerals 382 and 383 denote a substrate and an electrode. In the phase shifter according to Example 11, two electrodes 383 are arranged opposite each other and parallel to each other across a three-dimensional optical waveguide. Further, one thin film electrode 383 for applying electric fields is placed on a channel waveguide. The core 380 is formed directly on the substrate 382 and the electrodes 383 are used, without using the lower clad.

Description will be given below of a method of producing a waveguide electro-optic phase shifter according to Example 11.

First, a buried optical waveguide is produced which comprises a core composed of a KTN having a refractive index of 2.184 and a clad composed of a KTN having a small refractive index, the refractive indices being obtained by adjusting the Ta/Nb concentration ratio. The relative dielectric constant of the waveguide is confirmed to be larger than that of the substrate 382 by at least one order. Li is doped in each of the clad and core layers in order to more precisely adjust the refractive indices. The difference in refractive index between the core 380 and the clad 381 is 1.5%. The size of a cross section of the core in the optical waveguide is 4×4 μm. The thickness of the clad ho above the core 380 is set at 0 μm.

Moreover, an ITO film is formed on the optical waveguide by the sputter process. Then, photolithography and the dry etching process are used to produce electrodes for applying electric fields which consist of Sn doped ITO and which have a gap width of 6 μm, an electrode width of 100 μm, a thickness of 1 μm, and a gap width of 6 μm. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. During driving, the device temperature was controllably adjusted to the vicinity of a phase transition. The modulation operating voltage was at most 2.5 V when no bias was applied. Further, when a 6-V bias voltage was applied, the modulation operating voltage was at most 0.5 V. Furthermore, the response characteristic has been confirmed not to degrade until about 10 GHz.

EXAMPLE 12

FIG. 31 is a diagram illustrating the configuration of Example 12 of an optical modulator according to the present embodiment. This example of the optical modulator uses as an electro-optic phase shifter the electrodes for the optical waveguide with the electrodes shown in FIGS. 28A and 28B.

In FIG. 31, reference numerals 310, 311, and 312 denote a clad, an input port, and a 3-dB coupler, respectively. Reference numerals 313, 314, and 315 denote an electrode (electric field applying section), Y branching optical waveguides (three-dimensional optical waveguides), and a 3-dB coupler, respectively. Reference numerals 316 and 317 denote an output port and an application power source, respectively. A longitudinal cross section of the electrode 313 corresponds to FIG. 28B.

As shown in FIG. 31, the optical modulator according to the present embodiment comprises the one input port 311, the 3-dB coupler 312, connected to the input port 311, the three-dimensional optical waveguides 314, connected to the 3-dB coupler 312, the 3-dB coupler 315, connected to the three-dimensional optical waveguides 314, the output port 316, connected to the 3-dB coupler 315, and the one electric field applying section 313, placed along at least one of the Y branching waveguides 314.

In other words, the optical modulator according to the present embodiment is of a Mach-Zehnder type in which the material for the waveguides is a cubic crystal having a secondary electro-optic effect and which has the at least one input port 311, the two 3-dB couplers 312 and 315, the two three-dimensional optical waveguides (Y branching optical waveguides) 314, and the one output port 316. The optical modulator further has an electro-optic phase shifter having the electrode 313 placed on at least one of the three-dimensional optical waveguides 314. The one electrode 313 is placed on the channel waveguide 314. Further, the electrode 313 has positive and negative poles alternately arranged perpendicularly to the three-dimensional optical waveguide 314.

Each of the 3-dB couplers 312 and 315 is shaped like a fan having a predetermined radius of curvature. A buried optical waveguide is produced which comprises a core composed of a KTN having a refractive index of 2.184 and a clad composed of a KTN having a small refractive index, the refractive indices being obtained by adjusting the Ta/Nb concentration ratio. Li is doped in each of the clad and core layers in order to more precisely adjust the refractive indices.

The dielectric crystal includes a crystal material consisting of KTN and KLTN. For the composition ratio of the crystal material, the composition ratio X is at least 0 and at most 1. The composition ratio Y is more than 0 and less than 0.1.

The size of across section of the core in the Y branching optical waveguide is 6×6 μm. A metal film is formed on the optical waveguide by the sputter process. Then, photolithography and the dry etching process are used to produce electrodes 313 for applying electric fields which have a design width of 10 μm and a thickness of 1 μm. The electrodes are terminated at 50 ohm in order to suppress reflection of an applied voltage. A laser light source of wavelength 1.55 μm was connected to an input port. Then, modulation characteristics were measured using an oscilloscope. In both TE and TM modes, the modulation index decreased to a half of the direct current value over a bandwidth of 5 GHz. The modulation operating voltage was at most 5 V.

EXAMPLE 13

Figure 32:
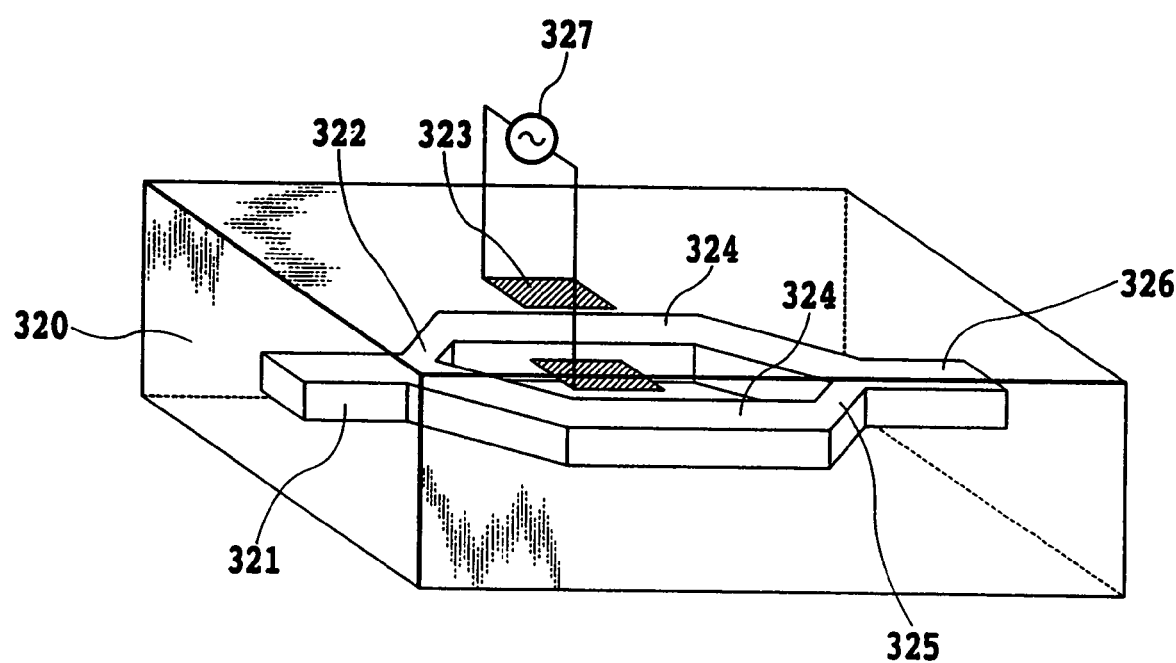
FIG. 32 is a diagram showing the configuration of an optical modulator according to one embodiment of the present invention.

FIG. 32 is a diagram illustrating the configuration of Example 13 of an optical modulator using the dielectric crystal according to the present embodiment. This example of the optical modulator uses as an electro-optic phase shifter the electrodes for the optical waveguide with the electrodes shown in FIGS. 30A and 30B.

In FIG. 32, reference numerals 320, 321, and 322 denote a clad, an input port, and a 3-dB coupler, respectively. Reference numerals 323, 324, and 325 denote an electrode (electric field applying section), Y branching optical waveguides (three-dimensional optical waveguides), and a 3-dB coupler, respectively. Reference numerals 326 and 327 denote an output port and an application power source, respectively. A longitudinal cross section of the electrode 323 corresponds to FIG. 30B.

In Example 13, two electrodes 323 are arranged opposite each other and parallel to each other across one of the three-dimensional optical waveguides 324. Further, the electrodes 323 have positive and negative poles alternately arranged perpendicularly to the three-dimensional optical waveguide 324.

A method of producing an optical modulator according to Example 13 is similar to that according to Example 12. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. In the TM mode, the modulation index decreased to a half of the direct current value over a bandwidth of 5 GHz. The modulation operating voltage was at most 3 V.

EXAMPLE 14

Figure 33:
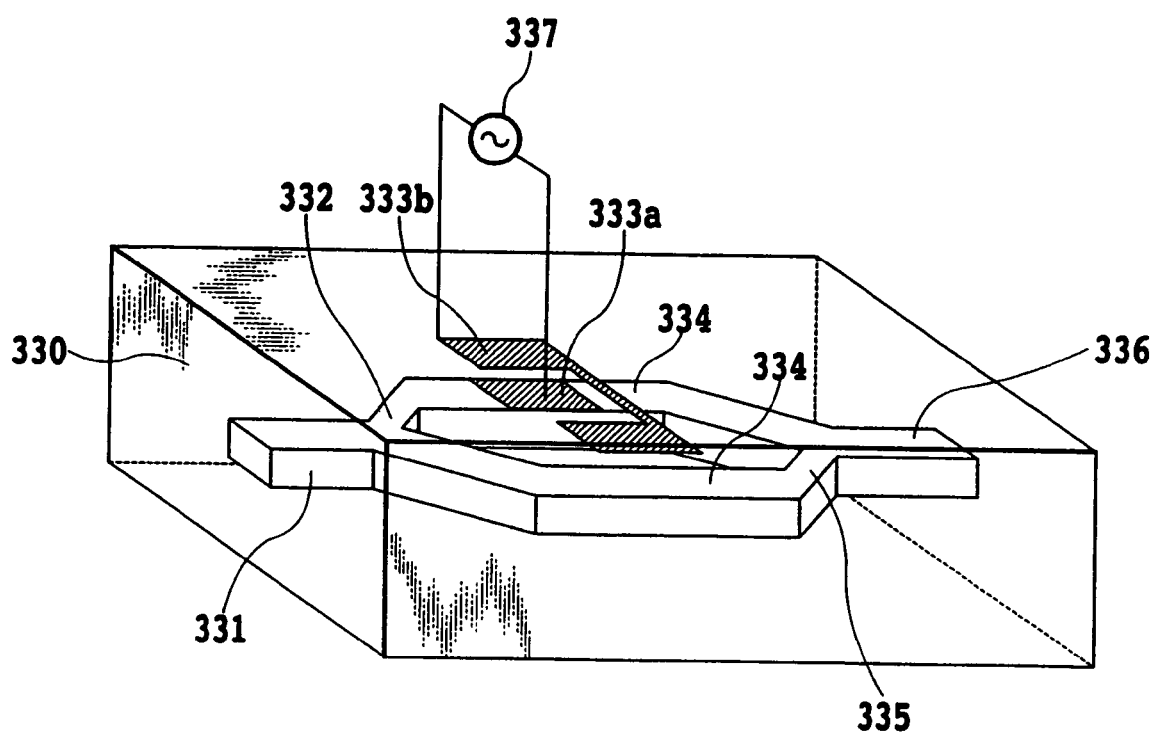
FIG. 33 is a diagram showing the configuration of an optical modulator according to one embodiment of the present invention.

FIG. 33 is a diagram illustrating the configuration of Example 14 of an optical modulator using the dielectric crystal according to the present embodiment. This example of the optical modulator uses as an electro-optic phase shifter the electrodes for the optical waveguide with the electrodes shown in FIGS. 29A and 29B.

In FIG. 33, reference numerals 330, 331, and 332 denote a clad, an input port, and a 3-dB coupler, respectively. Reference numerals 333*a* and 333*b* denote electrodes (electric field applying section). Reference numerals 334 and 335 denote Y branching optical waveguides (three-dimensional optical waveguides) and a 3-dB coupler, respectively. Reference numerals 336 and 337 denote an output port and an application power source, respectively. Cross sections of the electrodes 333a and 333b correspond to FIG. 29B.

In Example 14, two electrodes 333b are arranged opposite each other and parallel to each other across one of the three-dimensional optical waveguides 334. Further, the one electrode 333a is placed on the channel waveguide 334. The electrodes 333a and 333b have positive and negative poles alternately arranged perpendicularly to the three-dimensional optical waveguide 334.

A method of producing an optical modulator according to Example 14 is similar to that according to Example 12. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. In the TM mode, the modulation index decreased to a half of the direct current value over a bandwidth of 5 GHz. The modulation operating voltage was at most 3 V.

EXAMPLE 15

Example 15 relates to an optical modulator uses as an electro-optic phase shifter the electrodes for the optical waveguide with the electrodes shown in FIGS. 29A, 29B, 30A, and 30B.

A method of producing an optical modulator according to Example 15 is similar to that according to Example 12. The length of the electrodes is 1 mm. The electrodes are terminated at 50 ohm in order to suppress reflection of an applied voltage. A laser light source of wavelength 1.55 μm was connected to an input port. Then, modulation characteristics were measured using an oscilloscope. In both TM and TE modes, the modulation index decreased to a half of the direct current value over a bandwidth of 5 GHz. The modulation operating voltage was at most 2.5 V.

In FIG. 34, the electrodes shown in FIGS. 30A and 30B are arranged along the channel waveguide closer to the reader in the figure. The electrodes shown in FIGS. 29A and 29B are arranged along the channel waveguide farther from the reader in the figure. However, the present invention is not limited to this aspect. It should be appreciated that similar effected can be produced by arranging the electrodes shown in FIGS. 37A and 37B instead of the electrodes shown in FIGS. 30A and 30B, or arranging the electrodes shown in FIGS. 38A and 38B instead of the electrodes shown in FIGS. 29A and 29B.

With this configuration, for a phase shifter having the electrodes shown in FIGS. 30A and 30B (or 37A and 37B) and 29A and 29B (or 38A and 38B), the phase shifter in the TE mode and the phase shifter in the TM mode are complementary to each other. Consequently, the optical modulator can operate independently of polarization. However, it should be appreciated that with fixed polarization, similar effects can be produced by arranging the electrodes shown in FIGS. 30A and 30B (or 37A and 37B) or 29A and 29B (or 38A and 38B) along one of the two channel waveguides depending on whether an incident light is in the TE or TM mode.

EXAMPLE 16

An optical modulator according to Example 16 is configured similarly to the optical modulator according to Example 12. However, the optical switch according to Example 16 differs from the optical modulator according to Example 12 in that its optical waveguides are made of a BTO crystal or the like. An optical modulator having such a configuration was produced and its operations were checked.

When the optical switch according to Example 16 was operated while controllably adjusting the temperature of the BTO waveguide part at 110° C., modulation characteristics similar to those of the optical modulator according to Example 12 were obtained. Further, the BTO and STO were mixed together in the ratio of 0.73:0.27 to produce waveguides consisting of the single crystal $Ba_{0.73}Sr_{0.27}TiO_3$. The waveguides were then used to produce a similar optical modulator. In this case, at 10° C., the optical modulator exhibited characteristics similar to those obtained using the BTO waveguides. Similar operations were able to be performed by an optical modulator using PLZT as a material for the waveguides.

Description will be given below of an optical modulator using progressive wave electrodes according to the third embodiment.

If an optical modulator is implemented using the KTN and KLTN as well as progressive wave electrodes, the speed of a light traveling through the optical waveguide differs markedly from the speed of a microwave propagating through the electrode. The KTN, which is a cubic crystal, has a refractive index of about 2.14 for light but has a dielectric constant of as large as 20,000 as described above. Accordingly, the effective refractive index for the microwave is about 141, which is about 70 times as large as that for light. In this manner, when a microwave and a light wave pass through the KTN, their speeds may fail to match. This limits the operating speed of the optical modulator. Accordingly, an optical device using the progressive wave electrodes as well as the KTN and KLTN have a large electro-optic constant but also has a large dielectric constant. It is thus difficult to implement a modulator operated at a high speed of the order of GHz or more.

An optical modulator (broad-band optical modulator) using progressive wave electrodes according to the third embodiment has optical waveguides through which light is propagated and electrodes that apply electric fields to the optical waveguides. The optical waveguides are composed of a dielectric crystal which is cubic like a KTN and KLTN crystals and which has a significant secondary electro-optic effect. Further, the electrodes are progressive wave electrodes. The broad-band optical modulator according to the third embodiment is characterized by using progressive wave electrodes as modulating electrodes to match the speeds of a microwave and a light wave with each other. More specifically, the thickness of the electrodes is increased to reduce the effective refractive indices of the KTN and KLTN for the microwave. This serves to match the speeds of the microwave and light wave with each other.

EXAMPLE 17

Figure 39:
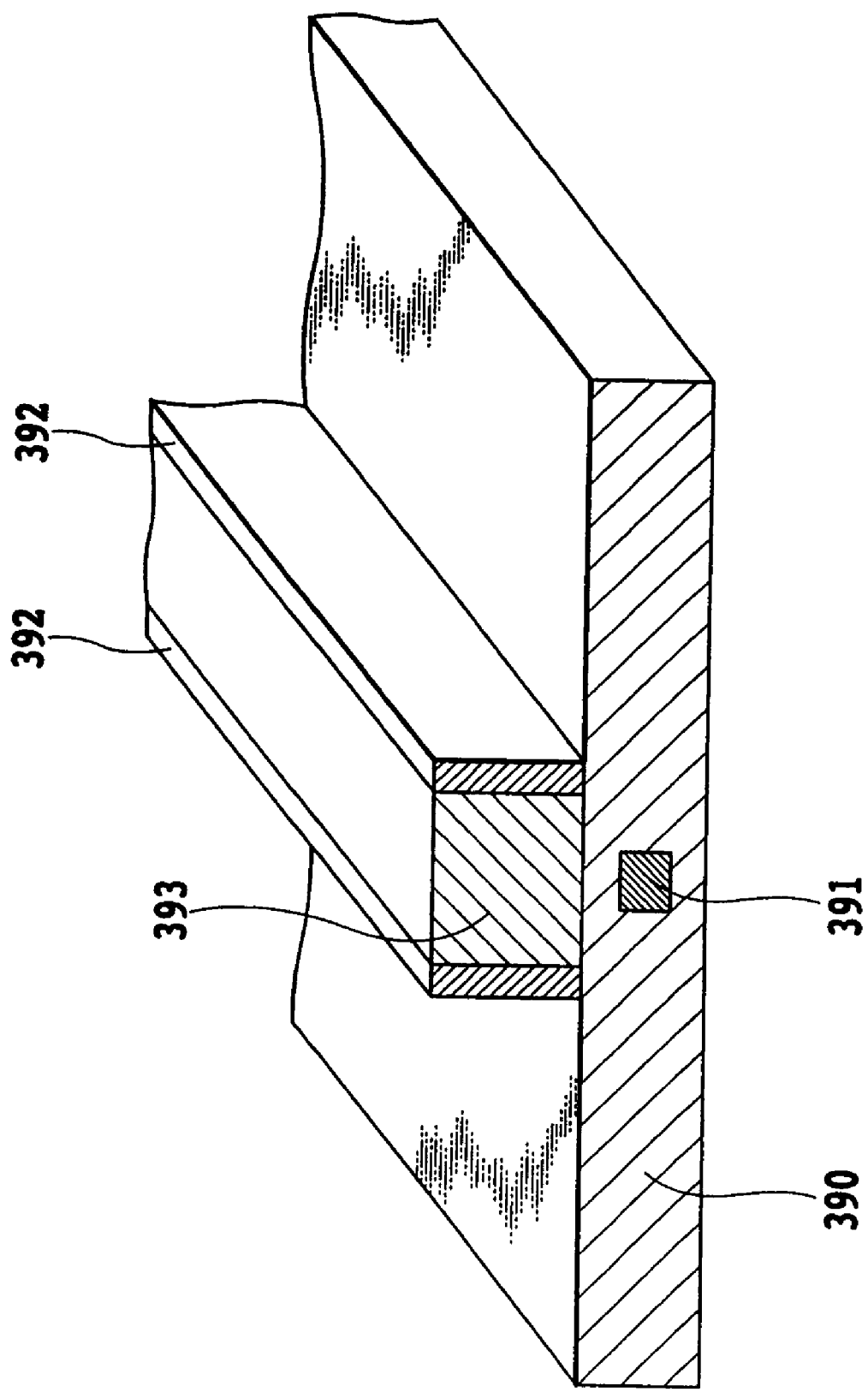
FIG. 39 is a sectional view of an optical modulator according to one embodiment of the present invention.

FIG. 39 is a sectional view of an optical modulator according to Example 17 of the third embodiment. In FIG. 39, a buried optical waveguide 391 consisting of KTN is formed on a KTN substrate 390. Moreover, an Au electrode 392 of thickness about 20 μm is formed on the substrate 390. When an Au electrode 392 is to be produced, a photo resist of thickness about 25 μm is formed on the buried waveguide. Subsequently, this pattern is used as a guide to form an Au electrode pattern of about 25 μm thickness by an electroplating process. A structure holding dielectric 393 with a dielectric constant of at most 10 is placed in the concave between the electrodes. A 3-dB band of the optical modulator was measured and confirmed to be about 10 GHz.

EXAMPLE 18

Figure 40:
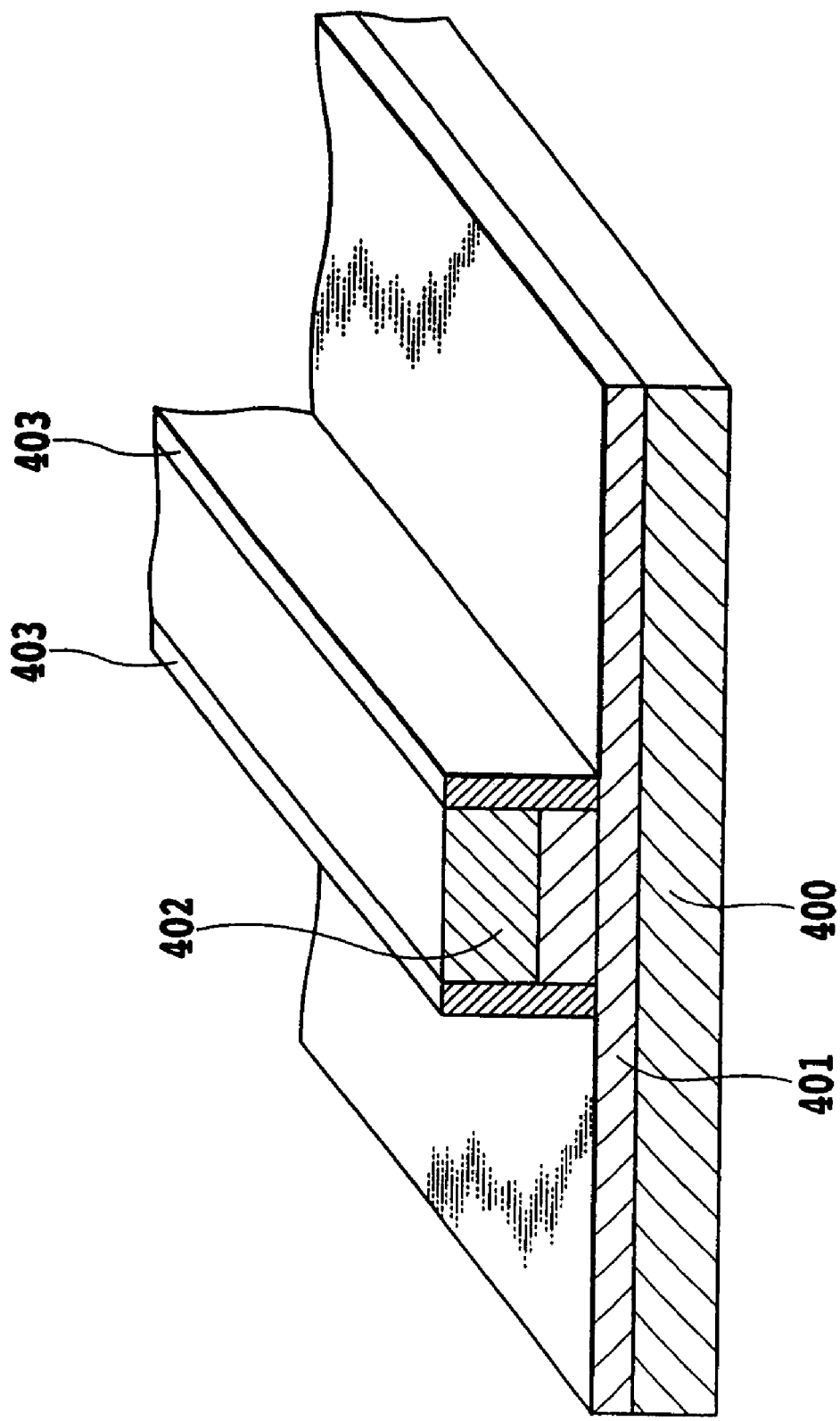
FIG. 40 is a sectional view of an optical modulator according to one embodiment of the present invention.

FIG. 40 is a sectional view of an optical modulator according to Example 18 of the third embodiment.

In Example 18, the optical waveguide is ridged to provide electrodes so that the effective refractive index for microwaves is more similar to that for light. A ridge-like optical waveguide 401 consisting of KTN is formed on the KTN substrate 400. Moreover, a modulating Au electrode 403 is produced so as to sandwich the ridge-like optical waveguide 401. This configuration allows a voltage to be applied to the ridge-like optical waveguide 401 in a direction parallel to the substrate 400. A method of producing this optical modulator is as described in Example 17. A low dielectric material with a dielectric constant of 10 is buried in an area shown by reference numeral 402 in FIG. 40. A 3-dB band of this optical modulator was measured and confirmed to be about 10 GHz.

EXAMPLE 19

Figure 41:
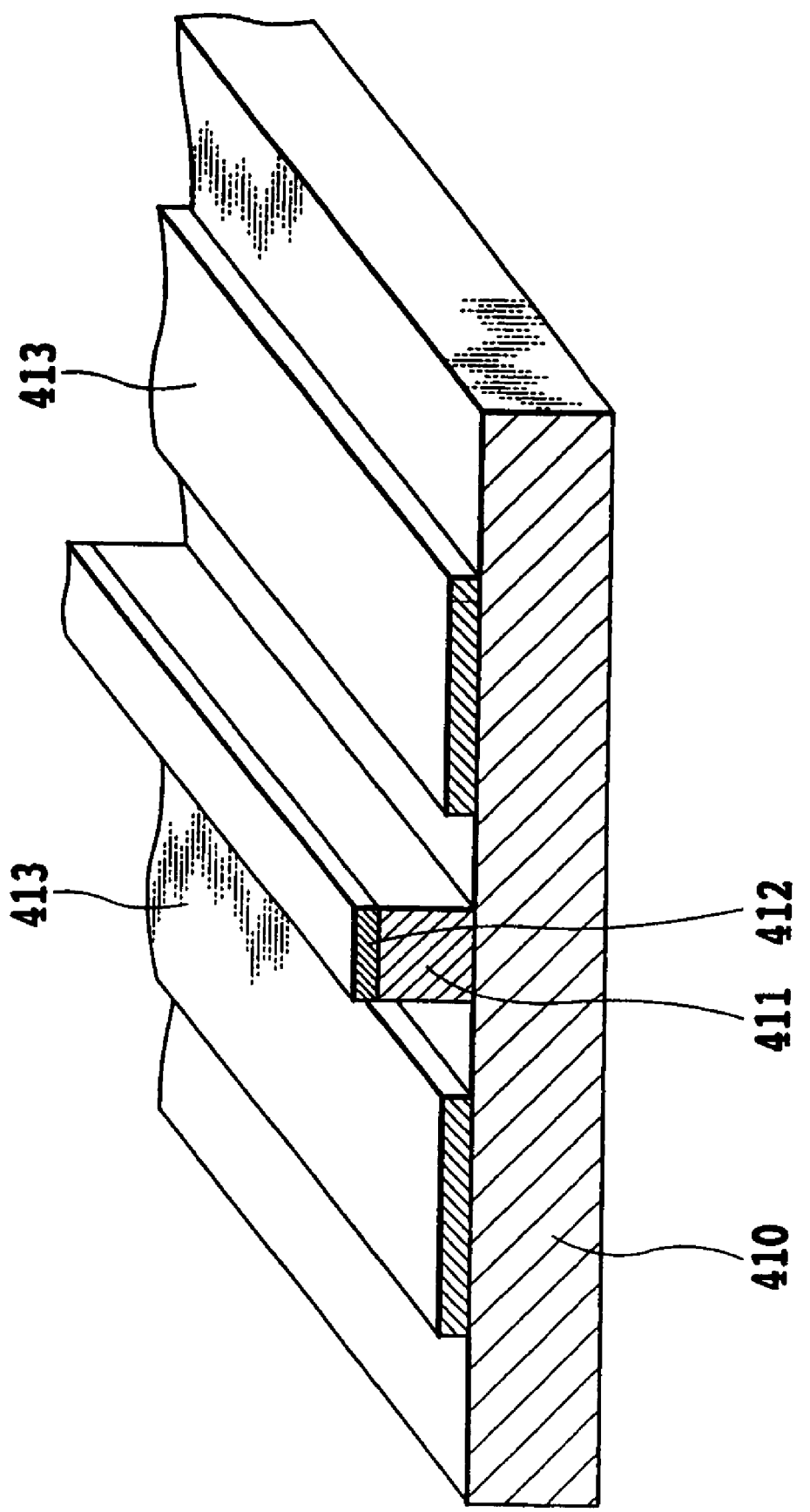
FIG. 41 is a sectional view of an optical modulator according to one embodiment of the present invention.

FIG. 41 is a sectional view of an optical modulator according to Example 19 of the third embodiment. A ridge-like optical waveguide 411 is formed on a KTN substrate 410. Moreover, modulating Au electrodes 412 and 413 are produced on a top surface of the ridge-like optical waveguide and immediately above the substrate 410, respectively, to apply electric fields perpendicularly to the substrate 410. This configuration allows a voltage to be applied to the ridge-like optical waveguide 411 in a direction perpendicularly to the substrate 410. A 3-dB band of this optical modulator was measured and confirmed to be about 10 GHz.

EXAMPLE 20

Figure 42:
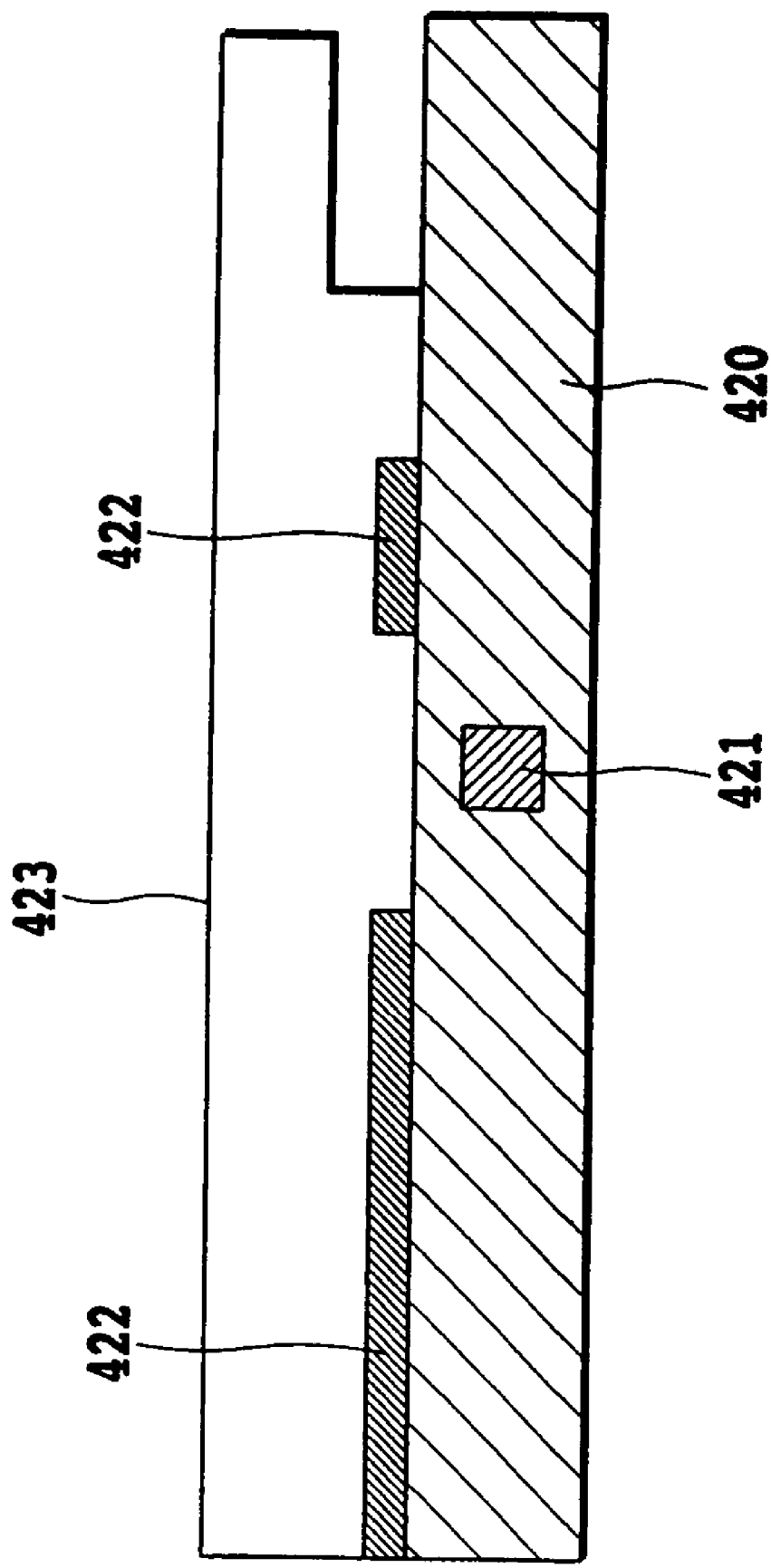
FIG. 42 is a sectional view of an optical modulator according to one embodiment of the present invention.

FIG. 42 is a sectional view of an optical modulator according to Example 20 of the third embodiment. The KTN substrate 420 is formed with a buried optical waveguide 421 consisting of KTN and modulating Au electrodes 422. Moreover, an earth electrode 423 is fixed on the Au electrode 422 via air having a thickness such that the effective refractive index of a microwave propagating through the Au electrode is more similar to that of a light propagating through the optical waveguide 421. When an earth electrode 423 is to be produced, an electrode is first produced by the electroplating process. Then, a photo resist is used to form a pattern of the earth electrode. The dry etching process is then used to process the electrode layer so that an air layer has a predetermined thickness. A 3-dB band of this optical modulator was measured and confirmed to be about 10 GHz.

EXAMPLE 21

An optical modulator according to Example 21 is configured similarly to the optical modulator according to Example 17. However, the optical switch according to Example 21 differs from the optical modulator according to Example 17 in that its optical waveguides are made of a BTO crystal or the like. An optical modulator having such a configuration was produced and its operations were checked.

When the optical switch according to Example 21 was operated while controllably adjusting the temperature of the BTO waveguide part at 110° C., modulation characteristics similar to those of the optical modulator according to Example 17 were obtained. Further, the BTO and STO were mixed together in the ratio of 0.73:0.27 to produce waveguides consisting of the single crystal $Ba_{0.73}Sr_{0.27}TiO_3$.

The waveguides were then used to produce a similar optical modulator. In this case, at 10° C., the optical modulator exhibited characteristics similar to those obtained using the BTO waveguides. Similar operations were able to be performed by an optical modulator using PLZT as a material for the waveguides.

In the above description of Examples 17 to 20, the KTN is a material for the substrate and optical waveguides. However, the present invention is not limited to this aspect. The substrate may be KLTN.

The phase shifters and optical modulators according to the third embodiment may comprise a temperature controller in order to allow the KTN, KLTN, or the like to operate near the Curie transition temperature. The temperature controller may be a Peltier element.

As described above, the third embodiment can implement a high-speed low-voltage-driven phase shifter and an optical modulator using this phase shifter, by utilizing optical waveguides based on a crystal material consisting of KTN and KLTN that are cubic dielectric crystals having a secondary electro-optic effect. This makes it possible to provide an optical modulator that can execute modulation using short electrodes and a low voltage.

Further, even if progressive wave electrodes are used in the optical modulator, the speeds of a microwave and a light wave can be matched with each other.

Fourth Embodiments

A fourth embodiment is characterized by an array optical waveguide lattice wavelength variable filter (also simply referred to as a wavelength variable filter) constructed using the phase shifter described in detail in the third embodiment.

In the array optical waveguide lattice wavelength variable filter shown in FIG. 43 (specifically described later), an inputted signal light is distributed to array optical waveguides via a first slab optical waveguide 430. The guided lights pass through a phase shifter 437 that varies the optical path length (ΔL) in the same manner as arithmetical series. The lights are then condensed in a branching port optical waveguide 434 through a second slab optical waveguide 432. The transmission central wavelength $\lambda_{cen}$ of the light is given by:

$$\lambda_{cen} = n \times \Delta L / m \quad (16)$$

where n denotes the transmission refractive index of the array waveguides and m denotes the order of diffraction. Electrodes for applying electric fields are arranged along each waveguide on the array waveguides. The secondary electro-optic effect is used to change the refractive index of each waveguide on the array waveguides by Δn, the array waveguides having optical path lengths ($\Delta L_h$) varying in the same manner as arithmetical series. Then, the transmission central wavelength of the wavelength filter is shifted by Δλ.

$$\Delta\lambda = \Delta n \times \Delta L_h / m \quad (17)$$

Figure 44:
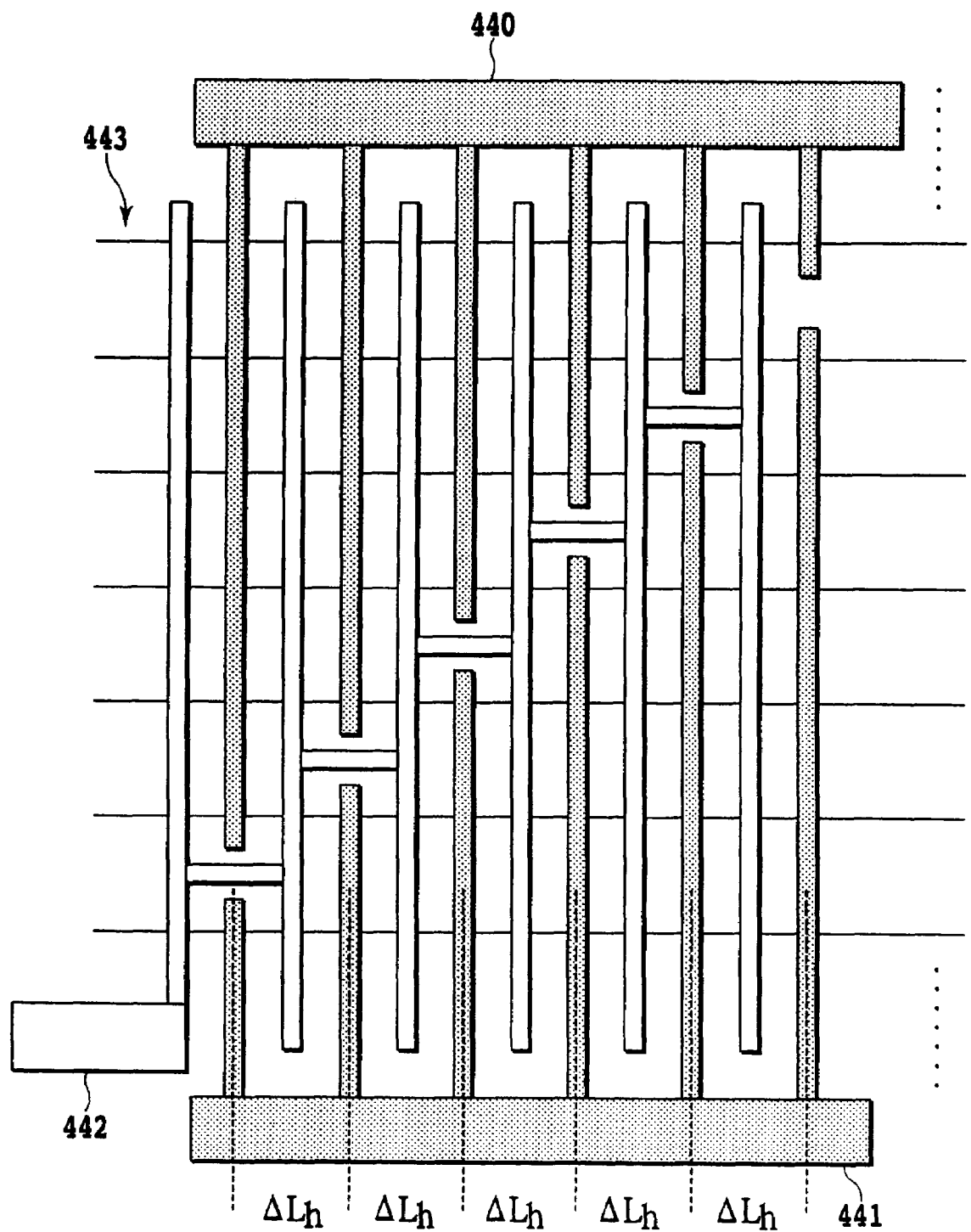
FIG. 44 is a diagram showing the configuration of an electrode structure of an electro-optic phase shifter for a wavelength variable filter according to one embodiment of the present invention.
Figure 45:
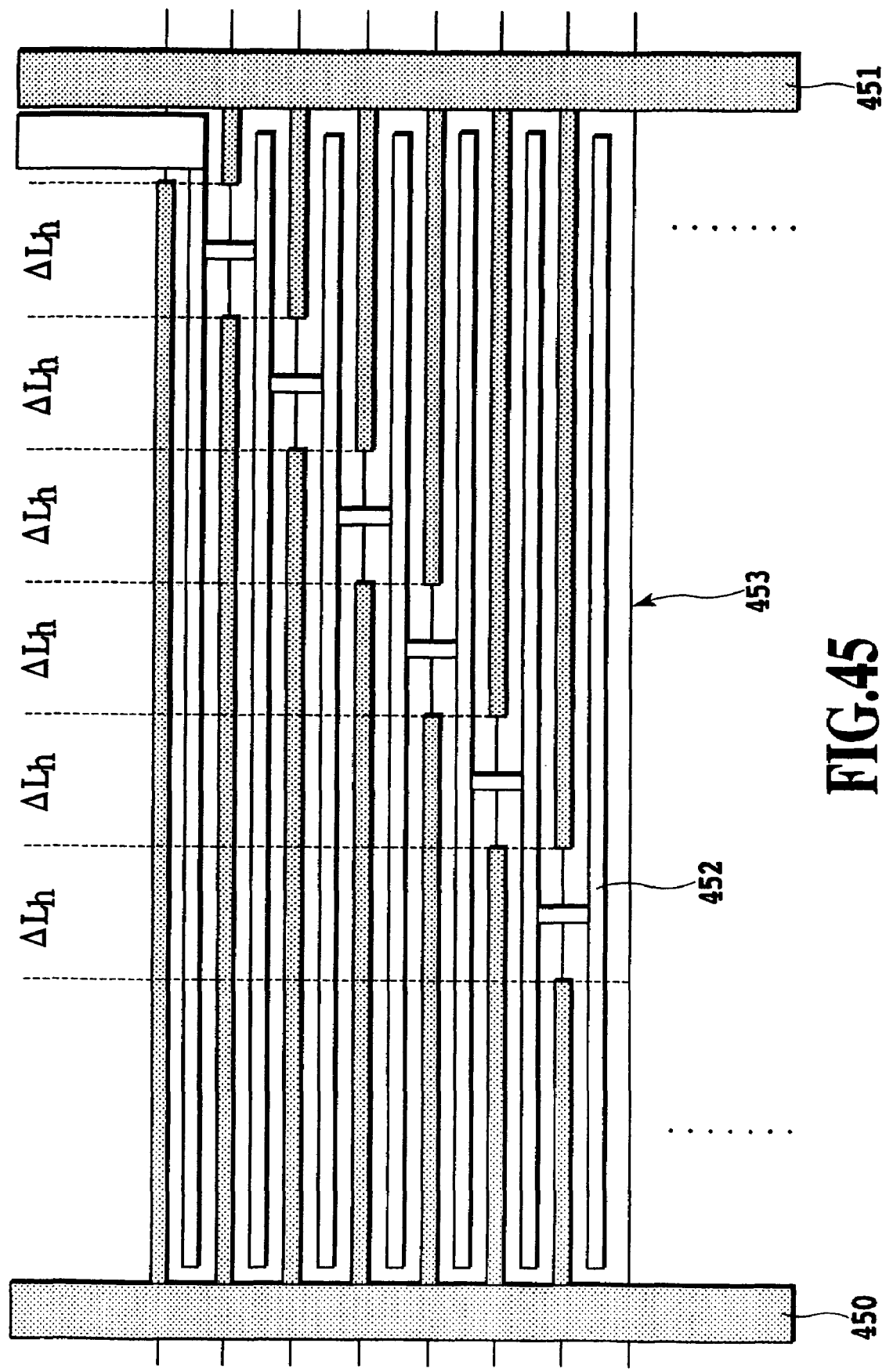
FIG. 45 is a diagram showing the configuration of an electrode structure of an electro-optic phase shifter for a wavelength variable filter according to one embodiment of the present invention.
Figure 46:
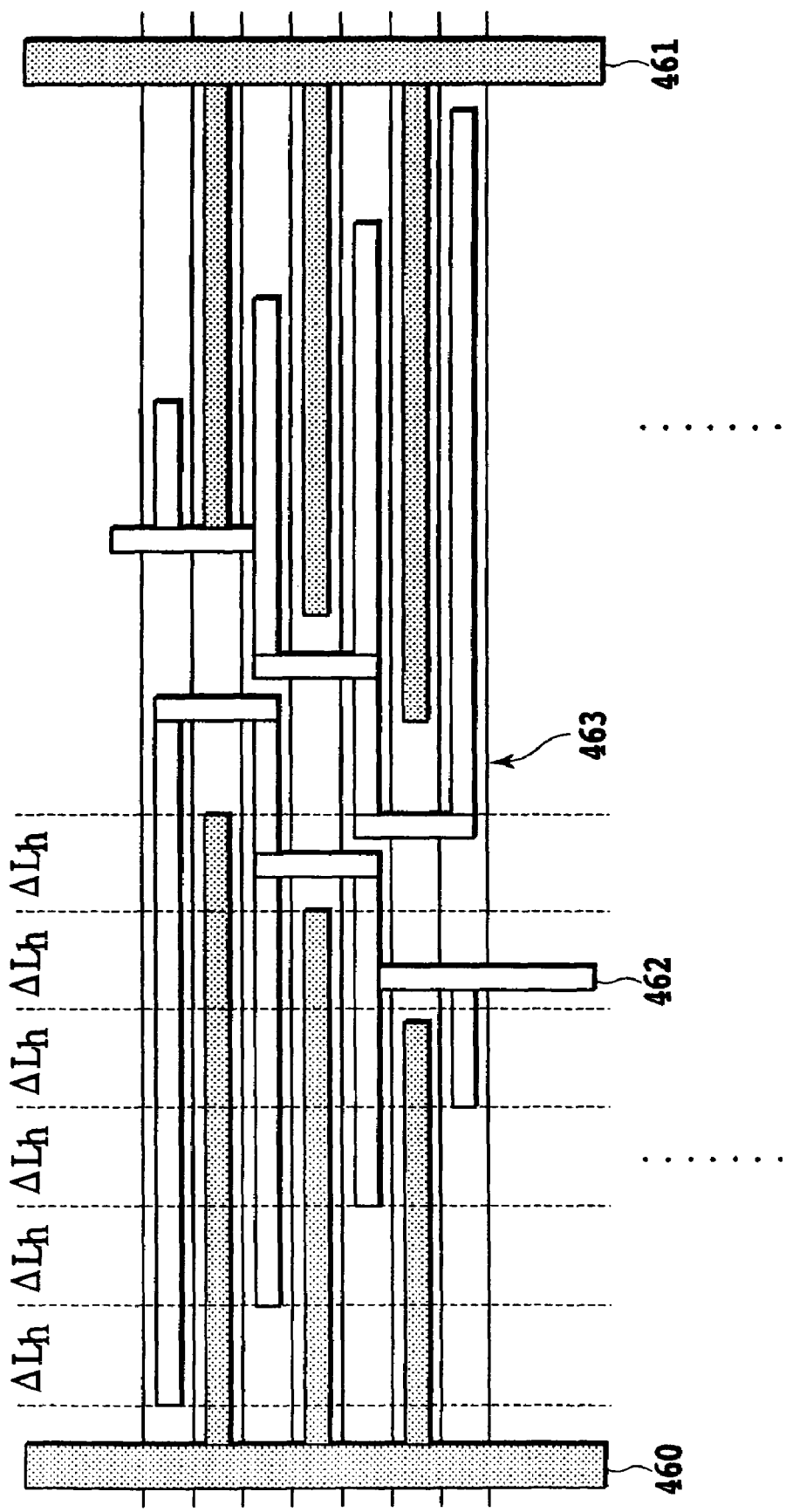
FIG. 46 is a diagram showing the configuration of an electrode structure of an electro-optic phase shifter for a wavelength variable filter according to one embodiment of the present invention.

As shown in FIGS. 44 to 46 (specifically described later), if the electrodes for applying electric fields are arranged on each array waveguide and opposite each other, the transmission wavelength is shifted in the opposite direction. This is because for the first and second electrodes, the ΔLh, shown in Equation (17), has opposite signs. Accordingly, switching the two electrodes enables the wavelength variable band to be doubled. The electrode configuration shown in FIG. 44 enables electric fields to be applied only in the direction $E_1$. Therefore, the wavelength variable filter enables polarization-independent operations. On the other hand, with the electrode configurations shown in FIGS. 45 and 46, the transmission wavelength varies between the two modes.

A number of examples will be used to describe the wavelength variable filter according to the fourth embodiment of the present invention having the above characteristics. However, the present invention is not limited to the examples described below.

EXAMPLE 1

Figure 43:
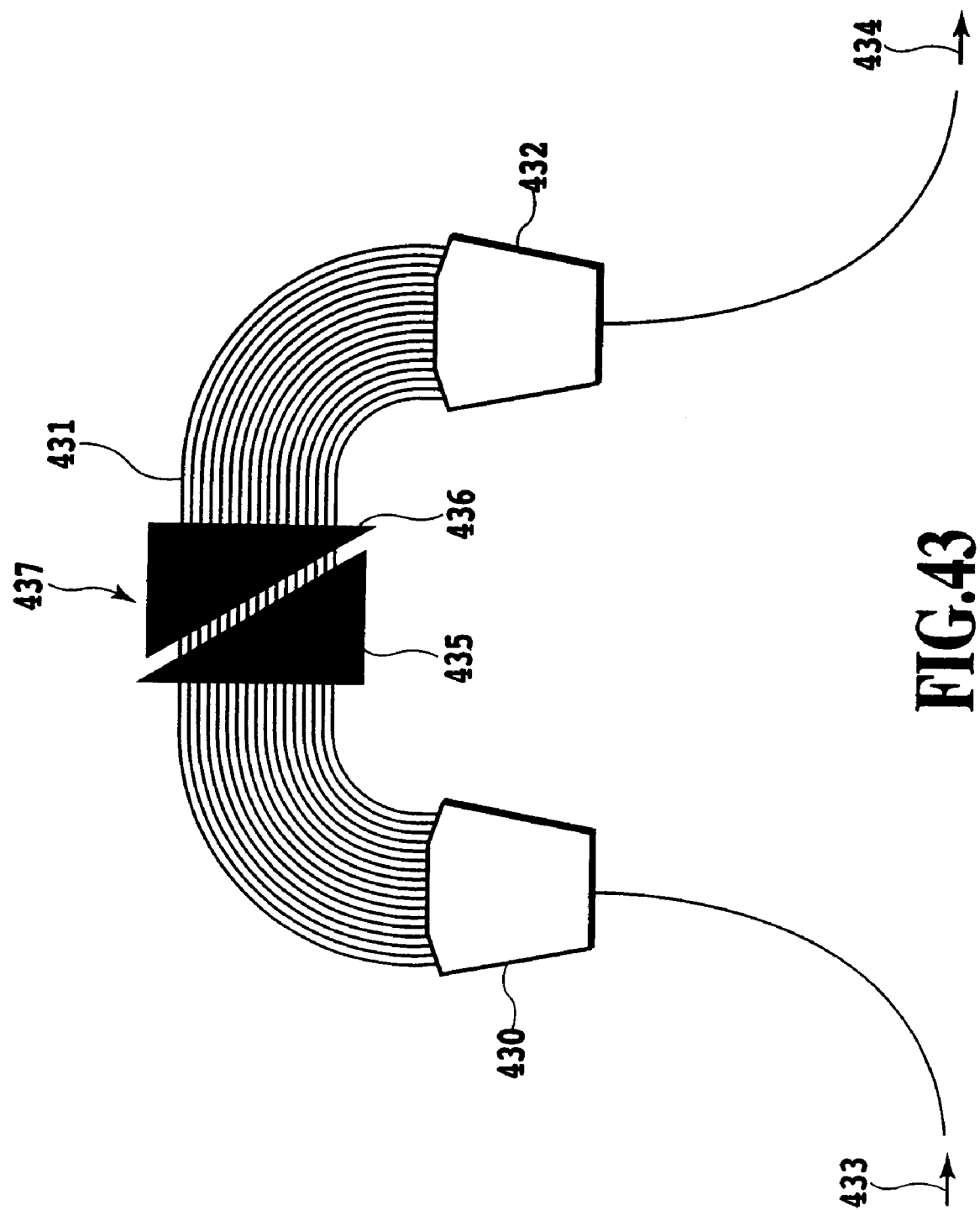
FIG. 43 is a diagram showing the configuration of a wavelength variable filter comprising a waveguide electro-optic phase shifter according to one embodiment of the present invention.

FIG. 43 is a diagram showing the configuration of a wavelength variable filter comprising the waveguide electro-optic phase shifter described in the third embodiment. In this figure, reference numerals 430, 431, and 432 denote a first slab optical waveguide, a channel optical waveguide array, and a second slab optical waveguide, respectively. Reference numerals 433, 434, and 435 denote an input port channel optical waveguide, an output port channel optical waveguide, and a first electric field applying section. Reference numerals 436 and 437 denote a second electric field applying section and a waveguide electro-optic phase shifter.

The array optical waveguide lattice wavelength variable filter according to the fourth embodiment comprises the at least one input port channel optical waveguide 433, the channel optical waveguide array 431, consisting of channel optical waveguides having different optical path lengths, the at least one output port channel optical waveguide 434, the first slab optical waveguide 430, connecting the input port channel optical waveguide 433 and the channel optical waveguide array 431 together, the second slab optical waveguide 432, connecting the output port channel optical waveguide 434 and the channel optical waveguide array 431 together, and the electro-optic phase shifter 437, consisting of a part of the channel optical waveguide array 431. The electro-optic phase shifter 437 comprises the first electric field applying section 435 and the second electric field applying section 436. The optical waveguides are produced using the KTN or KLTN crystal, exhibiting the above characteristics.

FIG. 44 is a diagram showing the configuration of electrodes in the electro-optic phase shifter for the wavelength variable filter according to the present embodiment. FIG. 44 shows the configuration of electrodes for applying electric fields which have lengths varying in the same manner as mathematical series, with respect to each of the waveguides on the array waveguides. In FIG. 44, reference numerals 440 and 441 denote the electrodes. Reference numerals 442 and 443 denote a common earth and a waveguide, respectively.

The waveguides 443 and the electrodes 440 and 441 constitute the channel optical waveguide array for the electrode phase shifter. The waveguides and the electrodes are provided vertically symmetrically with respect to the center. Further, for each optical waveguide, the lengths of the electrodes 440 and 441 vary at intervals of ΔLh.

The electrode 440 and the earth 442 constitute a first electrode. The electrode 441 and the earth 442 constitute a second electrode.

If the above variable filter is composed of the optical waveguides with the comb-shaped electrodes shown in FIGS. 28A and 28B, the core of the array waveguide is buried in the clad 282.

As shown in FIG. 43, the variable filter comprises the input and output waveguides 433 and 434, the two slab optical waveguides 430 and 432, the channel optical waveguide array 431 for the phase shifter, the first electric field applying section 435, and the second electric field applying section 436. Each of the slab waveguides 430 and 432 is shaped like a fan having a predetermined radius of curvature. FIG. 44 shows the first electric field applying section 435 and the second electric field applying section 436. The electrode 442 serves as a common earth, and the electrode 440 and 441 serve as electrodes for applying electric fields.

The number of array optical waveguides is 120, and the spacing between the array optical waveguides is set at 25 μm. The difference in length between the adjacent array optical waveguides is set at 35.5 μm. The order of diffraction is set at 50 and the difference in heater length between the adjacent array optical waveguides is set at $\Delta L_h$=300 μm. A KTN crystal of refractive index 2.184 is used as a core to produce optical waveguides designed as described above. A method of producing a KTN optical waveguide conformed to "Method of Processing Ferroelectric Film" (Japanese Patent Application No. 2002-215779). The size of a cross section of the core is 6×6 μm. A thin gold ITO film is formed on the optical waveguide by the sputter process. Then, photolithography and the dry etching process are used to produce electrodes for applying electric fields which are designed as described above and which have a width of 10 μm and a thickness of 1 μm.

An ASE broad-band light source with a 1.55-μm wavelength band and a light spectrum analyzer were connected to the input and output ports to measure filter characteristics. The wavelength filter characteristics obtained when no electric fields were applied to the electrodes were a transmission central wavelength of 1,550 nm, an insertion loss of 5.5 dB, and a crosstalk of −30 dB (1,550±0.8 nm). When a voltage was applied to the first electrode 440, the transmission central wavelength shifted to a longer wavelength side in proportion to the square of the provided voltage. On the other hand, when a voltage was applied to the second electrode 441, the transmission central wavelength shifted to a shorter wavelength side. When electric fields of 0 to 0.5 V/μm were applied to the core, the transmission central wavelength varied between 1.545 and 1.565 nm in both TE and TE modes. Further, the insertion loss and the crosstalk did not increase significantly in connection with a change in transmission central wavelength.

EXAMPLE 2

The wavelength variable filter in FIG. 43 was produced in the same manner as described above in Example 1. The configuration shown in FIG. 45 is used as a phase shifter electrode. FIG. 45 is a diagram showing the configuration of another example of the electrode structure of the electro-optic phase shifter for the wavelength variable filter. In this figure, reference numerals 450 and 451 denote electrodes. Reference numerals 452 and 453 denote a common earth and a waveguide, respectively.

In the TE mode, when a voltage was applied to the first electrode 450, the transmission central wavelength shifted to the shorter wavelength side in proportion to the square of the provided voltage. On the other hand, when a voltage was applied to the second electrode 451, the transmission central wavelength shifted to the longer wavelength side. In the TM mode, the transmission central wavelength shifted in the opposite directions. In the TM mode, when electric fields of 0 to 0.17 V/μm were applied to the core, the transmission central wavelength varied between 1.545 and 1.565 nm. Further, the insertion loss and the crosstalk did not increase significantly in connection with a change in transmission central wavelength.

EXAMPLE 3

The wavelength variable filter in FIG. 43 was produced in the same manner as described above in Example 2. The configuration shown in FIG. 46 is used as a phase shifter electrode. FIG. 46 is a diagram showing the configuration of another example of the electrode structure of the electro-optic phase shifter for the wavelength variable filter. In this figure, reference numerals 460 and 461 denote electrodes. Reference numerals 462 and 463 denote a common earth and a waveguide, respectively.

In the TE mode, when a voltage was applied to the first electrode 460, the transmission central wavelength shifted to the shorter wavelength side in proportion to the square of the provided voltage. On the other hand, when a voltage was applied to the second electrode 461, the transmission central wavelength shifted to the longer wavelength side. In the TM mode, the transmission central wavelength shifted in the opposite directions. In the TM mode, when electric fields of 0 to 0.17 V/μm were applied to the core, the transmission central wavelength varied between 1.545 and 1.565 nm. Further, the insertion loss and the crosstalk did not increase significantly in connection with a change in transmission central wavelength.

EXAMPLE 4

A wavelength variable filter according to Example 4 is configured similarly to the wavelength variable filter according to Example 1. However, the wavelength variable filter according to Example 4 differs from the wavelength variable filter according to Example 1 in that its optical waveguides are made of a BTO crystal or the like. A wavelength variable filter having such a configuration was produced and its operations were checked.

When the wavelength variable filter according to Example 4 was operated while controllably adjusting the temperature of the BTO waveguide part at 110° C., filter characteristics similar to those of the wavelength variable filter according to Example 1 were obtained. Further, the BTO and STO were mixed together in the ratio of 0.73:0.27 to produce waveguides consisting of the single crystal $Ba_{0.73}Sr_{0.27}TiO_3$. The waveguides were then used to produce a similar wavelength variable filter. In this case, at 10° C., the wavelength variable filter exhibited characteristics similar to those obtained using the BTO waveguides. Similar operations were able to be performed by a wavelength variable filter using PLZT as a material for the waveguides.

The wavelength variable filters according to the fourth embodiment may comprise a temperature controller in order to allow the KTN, KLTN, or the like to operate near the Curie transition temperature. The temperature controller may be a Peltier element.

As described above, the fourth embodiment can implement a high-speed low-voltage-driven array optical waveguide lattice wavelength variable filter, by utilizing optical waveguides based on a crystal material including KTN and KLTN that are cubic dielectric crystals having a secondary electro-optic effect.

The invention claimed is:

1. A broad-band optical modulator comprising:
a substrate including a material of at least one of $KTa_xNb_{1-x}O_3 (0<x<1)$ and $K_xLi_{1-x}Ta_yNb_{1-y}O_3 (0<x<1, 0<y<1)$;
a three-dimensional optical waveguide including a material of at least one of $KTa_xNb_{1-x}O_3$ and $K_xLi_{1-x}Ta_yNb_{1-y}O_3$; and
a plurality of electrodes each consisting of a progressive wave electrode matching the speed of a microwave with that of a light wave,
wherein the plurality of electrodes have a first electrode structure for forming an electric field in a direction parallel to TE direction of a propagating light and a second electrode structure for forming an electric field in a direction parallel to TM direction of a propagating light,
the first electrode structure includes two electrodes arranged opposite each other and parallel to each other across the three-dimensional optical waveguide, and
the second electrode structure includes two electrodes arranged opposite each other and parallel to each other across the three-dimensional optical waveguide, and one electrode placed on the three-dimensional optical waveguide.

2. The broad-band optical modulator according to claim 1, wherein the electric field in the direction parallel to TE direction of the propagating light applied to the three-dimensional optical waveguide by the first electrode structure and the electric field in the direction parallel to TM direction of the propagating light applied to the three-dimensional optical waveguide by the second electrode structure are equal.

3. The broad-band optical modulator according to claim 1, wherein each of said electrodes has a thickness of 20 μm and is formed in said substrate so as to form a concave between said electrodes, and a dielectric material is buried in said concave in order to hold a structure with a dielectric constant of at most 10.

4. The broad-band optical modulator according to claim 1, further comprising a temperature controller that controllably adjusts a temperature of said $KTa_xNb_{1-x}O_3$ and $K_xLi_{1-x}Ta_yNb_{1-y}O_3$ to a phase transition temperature at which said $KTa_xNb_{1-x}O_3$ and $K_xLi_{1-x}Ta_yNb_{1-y}O_3$ shifts from a tetragonal crystal to a cubic crystal.

* * * * *